(12) United States Patent
Tanaka

(10) Patent No.: US 9,230,497 B2
(45) Date of Patent: Jan. 5, 2016

(54) DISPLAY DEVICE HAVING EACH PIXEL DIVIDED INTO SUB PIXELS FOR IMPROVED VIEW ANGLE CHARACTERISTIC

(75) Inventor: Kohhei Tanaka, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 210 days.

(21) Appl. No.: 13/985,274

(22) PCT Filed: Feb. 7, 2012

(86) PCT No.: PCT/JP2012/052698
§ 371 (c)(1),
(2), (4) Date: Aug. 13, 2013

(87) PCT Pub. No.: WO2012/111476
PCT Pub. Date: Aug. 23, 2012

(65) Prior Publication Data
US 2013/0321492 A1    Dec. 5, 2013

(30) Foreign Application Priority Data

Feb. 14, 2011   (JP) .................................. 2011-028810

(51) Int. Cl.
*G09G 3/36* (2006.01)
*G02F 1/1335* (2006.01)
*G02F 1/1362* (2006.01)
*G02F 1/136* (2006.01)

(52) U.S. Cl.
CPC ............ *G09G 3/3655* (2013.01); *G09G 3/3614* (2013.01); *G09G 3/3659* (2013.01); *G02F 1/13624* (2013.01); *G02F 1/133555* (2013.01); *G02F 1/136213* (2013.01); *G02F 2001/13606* (2013.01); *G02F 2201/52* (2013.01); *G09G 2300/0426* (2013.01); *G09G 2300/0833* (2013.01); *G09G 2300/0842* (2013.01); *G09G 2300/0876* (2013.01); *G09G 2310/0248* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 2004/0183752 A1* | 9/2004 | Kawasaki et al. | 345/20 |
| 2008/0284962 A1* | 11/2008 | Horiguchi et al. | 349/139 |
| 2009/0109360 A1 | 4/2009 | Takahashi | |
| 2010/0157185 A1* | 6/2010 | Kim et al. | 349/38 |
| 2010/0182345 A1* | 7/2010 | Shimoshikiryoh et al. | 345/690 |
| 2012/0086700 A1* | 4/2012 | Numao | 345/212 |

FOREIGN PATENT DOCUMENTS

JP    2009-109600 A    5/2009

* cited by examiner

*Primary Examiner* — William Boddie
*Assistant Examiner* — Bipin Gyawali
(74) *Attorney, Agent, or Firm* — Hauptman Ham, LLP

(57) ABSTRACT

In a liquid crystal display device having a configuration in which one pixel is divided into a plurality of sub pixels, low power consumption is realized by reducing an amplitude of a video signal. In each pixel formation portion, an amplification circuit unit including a second-capacitor is provided between a dark display pixel electrode and a bright display pixel electrode. A selection period consists of a precharge period and an amplification period. In the precharge period, a potential of a control wiring is applied to the dark display pixel electrode, and a potential of a video signal line is applied to the bright display pixel electrode. In the amplification period, a potential of the video signal line is applied to the dark display pixel electrode in the state where the bright display pixel electrode is placed in a floating state.

2 Claims, 42 Drawing Sheets

DISPLAY DEVICE HAVING EACH PIXEL DIVIDED INTO SUB PIXELS FOR IMPROVED VIEW ANGLE CHARACTERISTIC

RELATED APPLICATIONS

The present application is a National Phase of International Application Number PCT/JP2012/052698, filed Feb. 7, 2012, and which is based upon and claims the benefit of priority from Japanese Patent Application No. 2011-028810, filed on Feb. 14, 2011.

TECHNICAL FIELD

The present invention relates to a display device, and particularly relates to a display device having a configuration in which one pixel is divided into a plurality of sub pixels to improve a view angle characteristic, and a driving method thereof.

BACKGROUND ART

Conventionally, an active matrix-type liquid crystal display device that includes a thin film transistor (TFT) as a switching element is known. The display unit of the active matrix-type liquid crystal display device includes a plurality of source bus lines (video signal lines), a plurality of gate bus lines (scanning signal lines), and a plurality of pixel formation portions that are respectively provided at intersections of the plurality of source bus lines and the plurality of gate bus lines. These pixel formation portions are arranged in a matrix form to configure a pixel array.

FIG. 41 is a circuit diagram showing a configuration of a pixel formation portion of a conventional general active matrix-type liquid crystal display device. As shown in FIG. 41, the pixel formation portion includes a thin film transistor T91 having a gate electrode connected to a gate bus line GL passing through a corresponding intersection and having a source electrode connected to a source bus line SL passing through the intersection, a pixel electrode 92 connected to a drain electrode of the thin film transistor T91, a common electrode (counter electrode) COM and an auxiliary capacitance electrode CS provided so as to be shared among the plurality of pixel formation portions, a liquid crystal capacitor Clc formed by the pixel electrode 92 and the common electrode COM, and an auxiliary capacitor Cstg formed by the pixel electrode 92 and the auxiliary capacitance electrode CS. Further, a pixel capacitance is formed by the liquid crystal capacitor Clc and the auxiliary capacitor Cstg. Then, a voltage indicating a pixel value is held in the pixel capacitance, based on a video signal that a source electrode of the thin film transistor T91 receives from the source bus line SL when a gate electrode of the thin film transistor T91 receives an active scanning signal from the gate bus line GL. Note that the auxiliary capacitor Cstg is not necessarily provided.

Further, a liquid crystal display device having a configuration in which one pixel is divided into a plurality of (typically, two) sub pixels to improve the view angle characteristic is also known (for example, refer to JP 2006-133577 A). This configuration is referred to as a "multi-pixel structure". In the liquid crystal display device having the multi-pixel structure, a liquid crystal is driven so that brightnesses of the plurality of sub pixels become mutually different brightnesses. FIG. 42 is a circuit diagram showing a configuration example of a pixel formation portion in the conventional liquid crystal display device having the multi-pixel structure. As shown in FIG. 42, in this liquid crystal display device, a pixel formation portion PIX9 is constituted by two sub pixel units (a first sub pixel unit PIX9a and a second sub pixel unit PIX9b). Both sub pixel units (PIX9a, PIX9b) include transistors (T92, T93), pixel electrodes (E91, E92), liquid crystal capacitors (ClcA, ClcB), and holding capacitors (CstA, CstB), as common constituent elements. The second sub pixel unit PIX9b further includes a transistor T94 having a gate electrode connected to a scanning signal line GLi+1 and having a source electrode connected to the pixel electrode E92, a capacitance electrode E93 connected to a drain electrode of the transistor T94, and a buffer capacitance Cdown formed by the capacitance electrode E93 and a common electrode (auxiliary capacitance electrode) COM 102. In such a configuration, when the scanning signal line GLi is in a selected state, the potential of the pixel electrode E91 in the first sub pixel unit PIX9a becomes equal to the potential of the pixel electrode E92 in the second sub pixel unit PIX9b. Thereafter, when the scanning signal line GLi+1 is in the selected state, the transistor T94 is placed in an on state. Accordingly, a charge moves between the pixel electrode E92 and the capacitance electrode E93, and the potential of the pixel electrode E92 varies. As a result, the pixel electrode E91 and the pixel electrode E92 have different potentials, and the first sub pixel unit PIX9a and the second sub pixel unit PIX9b have different brightnesses.

In recent years, development of high definition of a display image in the liquid crystal display device is remarkable. Examples of high definition include 4K (resolution: 3840× 2048) of a television large panel. When the display image has high definition, power consumption associated with the drive of the panel increases. Regarding the power consumption of the panel, power due to charge and discharge of a source bus line is the majority. The power consumption due to the charge and discharge of the source bus line is obtained from (the number of source bus lines)×(wiring capacitance of source bus lines)×(drive frequency)×(square of amplitude of video signal). Therefore, by setting the amplitude of the video signal small, the power consumption of the panel can be effectively reduced. JP 2009-109600 A discloses the invention of a liquid crystal display device which enables reduction of the amplitude of the video signal by amplifying the pixel electrode potential. In this liquid crystal display device, the pixel formation portion is configured as shown in FIG. 43 so that the following drive is performed. In the first half of one horizontal scanning period, an on-level potential is applied to a line denoted by a reference character 9 in the state where an off-level potential is applied to the gate bus line GL. Accordingly, thin film transistors T902, T903 are placed in the on state. As a result, a video signal potential (a potential of the source bus line SL) is applied to a node 901, and a potential of the common electrode COM is applied to a node 902. Thereafter, in the latter half of the one horizontal scanning period, the on-level potential is applied to the gate bus line GL in the state where the off-level potential is applied to the line denoted by the reference character 9. Accordingly, the thin film transistor T901 is placed in the on state. As a result, a video signal potential is applied to the node 902. That is, the potential of the node 902 rises from the common electrode potential to the video signal potential. At this time, because the node 901 is in the floating state, the potential of the node 901 rises via a capacitance C91 with the rise in the potential of the node 902. As described above, a larger voltage is applied between the pixel electrode and the common electrode.

PRIOR ART DOCUMENTS

Patent Documents

[Patent Document 1] JP 2006-133577 A
[Patent Document 2] JP 2009-109600 A

SUMMARY OF THE INVENTION

Problems to be Solved by the Invention

However, in the invention disclosed in JP 2009-109600 A, in the first half of the one horizontal scanning period, the common electrode potential is applied to the node 902 (see FIG. 43). That is, precharge using the common electrode potential is performed. Therefore, the pixel electrode potential is amplified according to a difference between the video signal potential and the common electrode potential. However, because the common electrode potential cannot be freely set, the difference between the video signal potential and the common electrode potential cannot be set sufficiently large, and the amplification level of the pixel electrode potential is not sufficient. Further, since only one liquid crystal capacitor Clc is provided to one pixel formation portion, the invention disclosed in JP 2009-109600 A cannot be applied to the liquid crystal display device having the multi-pixel structure.

Further, in the liquid crystal display device having the multi-pixel structure shown in FIG. 42, the amplitude of the video signal cannot be set small so as to reduce power consumption, for the following reasons. In the frame during which writing in the positive polarity is performed, when the transistor T94 is placed in the on state, a positive charge moves from the holding capacitance CstB to the buffer capacitance Cdown. As a result, the potential of the pixel electrode E92 in the second sub pixel unit PIX9b becomes lower than the potential of the pixel electrode E91 in the first sub pixel unit PIX9a. In the frame during which writing in the negative polarity is performed, when the transistor T94 is placed in the on state, the positive charge moves from the buffer capacitance Cdown to the holding capacitance CstB. As a result, the potential of the pixel electrode E92 in the second sub pixel unit PIX9b becomes higher than the potential of the pixel electrode E91 in the first sub pixel unit PIX9a. From the above, in both of the frame during which writing in the positive polarity is performed and the frame during which writing in the negative polarity is performed, a liquid crystal application voltage in the second sub pixel unit PIX9b becomes smaller than a liquid crystal application voltage in the first sub pixel unit PIX9a. Further, in the first sub pixel unit PIX9a, the voltage of the difference between the video signal potential and the common electrode potential is applied to the liquid crystal. Therefore, in the second sub pixel unit PIX9b, a voltage smaller than the voltage of the difference between the video signal potential and the common electrode potential is applied to the liquid crystal. From the above, the amplitude of the video signal cannot be set small so as to reduce the power consumption.

Therefore, an object of the present invention is to realize low power consumption by reducing an amplitude of a video signal, in a liquid crystal display device having a configuration in which one pixel is divided into a plurality of sub pixels.

Means for Solving the Problems

A first aspect of the present invention is directed to an active matrix-type display device which has a plurality of video signal lines, a plurality of scanning signal lines intersecting the plurality of video signal lines, a plurality of pixel formation portions arranged in a matrix form at respective intersections of the plurality of video signal lines and the plurality of scanning signal lines, and a common electrode provided so as to be shared among the plurality of pixel formation portions, the display device comprising:

first control wirings that intersect at least one of the plurality of video signal lines and the plurality of scanning signal lines; and second control wirings provided in one-to-one correspondence with the plurality of scanning signal lines, wherein each of the pixel formation portions includes a first pixel electrode and a second pixel electrode to which potentials according to an image to be displayed are to be applied, a first first-capacitor formed by the first pixel electrode and the common electrode, a second first-capacitor formed by the second pixel electrode and the common electrode, an amplification circuit unit for amplifying the potential of the second pixel electrode, and a first switching element having a control terminal connected to the scanning signal line, a first conductive terminal connected to the video signal line, and a second conductive terminal connected to the amplification circuit unit, the amplification circuit unit includes an amplification stage including a second switching element having a control terminal connected to the second control wiring, and a first conductive terminal connected to the video signal line, a third switching element having a control terminal connected to the second control wiring, and a first conductive terminal connected to the first control wiring, and a second-capacitor provided between a second conductive terminal of the second switching element and a second conductive terminal of the third switching element, the second conductive terminal of the first switching element is connected to the second conductive terminal of the third switching element, the first pixel electrode is connected to the second conductive terminal of the third switching element, the second pixel electrode is connected to the second conductive terminal of the second switching element, and when focusing on any pixel formation portion, one frame period during which display of one screen is performed includes a selection period and a non-selection period other than the selection period, the selection period being for changing potentials of the first pixel electrode and the second pixel electrode according to the image to be displayed and including a first period and a second period, to a corresponding first control wiring, a constant potential is applied, or a constant high level potential and a constant low level potential are alternately applied, to a corresponding second control wiring, a potential for placing the second switching element and the third switching element in an on state is applied in the first period, and a potential for placing the second switching element and the third switching element in an off state is applied in a period other than the first period, and to a corresponding scanning signal line, a potential for placing the first switching element in an on state is applied in the second period, and a potential for placing the first switching element in an off state is applied in a period other than the second period.

According to a second aspect of the present invention, in the first aspect of the present invention, the high level potential and the low level potential are alternately applied to the first control wiring.

According to a third aspect of the present invention, in the second aspect of the present invention, when focusing on any pixel formation portion, to a corresponding first control wiring, the high level potential is applied in a selection period during which a potential lower than a potential of the common electrode is to be applied to the first pixel electrode and the second pixel electrode, and the low level potential is applied in a selection period during which a potential higher than the potential of the common electrode is to be applied to the first pixel electrode and the second pixel electrode.

According to a fourth aspect of the present invention, in the second aspect of the present invention, when focusing on any pixel formation portion, to a corresponding first control wiring, the low level potential is applied in a selection period during which a potential lower than a potential of the common electrode is to be applied to the first pixel electrode and the second pixel electrode, and the high level potential is applied in a selection period during which a potential higher than the potential of the common electrode is to be applied to the first pixel electrode and the second pixel electrode.

According to a fifth aspect of the present invention, in the first aspect of the present invention, when a center potential between a maximum potential and a minimum potential that can be applied to the plurality of video signal lines is a reference potential, a potential of the common electrode is set to a potential lower than the reference potential by a value equal to a size of a change in a potential of the first pixel electrode caused by a change in a potential of the scanning signal line when shifting from the selection period to the non-selection period, and a potential of the first control wiring is set such that a center potential between the potential of the second pixel electrode in a selection period during which a potential higher than the potential of the common electrode is to be applied to the second pixel electrode and the potential of the second pixel electrode in a selection period during which a potential lower than the potential of the common electrode is to be applied to the second pixel electrode becomes equal to the potential of the common electrode.

According to a sixth aspect of the present invention, in the fifth aspect of the present invention, a potential Vct1 of the first control wiring is set to a value calculated by the following equation:

$$Vct1 = Vd1 + Vd2 - Vcom - \Delta Vg2$$

wherein Vd1 represents a maximum potential that can be applied to the plurality of video signal lines, Vd2 represents a minimum potential that can be applied to the plurality of video signal lines, Vcom represents a potential of the common electrode, and $\Delta Vg2$ represents a size of a change in the potential of the second pixel electrode caused by a change in the potential of the scanning signal line when shifting from the selection period to the non-selection period.

According to a seventh aspect of the present invention, in the first aspect of the present invention, the first control wirings are arranged so as to extend in parallel with the scanning signal lines.

According to an eighth aspect of the present invention, in the first aspect of the present invention, the first control wirings are arranged so as to extend in parallel with the video signal lines.

According to a ninth aspect of the present invention, in the first aspect of the present invention, the display device further comprises a two-layer transparent electrode including a first transparent electrode that functions as the first pixel electrode and a second transparent electrode including a portion that functions as the second pixel electrode, and the second-capacitor is formed by the first transparent electrode and the second transparent electrode.

According to a tenth aspect of the present invention, in the ninth aspect of the present invention, the first transparent electrode is formed in a region between the second transparent electrode and the common electrode, and an opening is provided at a center part of the first transparent electrode.

According to an eleventh aspect of the present invention, in the ninth aspect of the present invention, the second transparent electrode further includes a lattice-shaped electrode part that is formed in a lattice shape so as to have a portion extending in parallel with the scanning signal line and a portion extending in parallel with the video signal line, the lattice-shaped electrode part being electrically isolated from a portion that functions as the second pixel electrode, and the lattice-shaped electrode part functions as the first control wiring.

According to a twelfth aspect of the present invention, in the ninth aspect of the present invention, the second transparent electrode further includes a shield electrode part that is formed in a region between the video signal line and the first transparent electrode, the shield electrode part being electrically isolated from a portion that functions as the second pixel electrode.

According to a thirteenth aspect of the present invention, in the twelfth aspect of the present invention, the shield electrode part is formed so as to cover the video signal line.

According to a fourteenth aspect of the present invention, in the twelfth aspect of the present invention, the shield electrode part is formed so as not to overlap with the video signal line, and is formed in a region between the video signal line and a portion of the second transparent electrode that functions as the second pixel electrode in a direction to which the scanning signal line extends.

According to a fifteenth aspect of the present invention, in the twelfth aspect of the present invention, the shield electrode part functions as the first control wiring.

According to a sixteenth aspect of the present invention, in the ninth aspect of the present invention, a liquid crystal is provided as a display medium between the first pixel electrode and the common electrode and between the second pixel electrode and the common electrode, each of the pixel formation portions forms a pixel constituted by a plurality of regions in which orientation states of the liquid crystal are different from each other, and an orientation center of a sub pixel unit including the first pixel electrode match an orientation center of a sub pixel unit including the second pixel electrode.

According to a seventeenth aspect of the present invention, in the ninth aspect of the present invention, a liquid crystal is provided as a display medium between the first pixel electrode and the common electrode and between the second pixel electrode and the common electrode, each of the pixel formation portions forms a pixel constituted by a plurality of regions in which orientation states of the liquid crystal are different from each other, and out of a sub pixel unit including the first pixel electrode and a sub pixel unit including the second pixel electrode, a sub pixel unit in which relatively bright display is to be performed is arranged at a center part of each pixel formation portion.

According to an eighteenth aspect of the present invention, in the first aspect of the present invention, a liquid crystal is provided as a display medium between the first pixel electrode and the common electrode and between the second pixel electrode and the common electrode, each of the pixel formation portions forms a pixel constituted by a plurality of regions in which orientation states of the liquid crystal are different from each other, and the first control wiring is arranged in a region corresponding to a boundary part of the plurality of regions.

According to a nineteenth aspect of the present invention, in the first aspect of the present invention, the plurality of pixel formation portions are formed of a plurality of pixel formation portions for a plurality of colors, and regarding a pixel formation portion for at least one color out of the pixel formation portions for a plurality of colors, the second-capacitor has a capacitance value different from that of the pixel formation portions for other colors.

According to a twentieth aspect of the present invention, in the first aspect of the present invention, the plurality of pixel formation portions are formed of a plurality of pixel formation portions for a plurality of colors, and regarding a pixel formation portion for at least one color out of the pixel formation portions for a plurality of colors, a potential applied to a corresponding first control wiring is different from potentials applied to first control wirings corresponding to pixel formation portions for other colors.

According to a twenty-first aspect of the present invention, in the first aspect of the present invention, the amplification circuit unit includes a plurality of amplification stages, a second conductive terminal of the first switching element is connected to a second conductive terminal of a third switching element included in an amplification stage arranged electrically farthest from the second pixel electrode out of the plurality of amplification stages, the first pixel electrode is connected to a second conductive terminal of the first witching element or a second conductive terminal of a second switching element included in an amplification stage other than an amplification stage arranged electrically closest to the second pixel electrode out of the plurality of amplification stages, the second pixel electrode is connected to a second conductive terminal of a second switching element included in an amplification stage arranged electrically closest to the second pixel electrode out of the plurality of amplification stages, and when focusing on two continuous amplification stages, a second conductive terminal of the second switching element included in an amplification stage arranged electrically farther from the second pixel electrode is connected to a second conductive terminal of a third switching element included in an amplification stage arranged electrically closer to the second pixel electrode.

A twenty-second aspect of the present invention is directed to a driving method of an active matrix-type display device which has a plurality of video signal lines, a plurality of scanning signal lines intersecting the plurality of video signal lines, a plurality of pixel formation portions arranged in a matrix form at respective intersections of the plurality of video signal lines and the plurality of scanning signal lines, the plurality of pixel formation portions including first pixel electrodes and second pixel electrodes to which potentials according to an image to be displayed are to be respectively applied, and a common electrode provided so as to be shared among the plurality of pixel formation portions, the method comprising:

regarding each of the pixel formation portions, a pixel-electrode-potential change step for changing potentials of the first pixel electrode and the second pixel electrode according to the image to be displayed for each one frame period during which display of one screen is performed, and a pixel-electrode-potential maintaining step for maintaining the potentials of the first pixel electrode and the second pixel electrode, wherein the display device includes first control wirings that intersect at least one of the plurality of video signal lines and the plurality of scanning signal lines, and second control wirings provided in one-to-one correspondence with the plurality of scanning signal lines, each of the pixel formation portions includes a first first-capacitor formed by the first pixel electrode and the common electrode, a second first-capacitor formed by the second pixel electrode and the common electrode, an amplification circuit unit for amplifying the potential of the second pixel electrode, and a first switching element having a control terminal connected to the scanning signal line, a first conductive terminal connected to the video signal line, and a second conductive terminal connected to the amplification circuit unit, the amplification circuit unit includes an amplification stage including a second switching element having a control terminal connected to the second control wiring, and a first conductive terminal connected to the video signal line, a third switching element having a control terminal connected to the second control wiring, and a first conductive terminal connected to the first control wiring, and a second-capacitor provided between a second conductive terminal of the second switching element and a second conductive terminal of the third switching element, the second conductive terminal of the first switching element is connected to the second conductive terminal of the third switching element, the first pixel electrode is connected to the second conductive terminal of the third switching element, the second pixel electrode is connected to the second conductive terminal of the second switching element, to the first control wiring, a constant potential is applied, or a constant high level potential and a constant low level potential are alternately applied, and when focusing on any pixel formation portion, the pixel-electrode-potential change step includes a first step of applying to a corresponding second control wiring a potential for placing the second switching element and the third switching element in an on state, in a state where a potential for placing the first switching element in an off state is applied to a corresponding scanning signal line, and a second step of applying to a corresponding scanning signal line a potential for placing the first switching element in an on state, in a state where a potential for placing the second switching element and the third switching element in an off state is applied to a corresponding second control wiring, and in the pixel-electrode-potential maintaining step, a potential for placing the first switching element in an off state is applied to a corresponding scanning signal line, and a potential for placing the second switching element and the third switching element in an off state is applied to a corresponding second control wiring.

Effects of the Invention

According to the first aspect of the present invention, each of the pixel formation portions includes the first pixel electrode and the second pixel electrode, and the selection period for changing the potentials of the first pixel electrode and the second pixel electrode according to the display image includes the first period and the second period. The potential of the first pixel electrode is set equal to the potential of the first control wiring in the first period, and is thereafter set equal to the video signal potential in the second period. The potential of the second pixel electrode is set equal to the video signal potential in the first period, and is thereafter amplified according to the difference between the potential of the first control wiring and the video signal potential in the second period. In this manner, in the display device having a multi-pixel structure (a configuration in which one pixel is divided into a plurality of sub pixels), at the end point of the selection period, the potential of the first pixel electrode (for example, a pixel electrode provided in the dark display sub pixel) becomes equal to the video signal potential, and the potential of the second pixel electrode (for example, a pixel electrode provided in the bright display sub pixel) becomes higher than the video signal potential. Therefore, even when the amplitude of the video signal is set smaller than a conventional amplitude, a potential similar to the conventional potential can be applied to the second pixel electrode. Accordingly, in the display device having the multi-pixel structure, low power consumption can be realized by reducing the amplitude of the video signal.

According to the second aspect of the present invention, by adjusting the high level potential and the low level potential which are applied to the first control wiring, the relationship between the transmission rate and the difference between the video signal potential and the common electrode potential ("pseudo VT characteristic" described later) can be suitably adjusted. Accordingly, in the display device having the multi-pixel structure, the degree of freedom of view angle compensation is improved.

According to the third aspect of the present invention, because the difference between the potential of the first control wiring and the video signal potential becomes larger in the selection period, the potential of the second pixel electrode is more greatly amplified. Therefore, in the display device having the multi-pixel structure, the amplitude of the video signal can be set remarkably smaller than the conventional amplitude, and power consumption can be effectively reduced.

According to the fourth aspect of the present invention, similarly to the second aspect of the present invention, in the display device having the multi-pixel structure, the degree of freedom of view angle compensation is improved.

According to the fifth aspect of the present invention, in the display device having the multi-pixel structure, the occurrence of a deviation in the application voltage to the pixel capacitance between the positive and negative polarities is suppressed in both the dark display pixel and the bright display pixel, and the occurrence of burn-in of the screen and the like is suppressed.

According to the sixth aspect of the present invention, when the capacitance value of the second-capacitor is extremely larger than the capacitance value of the second first-capacitor or the parasitic capacitance, the potential of the first control wiring can be set relatively easily so as to prevent the occurrence of a deviation in the application voltage to the pixel capacitance between the positive and negative polarities.

According to the seventh aspect of the present invention, as compared to the configuration in which the first control wirings are arranged to extend in parallel with the video signal lines, the required number of first control wirings becomes small. Therefore, reduction in the aperture ratio due to the provision of the first control wirings can be suppressed.

According to the eighth aspect of the present invention, unlike the configuration in which the first control wirings are arranged to extend in parallel with the scanning signal lines, a precharge potential is not applied from one first control wiring to a plurality of third switching elements at the same timing. Therefore, the load applied to each first control wiring at the time of performing the precharge (the first period) can be reduced.

According to the ninth aspect of the present invention, because the second-capacitor is formed by two layers of transparent electrodes, the aperture ratio can be improved, and the second-capacitor can be set without affecting the aperture ratio.

According to the tenth aspect of the present invention, the area of the sub pixel is determined by the area of the opening, and the capacitance value of the second-capacitor is determined by the area (overlap amount) of the portion where the first transparent electrode and the second transparent electrode overlap each other. Therefore, the degree of freedom concerning the design of the second-capacitor can be secured.

According to the eleventh aspect of the present invention, the transparent electrode formed in a lattice shape functions as the first control wiring. Therefore, the resistance of the first control wiring becomes small, and the aperture ratio can be improved.

According to the twelfth aspect of the present invention, because the shield electrode part is provided in the region between the first transparent electrode and the video signal line, the influence that the variation in the video signal potential gives to the potentials of the first pixel electrode and the second pixel electrode can be reduced.

According to the thirteenth aspect of the present invention, because the shield electrode part is formed so as to cover the video signal line, the influence that the variation in the video signal potential gives to the potentials of the first pixel electrode and the second pixel electrode can be effectively reduced.

According to the fourteenth aspect of the present invention, because the capacitance formed between the video signal line and the shield electrode part becomes relatively small, the influence that the variation in the video signal potential gives to the potentials of the first pixel electrode and the second pixel electrode can be reduced while reducing the wiring capacitance of the video signal line.

According to the fifteenth aspect of the present invention, one electrode functions as both the shield electrode part and the first control wiring. Therefore, also in the display device having the display unit of higher precision, the influence that the variation in the video signal potential gives to the potentials of the first pixel electrode and the second pixel electrode can be reduced.

According to the sixteenth aspect of the present invention, in the display device (orientation division-type liquid crystal display device) that employs a liquid crystal as a display medium and includes a pixel constituted by a plurality of regions in which orientation states of liquid crystals are different from each other, the orientation center of the bright display sub pixel matches the orientation center of the dark display sub pixel. Therefore, in the orientation division-type liquid crystal display device, the number of dark lines can be reduced. Accordingly, reduction in the transmission rate caused by the dark lines can be suppressed.

According to the seventeenth aspect of the present invention, the bright display sub pixel is arranged at the center part of each pixel, and suitable display considering the orientation characteristic of the liquid crystal is performed in the orientation division-type liquid crystal display device.

According to the eighteenth aspect of the present invention, in the orientation division-type liquid crystal display device, the first control wirings are formed so as to overlap with the dark lines. Therefore, reduction in the aperture ratio due to the provision of the first control wirings can be effectively suppressed.

According to the nineteenth aspect of the present invention, the amplification level of the potential of the second pixel electrode in the second period can be set to a different size for each color. Accordingly, the view angle characteristic can be adjusted more minutely.

According to a twentieth aspect of the present invention, similarly to the nineteenth aspect of the present invention, the amplification level of the potential of the second pixel electrode in the second period can be set to a different size for each color, and the view angle characteristic can be adjusted more minutely.

According to a twenty-first aspect of the present invention, in the selection period, the potential of the second pixel electrode is amplified in a plurality of stages. Therefore, the amplitude of the video signal can be set remarkably smaller than the conventional amplitude, and the power consumption can be substantially reduced compared to the conventional power consumption.

According to the twenty-second aspect of the present invention, an effect similar to that of the first aspect of the present invention can be obtained in the driving method of the display device.

MODES FOR CARRYING OUT THE INVENTION

0. Introduction

Before describing the embodiments, a basic operation principle of a display device of the present invention will be described. It should be noted that, in the following description, the term "amplification" is used to indicate that a difference between a pixel electrode potential and a common electrode potential becomes large.

Figure 1:
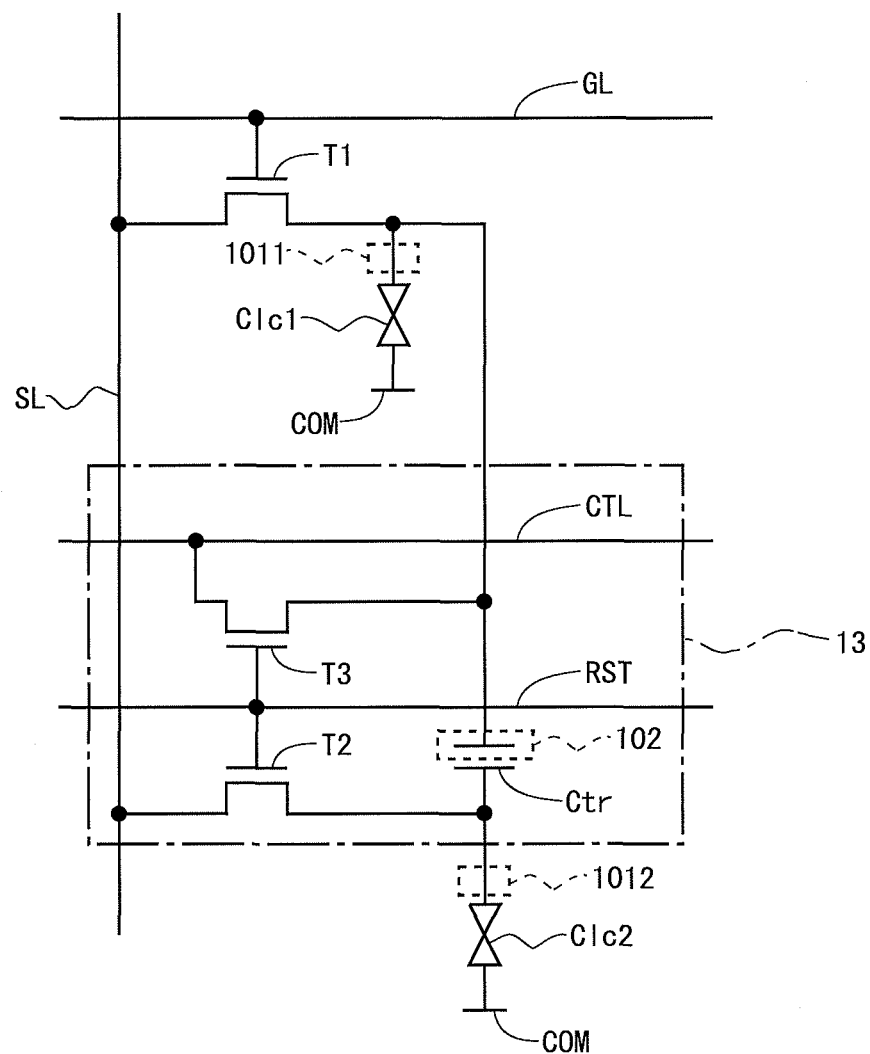
FIG. 1 is an equivalent circuit diagram showing a configuration of a typical pixel formation portion (a portion forming one pixel) in a display device of the present invention.

FIG. 1 is an equivalent circuit diagram showing a configuration of a typical pixel formation portion (a portion forming one pixel) in the display device of the present invention. As shown in FIG. 1, the pixel formation portion includes three thin film transistors T1, T2, and T3, and three capacitors Clc1, Clc2, and Ctr. As wirings passing through the pixel formation portion, a wiring denoted by a reference character RST (hereinafter, "reset wiring") and a wiring denoted by a reference character CTL (hereinafter, "control wiring") are provided in addition to a gate bus line GL and a source bus line SL. Hereinafter, the capacitor Clc1 is referred to as a "first first-capacitor", the capacitor Clc2 is referred to as a "second first-capacitor", and the capacitor Ctr is referred to as a "second-capacitor". Regarding the first first-capacitor Clc1, the second first-capacitor Clc2, and the second-capacitor Ctr, capacitance values thereof are also denoted by the same reference characters "Clc1", "Clc2", and "Ctr", respectively. It should be noted that, in FIG. 1, although the control wiring CTL is shown so as to extend in parallel with the gate bus line GL, the present invention is not limited thereto.

The pixel formation portion shown in FIG. 1 forms a pixel of the multi-pixel structure. That is, one pixel is divided into a plurality of sub pixels (two sub pixels in this case). Hereinafter, description is made by assuming that the first first-capacitor Clc1 is a capacitor provided in a pixel in which relatively dark display (hereinafter, "dark display") is performed, and that the second first-capacitor Clc2 is a capacitor provided in a pixel in which relatively bright display (hereinafter, "bright display") is performed. However, the first first-capacitor Clc1 may be the capacitor provided in the bright display pixel, and the second first-capacitor Clc2 may be the capacitor provided in the dark display pixel.

The connection relationship among the constituent elements in the pixel formation portion is as follows. As for the thin film transistor T1, the gate electrode is connected to the gate bus line GL, the source electrode is connected to the source bus line SL, and the drain electrode is connected to one end of the first first-capacitor Clc1 and one end of the second-capacitor Ctr. As for the thin film transistor T2, the gate electrode is connected to the reset wiring RST, the source electrode is connected to the source bus line SL, and the drain electrode is connected to the other end of the second-capacitor Ctr and one end of the second first-capacitor Clc2. As for the thin film transistor T3, the gate electrode is connected to the reset wiring RST, the source electrode is connected to the control wiring CTL, and the drain electrode is connected to one end of the second-capacitor Ctr. One end of the first first-capacitor Clc1 is connected to the drain electrode of the thin film transistor T1 and one end of the second-capacitor Ctr, and the other end of the first first-capacitor Clc1 is connected to the common electrode COM. One end of the second first-capacitor Clc2 is connected to the drain electrode of the thin film transistor T2 and the other end of the second-capacitor Ctr, and the other end of the second first-capacitor Clc2 is connected to the common electrode COM. One end of the second-capacitor Ctr is connected to the drain electrode of the thin film transistor T1, the drain electrode of the thin film transistor T3, and one end of the first first-capacitor Clc1, and the other end of the second-capacitor Ctr is connected to the drain electrode of the thin film transistor T2 and one end of the second first-capacitor Clc2. It should be noted that, when a liquid crystal display device is employed as a display device, the first first-capacitor Clc1 and the second first-capacitor Clc2 correspond to the liquid crystal capacitor.

In the above configuration, a dark display pixel electrode 1011 is present at one end of the first first-capacitor Clc1. That is, the first first-capacitor Clc1 is formed by the dark display pixel electrode 1011 and the common electrode COM. Further, a bright display pixel electrode 1012 is present at one end of the second first-capacitor Clc2. That is, the second first-capacitor Clc2 is formed by the bright display pixel electrode 1012 and the common electrode COM. Moreover, at one end of the second-capacitor Ctr, an electrode (hereinafter, "amplification electrode") 102 is present. The electrode 102 is for forming a capacitor (a capacitor for amplifying the potential of the bright display pixel electrode 1012) between the electrode 1012 and the bright display pixel electrode 1012 or between the electrode 1012 and the electrode electrically connected to the bright display pixel electrode 1012. Because the amplification electrode 102 is electrically connected to the dark display pixel electrode 1011, the potential of the amplification electrode 102 becomes equal to the potential of the dark display pixel electrode 1011. Hereinafter, the potential of the dark display pixel electrode 1011 (the potential of the amplification electrode 102) is denoted by a reference character Vpix1, and the potential of the bright display pixel electrode 1012 is denoted by a reference character Vpix2.

It should be noted that, in the configuration shown in FIG. 1, a first switching element is realized by the thin film transistor T1, a second switching element is realized by the thin film transistor T2, a third switching element is realized by the thin film transistor T3, a first control wiring is realized by the control wiring CTL, a second control wiring is realized by the reset wiring RST, a first pixel electrode is realized by the dark display pixel electrode 1011, and a second pixel electrode is realized by the bright display pixel electrode 1012. The gate electrode corresponds to a control terminal, the source electrode corresponds to a first conductive terminal, and the drain electrode corresponds to a second conductive terminal. An amplification circuit unit 13 for amplifying the pixel electrode potential Vpix2 is realized by the thin film transistor T2, the thin film transistor T3, and the second-capacitor Ctr.

Figure 2:
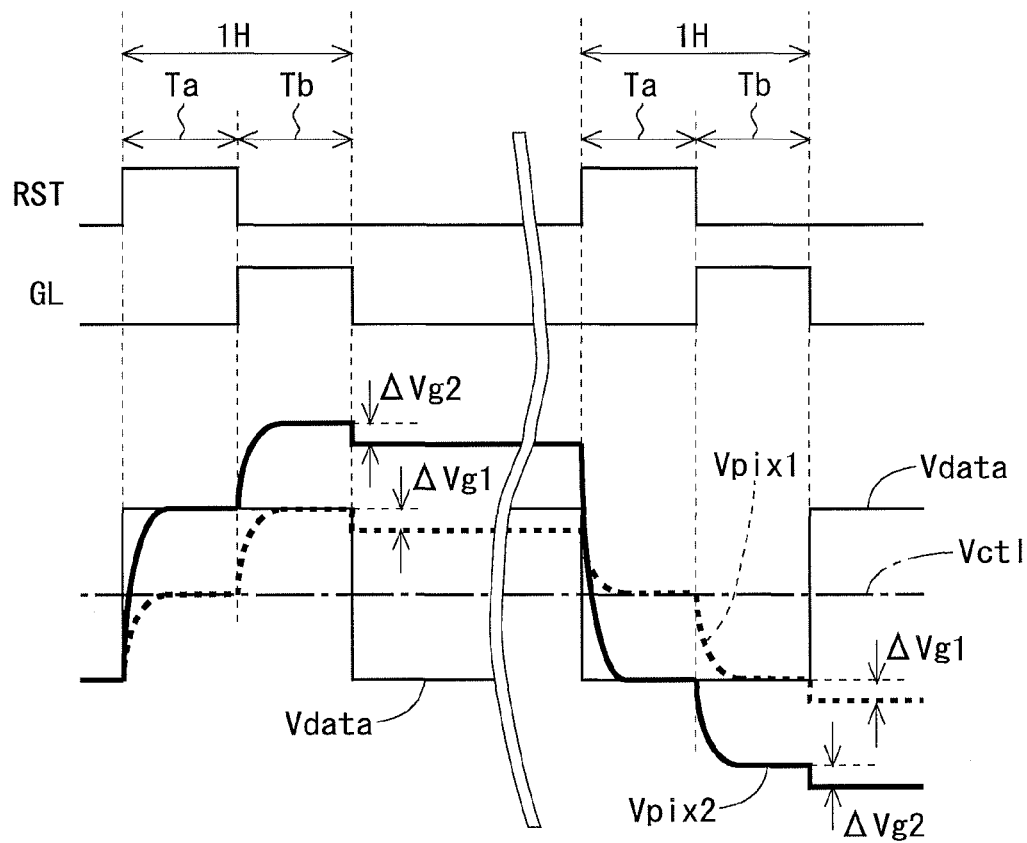
FIG. 2 is a signal waveform diagram for describing an operation of a pixel formation portion in a selection period.

FIG. 2 is a signal waveform diagram for describing the operation of the pixel formation portion in a selection period (the period for performing writing to the first first-capacitor Clc1 and the second first-capacitor Clc2 according to the image to be displayed in each pixel formation portion). The length of the selection period typically corresponds to the length of one horizontal scanning period in a conventional display device. It should be noted that a reference character Vdata indicates a video signal potential (the potential of the source bus line SL), and a reference character Vct1 indicates the potential of the control wiring CTL. In the present invention, as shown in FIG. 2, the selection period (the horizontal scanning period) consists of a first half period (hereinafter, "precharge period") Ta and a latter half period (hereinafter, "amplification period") Tb. Therefore, one frame period consists of the selection period including the precharge period Ta and the amplification period Tb, and a non-selection period other than the selection period. The length of the precharge period Ta and the length of the amplification period Tb are not necessarily equal. It should be noted that, because a similar operation is performed in the frame during which writing in the positive polarity is performed and in the frame during which writing in the negative polarity is performed, description is made below by focusing on the frame during which writing in the positive polarity is performed.

First, in the precharge period Ta, in the state where the potential of the off level (a low level in the example shown in FIG. 2) is applied to the gate bus line GL, the potential of the on level (a high level in the example shown in FIG. 2) is applied to the reset wiring RST. Accordingly, the thin film transistor T1 is placed in the off state, and the thin film transistors T2, T3 are placed in the on state. As a result, the video signal potential Vdata is applied to the bright display pixel electrode 1012, and the control wiring potential Vct1 is applied to the dark display pixel electrode 1011 (the amplification electrode 102). It should be noted that the video signal potential Vdata is the potential which is determined according to the display image.

Next, in the amplification period Tb, the on-level potential is applied to the gate bus line GL in the state where the off-level potential is applied to the reset wiring RST. Accordingly, the thin film transistor T1 is placed in the on state, and the thin film transistors T2, T3 are placed in the off state. As a result, the video signal potential Vdata is applied to the dark display pixel electrode 1011. That is, the pixel electrode potential Vpix1 rises from Vct1 to Vdata. At this time, because the bright display pixel electrode 1012 is in the floating state, the pixel electrode potential Vpix2 rises via the second-capacitor Ctr with the rise in the pixel electrode potential Vpix1. A size V1 of the rise in the pixel electrode potential Vpix2 at this time is expressed by the following equation (1). Here, Cp represents the capacitance value of the parasitic capacitance.

[Mathematical Formula 1]

$$V1 = \frac{Ctr}{Ctr + Clc2 + Cp} \cdot (Vdata - Vctl) \tag{1}$$

As described above, at the endpoint of the amplification period Tb, i.e., at the end point of the selection period, the value of the pixel electrode potential Vpix1 becomes Vdata, and the value of the pixel electrode potential Vpix2 becomes "Vdata+V1".

After the amplification period Tb ends, the potential of the gate bus line GL changes from the on level to the off level. Following this change in the potential, voltage variations ΔVg1, ΔVg2 referred to as "feed-through voltage", "pull-in voltage", and the like occur in the pixel electrode potentials Vpix1, Vpix2. As a result, the value of the pixel electrode potential Vpix1 becomes "Vdata−ΔVg1", and the pixel electrode potential Vpix2 becomes the value expressed by the following equation (2). It should be noted that, when the writing in the positive polarity is performed, the above voltage variation occurs so as to minimize the difference between the pixel electrode potential and the common electrode potential, and when the writing in the negative polarity is performed, the above voltage variation occurs so as to maximize the difference between pixel electrode potential and the common electrode potential.

[Mathematical Formula 2]

$$Vpix2 = Vdata + \frac{Ctr}{Ctr + Clc2 + Cp} \cdot (Vdata - Vctl) - \Delta Vg2 \tag{2}$$

In this manner, in the period from occurrence of the above voltage variation after ending the selection period and until writing is performed in the next frame, the pixel electrode potential Vpix1 is maintained at "Vdata−ΔVg1", and the pixel electrode potential Vpix2 is maintained at the value expressed by the equation (2) (however, the variation in the potential caused by the leak current and like is ignored).

It should be noted that a pixel-electrode-potential change step is realized by the operation in the selection period, and a pixel-electrode-potential maintaining step is realized by the operation in the non-selection period. Further, a first step is realized by the operation in the precharge period Ta, and a second step is realized by the operation in the amplification period Tb.

In the conventional display device having the multi-pixel structure, at the endpoint of the selection period, the dark display pixel electrode potential is lower than the video signal potential, and the bright display pixel electrode potential is equal to the video signal potential. From this fact and the equation (2), it is understood that, according to the display device of the present invention, the bright display pixel electrode potential Vpix2 at the end point of the selection period is increased as compared with that of the conventional display device by the size of (Ctr/(Ctr+Clc2+Cp))·(Vdata−Vct1). From the equation (2), it is understood that the pixel electrode potential Vpix2 is amplified according to the size of (Vdata−Vct1) in the amplification period Tb. Further, the equation (2) can be modified as expressed by the following equation (3).

[Mathematical Formula 3]

$$Vpix2 = \left[1 + \frac{Ctr}{Ctr + Clc2 + Cp}\right] \cdot Vdata - \frac{Ctr}{Ctr + Clc2 + Cp} \cdot Vctl - \Delta Vg2 \quad (3)$$

From the equation (3), it is understood that, in the display device of the present invention, the value of the pixel electrode potential Vpix2 is determined based on the potential obtained by amplifying the video signal potential Vdata by (1+(Ctr/(Ctr+Clc2+Cp)) times the conventional video signal potential. Further, it is understood that, regarding the pixel electrode potential Vpix2, not only the offset based on the voltage variation ΔVg2 occurs, but the offset in the size according to the value of the control wiring potential Vctl occurs.

The control wiring CTL may be based on the direct-current drive or the alternate-current drive. When the alternate-current drive is employed, from the equation (3), it is understood that the level of the amplification of the pixel electrode potential Vpix2 can be changed by setting, to various values, the value of the control wiring potential Vctl when the writing in the positive polarity is performed (when the video signal potential Vdata is higher than the common electrode potential) and the value of the control wiring potential Vctl when the writing in the negative polarity is performed (when the video signal potential Vdata is lower than the common electrode potential).

Figure 3:
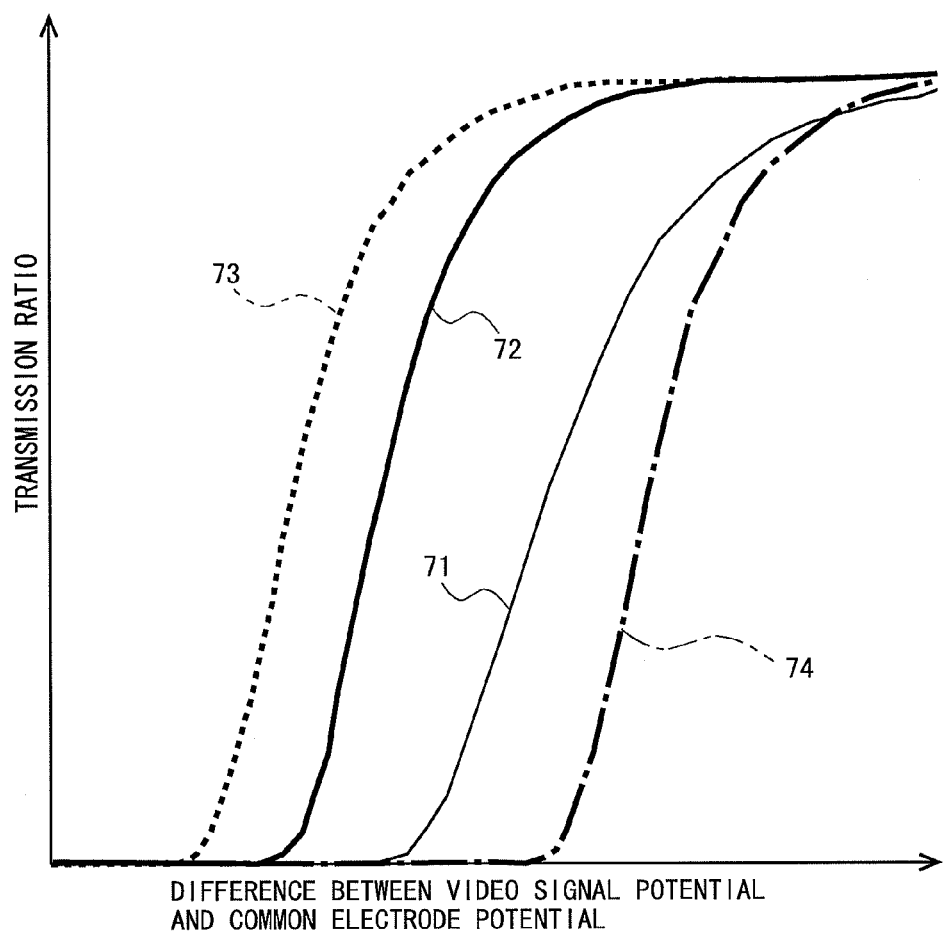
FIG. 3 is a diagram showing a relationship between a transmission rate and a difference between a video signal potential and a common electrode potential.

FIG. 3 is a diagram showing a relationship between the transmission rate and the difference between the video signal potential and the common electrode potential. It should be noted that, since the characteristic showing the relationship between the liquid crystal application voltage and the transmission rate in the liquid crystal display device is referred to as a "VT characteristic", the characteristic shown in FIG. 3 is referred to as a "pseudo VT characteristic" for the sake of convenience. In FIG. 3, the solid line denoted by a reference character 71 indicates the pseudo VT characteristic in the dark display pixel. As described above, according to the present invention, after the video signal potential Vdata is applied to the bright display pixel electrode 1012 in the precharge period Ta, the pixel electrode potential Vpix2 is amplified in the amplification period Tb. Therefore, the "difference between the video signal potential and the common electrode potential" required for obtaining any transmission rate becomes smaller in the bright display pixel than in the dark display pixel. Consequently, according to the display device of the present invention, when the control wiring CTL is direct-current driven, the pseudo VT characteristic as indicated by the thick solid line denoted by a reference character 72, for example, is obtained in the bright display pixel. Further, by alternate-current driving the control wiring CTL, the pseudo VT characteristic for the bright display pixel can be shifted. For example, if the control wiring potential Vctl is set to a relatively low level when the writing in the positive polarity is performed, and if the control wiring potential Vctl is set to a relatively high level when the writing in the negative polarity is performed, the pixel electrode potential Vpix2 is amplified larger in the amplification period Tb. Accordingly, in the bright display pixel, the pseudo VT characteristic as indicated by the thick dotted line denoted by a reference character 73 is obtained. If the control wiring potential Vctl is set to a relatively high level when the writing in the positive polarity is performed, and if the control wiring potential Vctl is set to a relatively low level when the writing in the negative polarity is performed, the level of the amplification of the pixel electrode potential Vpix2 in the amplification period Tb becomes small. Accordingly, in the dark display pixel, the pseudo VT characteristic as indicated by the thick chain dot line denoted by a reference character 74, for example, is obtained (in this case, the solid line denoted by the reference character 71 indicates the pseudo VT characteristic in the bright display pixel).

Based on the above, the embodiments of the present invention will be described below.

1. First Embodiment

1.1 Overall Configuration and Operation Outline

Figure 4:
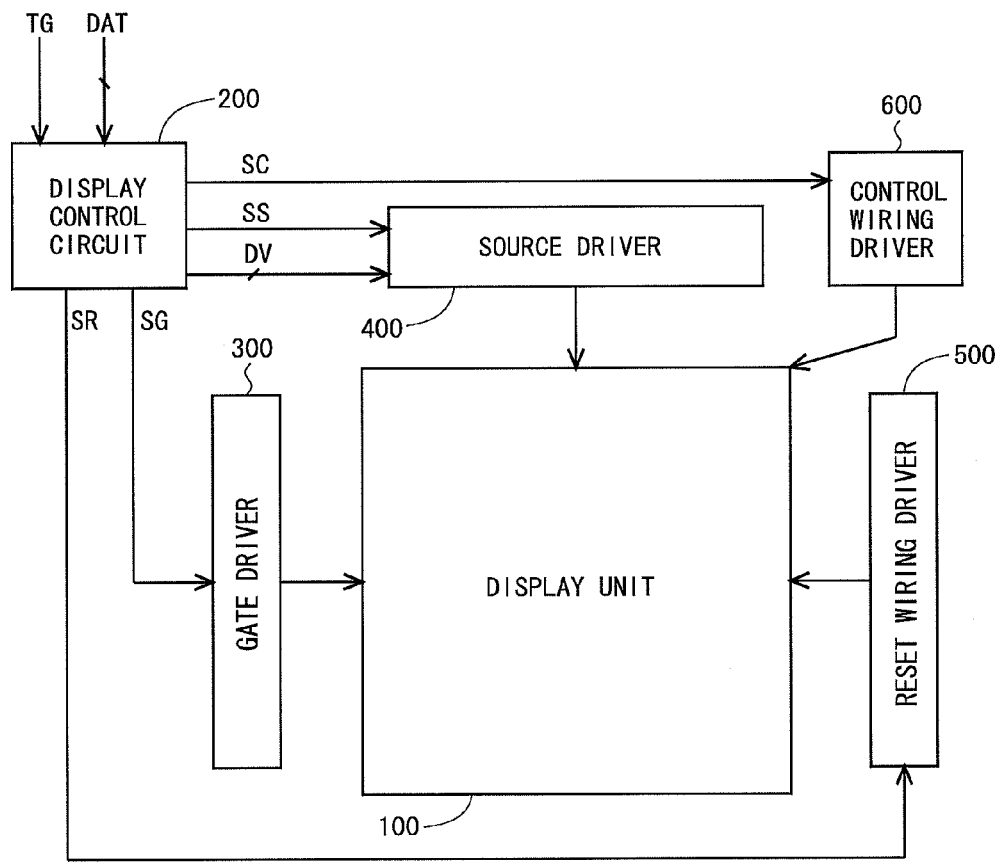
FIG. 4 is a block diagram showing an overall configuration of an active matrix-type liquid crystal display device according to a first embodiment of the present invention.

FIG. 4 is a block diagram showing an overall configuration of an active matrix-type liquid crystal display device according to a first embodiment of the present invention. This liquid crystal display device includes a display unit 100, a display control circuit 200, a gate driver 300, a source driver 400, a reset wiring driver 500, and a control wiring driver 600. The display unit 100 includes a plurality of source bus lines SL, a plurality of gate bus lines GL, and a plurality of pixel formation portions provided at intersections of the plurality of source bus lines SL and the plurality of gate bus lines GL. Further, the display unit 100 includes reset wirings RST which are provided in one-to-one correspondence with the gate bus lines GL, and control wirings CTL which are provided in one-to-one correspondence with the gate bus lines GL. The configuration of the pixel formation portion is as described above (see FIG. 1).

The display control circuit 200 receives image data DAT and timing signals TG, and outputs a control signal SG for controlling the operation of the gate driver 300, a control signal SS for controlling the operation of the source driver 400, a digital video signal DV based on the image data DAT, a control signal SR for controlling the operation of the reset wiring driver 500, and a control signal SC for controlling the operation of the control wiring driver 600. Each control signal is configured by one or a plurality of signals. For example, the control signal SG is configured by a start pulse signal indicating a start timing of a vertical scanning period, and a clock signal for controlling the timing of the shift operation of a shift register in the gate driver 300.

The gate driver 300 drives the gate bus line GL based on the control signal SG. The source driver 400 drives the source bus line SL based on the control signal SS. The reset wiring driver 500 drives the reset wiring RST based on the control signal SR. The control wiring driver 600 drives the control wiring CTL based on the control signal SC. By driving the gate bus line GL, the source bus line SL, the reset wiring RST, and the control wiring CTL as described above, the image based on the image data DAT is displayed in the display unit 100.

1.2 Arrangement Relationship Between Pixel Formation Portion and Each Line

Figure 5:
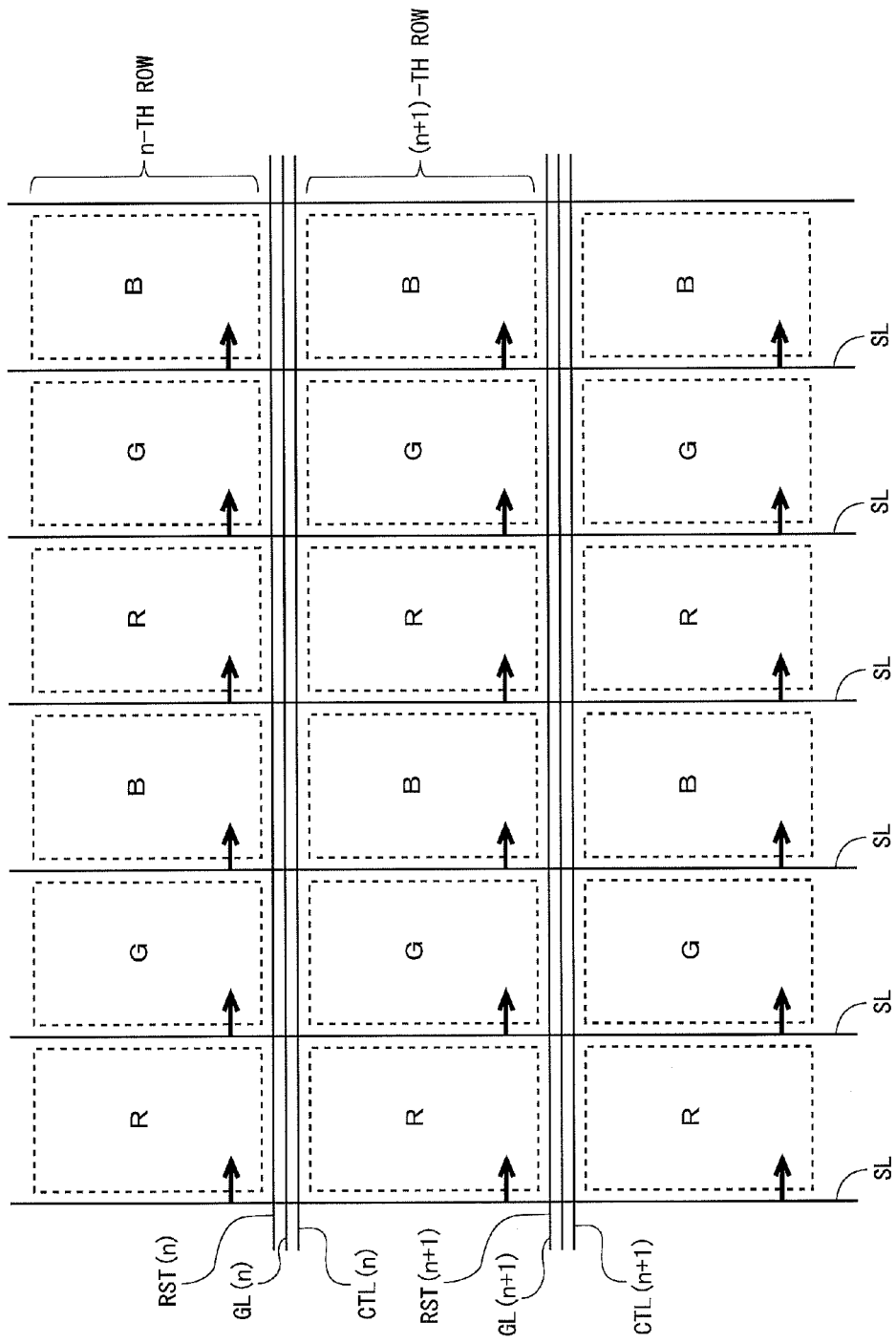
FIG. 5 is a diagram showing an arrangement relationship between the pixel formation portion and each line in the first embodiment.

FIG. 5 is a diagram showing an arrangement relationship between the pixel formation portion and each line (the source bus line SL, the gate bus line GL, the reset wiring RST, and the control wiring CTL). In FIG. 5, supply directions of video signals from the source bus line SL to the pixel formation portion are shown by arrows. It should be noted that R, G, and B indicate a pixel formation portion for a red color, a pixel formation portion for a green color, and a pixel formation portion for a blue color, respectively. As can be seen from FIG. 5, in the present embodiment, video signals are supplied from the source bus lines SL arranged at the same side (the left side in this example) in all the pixel formation portions. It should be noted that, as described above, each pixel formation portion has a multi-pixel structure in which one pixel is divided into a plurality of sub pixels (in this case, two sub pixels including a dark display pixel and a bright display pixel).

1.3 Layout

Figure 6:
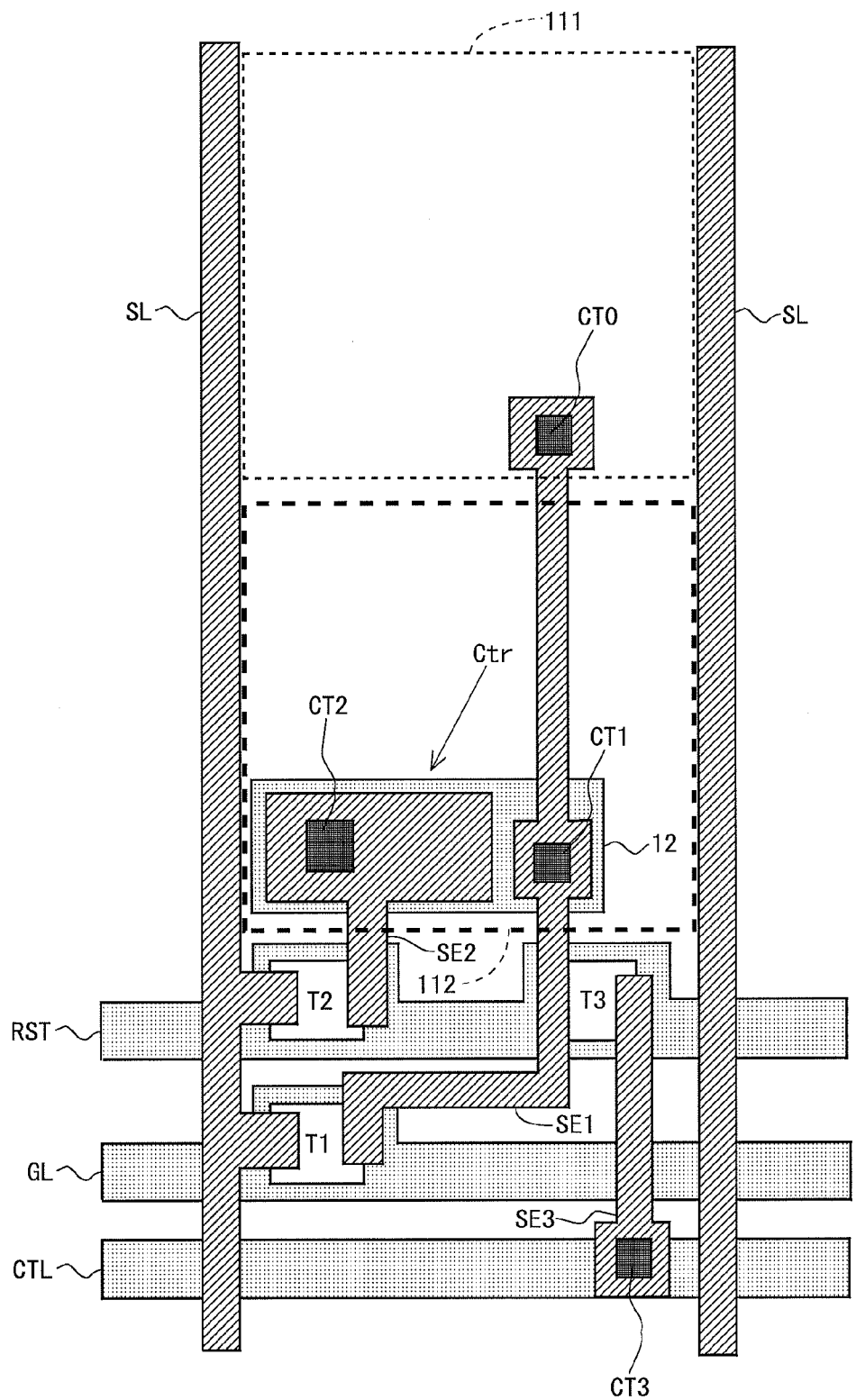
FIG. 6 is a diagram showing a layout near the pixel formation portion in the first embodiment.

Next, the layout near one pixel formation portion is described with reference to FIG. 6. Similarly to the conventional liquid crystal display device, gate metals that form the gate bus lines GL and source metals that form the source bus line SL are arranged so as to intersect each other. The reset wirings RST and the control wirings CTL are formed by gate metals, and are arranged so as to extend in parallel with the gate bus lines GL. Out of the region between two adjacent source bus lines SL, in the portion other than the region in which the reset wiring RST, the gate bus line GL, and the control wiring CTL are arranged, there are formed a transparent electrode 111 that functions as the dark display pixel electrode 1011 and a transparent electrode 112 that functions as the bright display pixel electrode 1012, as shown in FIG. 6. The transparent electrode 111 and the transparent electrode 112 are formed in the same layer. An electrode 12 that functions as the amplification electrode 102 described above is formed by a gate metal between the adjacent two source bus lines SL as shown in FIG. 6.

The drain electrode of the thin film transistor T1 and the transparent electrode 111 are electrically connected by the source metal denoted by a reference character SE1 and a contact CT0. The drain electrode of the thin film transistor T1 and the electrode 12 are electrically connected by the source metal denoted by the reference character SE1 and a contact CT1. The drain electrode of a thin film transistor T2 and the transparent electrode 112 are electrically connected by the source metal denoted by a reference character SE2 and a contact CT2. The source electrode of a thin film transistor T3 and the control wiring CTL are electrically connected by the source metal denoted by a reference character SE3 and a contact CT3. The drain electrode of the thin film transistor T3 and the electrode 12 are electrically connected by the source metal denoted by the reference character SE1 and the contact CT1. In the configuration as described above, the second-capacitor Ctr is formed by the source metal denoted by the reference character SE2 and the electrode 12.

Figure 7:
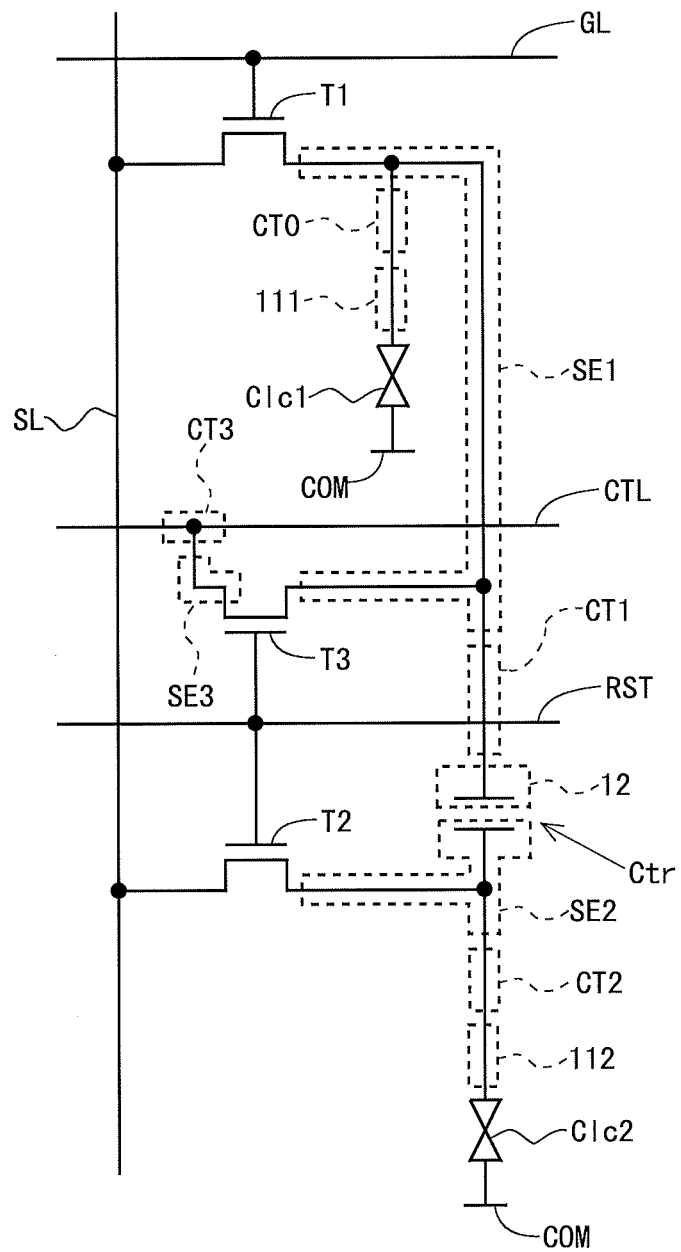
FIG. 7 is a diagram for describing the layout near the pixel formation portion in the first embodiment.

It should be noted that, when the positions of the transparent electrode 111, the transparent electrode 112, the electrode 12, the source metals denoted by the reference characters SE1 to SE3, and the contacts CT0 to CT3 in FIG. 6 are shown on the equivalent circuit diagram in FIG. 1, the positions are as shown in FIG. 7.

1.4 Driving Method

Figure 8:
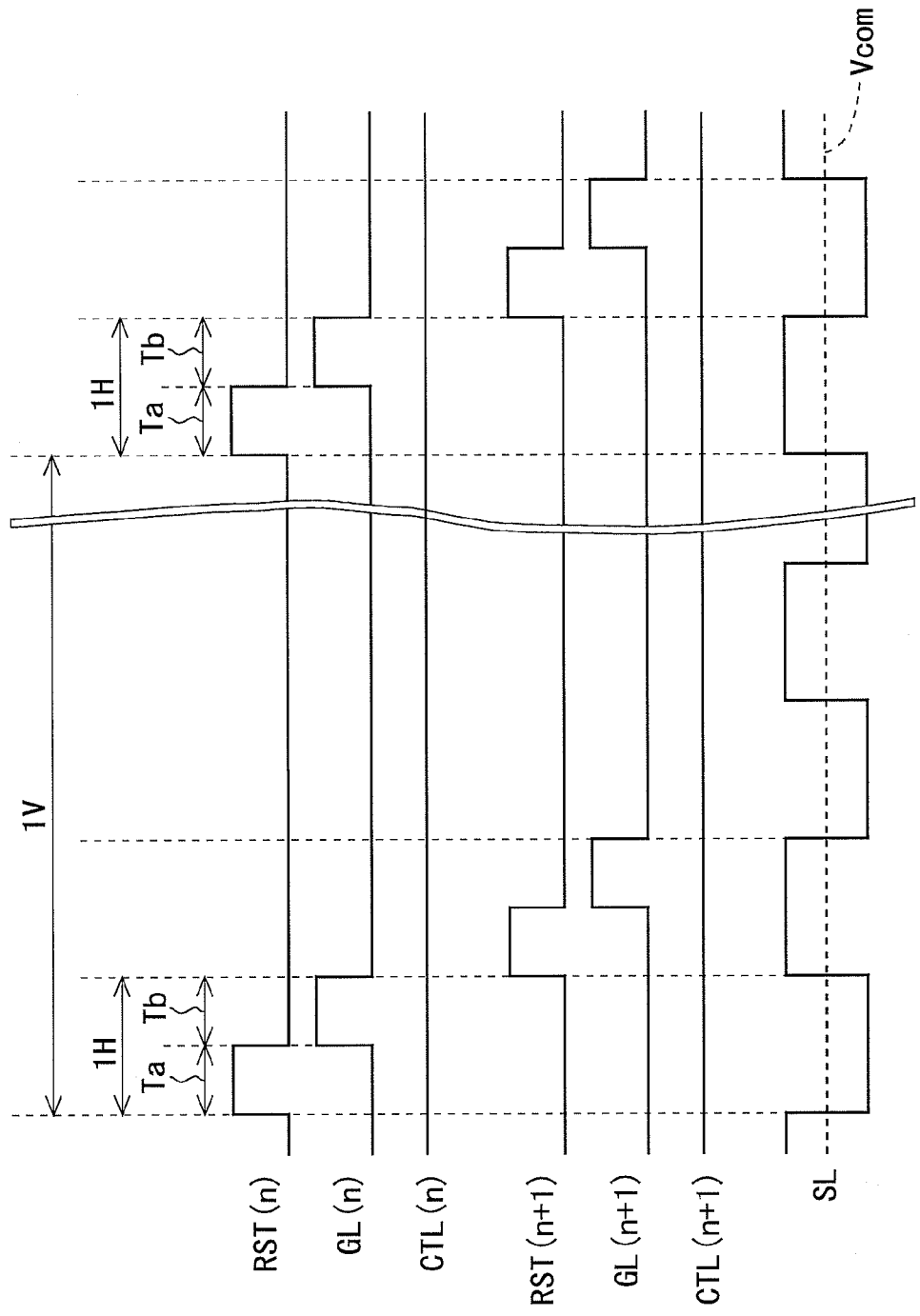
FIG. 8 is a signal waveform diagram for describing a driving method in the first embodiment.

Next, the driving method in the present embodiment will be described. In the present embodiment, as shown in FIG. 8, a constant potential is applied to the control wirings CTL during the period of operation of the liquid crystal display device (see also FIG. 5). That is, the direct-current drive is performed for the control wirings CTL. To the source bus lines SL, the video signal in the positive polarity and the video signal in the negative polarity are alternately applied in each one horizontal scanning period. Further, at any time point, the video signal of the same polarity is applied to all the source bus lines SL. In this manner, in the present embodiment, regarding the polarity reversal of pixels, a method referred to as a "1H line-reversal drive" is employed. In the case of performing direct-current drive to the control wirings CTL as in the present embodiment, regarding the polarity reversal of pixels, any of the "1H line-reversal drive", the "dot-reversal drive", and the "column-reversal drive" may be used.

Figure 9:
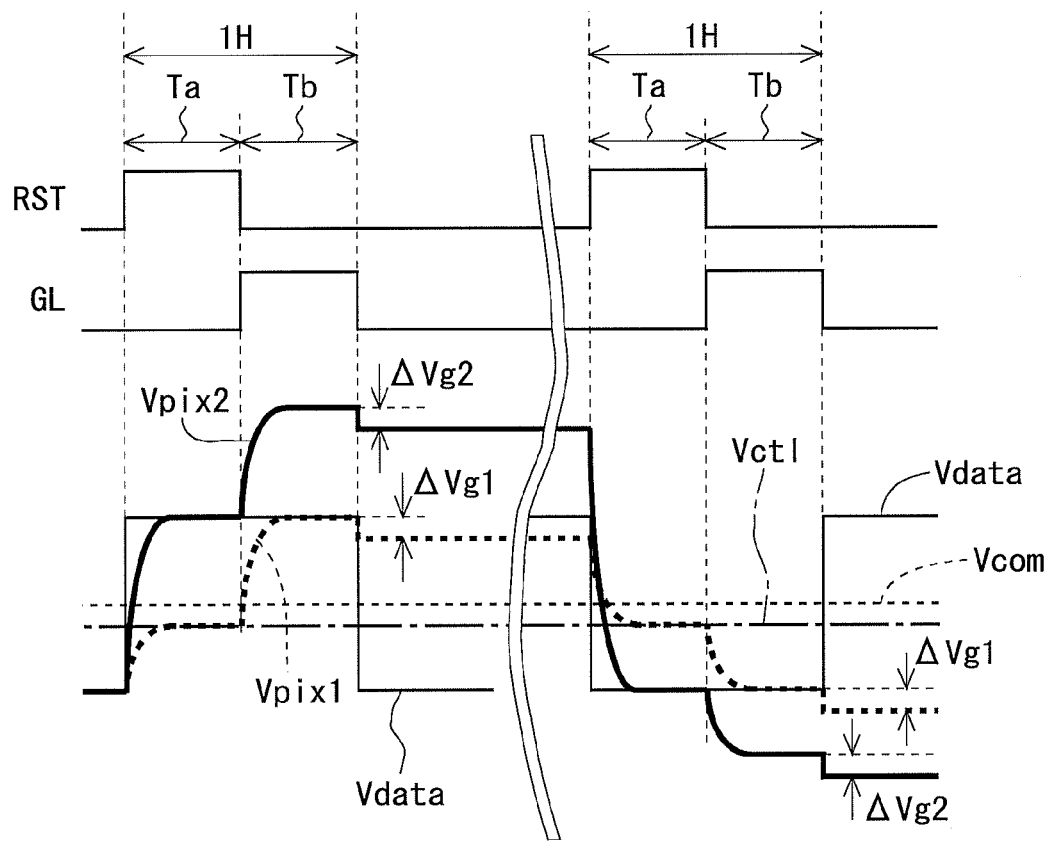
FIG. 9 is a signal waveform diagram for describing the operation of the pixel formation portion in the selection period in the first embodiment.

FIG. 9 is a signal waveform diagram for describing the operation of the pixel formation portion in the selection period in the present embodiment. In this case, attention is given to the pixel formation portion in which the writing in the positive polarity is performed in the odd frame. As described above, the selection period consists of the precharge period Ta and the amplification period Tb. It should be noted that, as shown in FIG. 9, in the present embodiment, the control wiring potential Vct1 is set to a value lower than the common electrode potential Vcom.

In the precharge period Ta, the on-level potential is applied to the reset wiring RST in the state where the off-level potential is applied to the gate bus line GL. Accordingly, the thin film transistor T1 is placed in the off state, and the thin film transistors T2, T3 are placed in the on state. As a result, the video signal potential Vdata is applied to the transparent electrode 112 that functions as the bright display pixel electrode 1012, and the control wiring potential Vct1 is applied to the transparent electrode 111 that functions as the dark display pixel electrode 1011. In the amplification period Tb, the on-level potential is applied to the gate bus line GL in the state where the off-level potential is applied to the reset wiring RST. Accordingly, the thin film transistor T1 is placed in the on state, and the thin film transistors T2, T3 are placed in the off state. As a result, the pixel electrode potential Vpix1 rises from Vct1 to Vdata. Following this, the pixel electrode potential Vpix2 rises by the size V1 expressed by the equation (1). After the amplification period Tb ends, as described above, the pixel electrode potential Vpix1 falls by $\Delta Vg1$, and the pixel electrode potential Vpix2 falls by $\Delta Vg2$. As a result, the value of the pixel electrode potential Vpix1 becomes "Vdata−$\Delta Vg1$", and the pixel electrode potential Vpix2 becomes the value expressed by the equation (2). Voltages of different sizes are applied to the liquid crystal in the dark display pixel and in the bright display pixel in this manner, and the view angle characteristic is improved. It should be noted that, while the operation in the odd frame is described above, a similar operation is also performed in the even frame.

Figure 10:
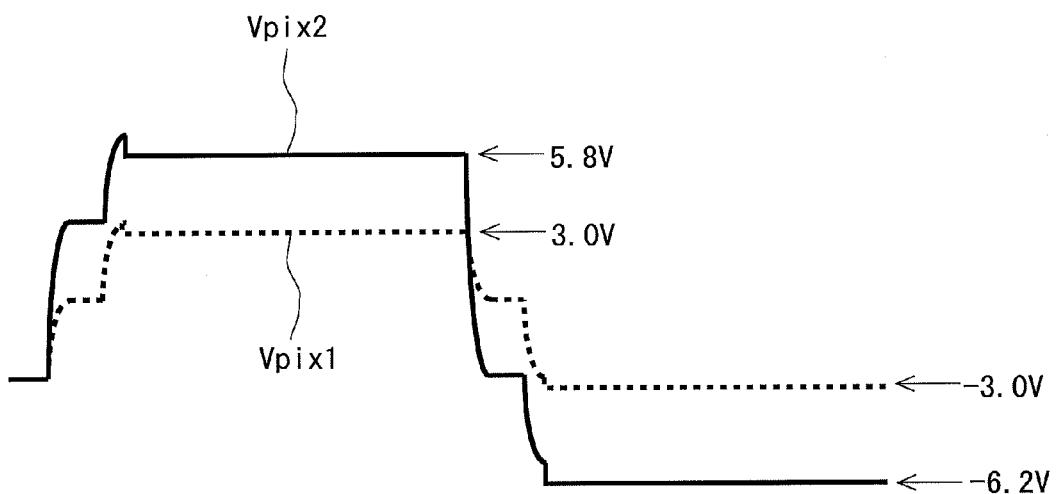
FIG. 10 is a signal waveform diagram for describing a deviation in a liquid crystal application voltage between positive and negative polarities in the first embodiment.

By the way, regarding the voltage variation referred to as the "feed-through voltage" or the "pull-in voltage", in the present embodiment, a size of $\Delta Vg1$ is different from that of $\Delta Vg2$ because of the configuration of the pixel circuit. Therefore, when the control wiring potential Vct1 is not set to a suitable value, even when opposite adjustment (setting of the common electrode potential Vcom taking the above voltage variation into account) is performed based on the dark display pixel, the liquid crystal application voltage when performing the writing in the positive polarity and the liquid crystal application voltage when performing the writing in the negative polarity become different in the bright display pixel. For example, when the pixel electrode potentials Vpix1, Vpix2 change as shown in FIG. 10, in the case where the value of the common electrode potential Vcom is set to 0 V, in the bright display pixel, the liquid crystal application voltage when performing the writing in the negative polarity becomes larger than the liquid crystal application voltage when performing the writing in the positive polarity. As a result of occurrence of a deviation in the liquid crystal application voltage between the positive and negative polarities, reliability of the liquid crystal is reduced (for example, the burn-in of the screen occurs). Accordingly, preferably, the value of the common electrode potential Vcom and the value of the control wiring potential Vct1 are set as follows. It should be noted that the video signal potential at the time of writing in the positive polarity is denoted by Vd1, and the video signal potential at the time of writing in the negative polarity is denoted by Vd2.

First, attention is given to the dark display pixel. "Vpix1=Vd1−ΔVg1" is established in the case of the writing in the positive polarity, and "Vpix1=Vd2−ΔVg1" is established in the case of the writing in the negative polarity. To avoid occurrence of a deviation in the liquid crystal application voltage between the positive and negative polarities, the center values of the liquid crystal application voltages should be set to the value of the common electrode potential Vcom. Therefore, when the center value of the video signal potential Vdata is 0 V, preferably, the value of the common electrode potential Vcom is set to −ΔVg1. More specifically, when the center potential between the maximum potential and the minimum potential that can be applied to the source bus line SL is the reference potential, preferably, the value of the common electrode potential Vcom is set to a value of a potential lower than the reference potential by ΔVg1.

Next, attention is given to the bright display pixel. To avoid occurrence of a deviation in the liquid crystal application voltage between the positive and negative polarities, the center value between the pixel electrode potential Vpix2 at the time of writing in the positive polarity and the pixel electrode potential Vpix2 at the time of writing in the negative polarity needs to be equal to the common electrode potential Vcom that is set as described above. When the pixel electrode potential Vpix2 at the time of writing in the positive polarity is Va and when the pixel electrode potential Vpix2 at the time of writing in the negative polarity is Vb, the following equation (4) should be established.

$$(Va+Vb)/2 = Vcom \quad (4)$$

When it is assumed that Ctr is extremely larger than Clc2 and Cp, from the equation (3), "Va=2Vd1−Vct1−ΔVg2" is established, and "Vb=2Vd2−Vct1−ΔVg2" is established. When these are substituted in the equation (4), the following equation (5) is established.

$$Vct1 = Vd1 + Vd2 - Vcom - \Delta Vg2 \quad (5)$$

When "Vd2=−Vd1" is established, because the value of the common electrode potential Vcom is set to −ΔVg1, the following equation (6) is established.

$$Vct1 = \Delta Vg1 - \Delta Vg2 \quad (6)$$

As described above, preferably, the value of the control wiring potential Vct1 is set based on the voltage variations ΔVg1, ΔVg2 such that the center value between the pixel electrode potential Vpix2 at the time of writing in the positive polarity and the pixel electrode potential Vpix2 at the time of writing in the negative polarity matches the common electrode potential Vcom.

Figure 11:
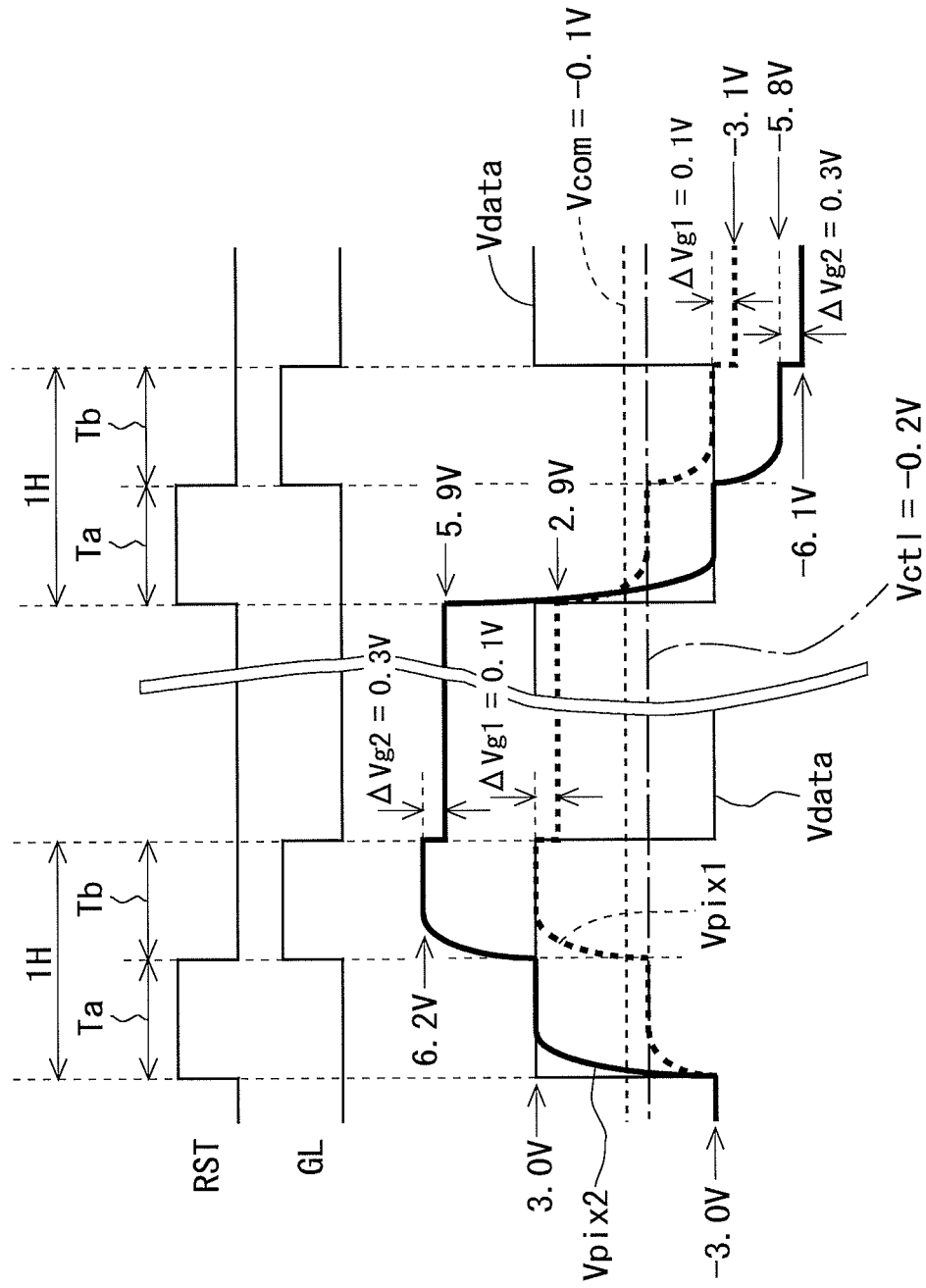
FIG. 11 is a signal waveform diagram for describing an example of the operation of the pixel formation portion in the first embodiment.

For example, when it is assumed that Ctr is extremely larger than Clc2 and Cp, and when the center value of the video signal potential Vdata is 0 V, the voltage variation ΔVg1 is 0.1 V, and the voltage variation ΔVg2 is 0.3 V, the common electrode potential Vcom may be set to −0.1 V and the control wiring potential Vct1 may be set to −0.2 V. In this case, when it is assumed that the video signal potential Vdata varies between −3.0 V and 3.0 V in a certain pixel formation portion, the operation in this pixel formation portion is as follows (see FIG. 11).

First, in the odd frame, in the precharge period Ta, the pixel electrode potential Vpix1 becomes −0.2 V, and the pixel electrode potential Vpix2 becomes 3.0 V. In the amplification period Tb, the pixel electrode potential Vpix1 rises from −0.2 V to 3.0 V. Following this, the pixel electrode potential Vpix2 rises from 3.0 V to 6.2 V. After the amplification period Tb ends, the pixel electrode potential Vpix1 falls from 3.0 V to 2.9 V due to the voltage variation ΔVg1, and the pixel electrode potential Vpix2 falls from 6.2 V to 5.9 V due to the voltage variation ΔVg2. Next, in the even frame, in the precharge period Ta, the pixel electrode potential Vpix1 becomes −0.2 V, and the pixel electrode potential Vpix2 becomes −3.0 V. In the amplification period Tb, the pixel electrode potential Vpix1 falls from −0.2 V to −3.0 V. Following this, the pixel electrode potential Vpix2 falls from −3.0 V to −5.8 V. After the amplification period Tb ends, the pixel electrode potential Vpix1 falls from −3.0 V to −3.1 V due to the voltage variation ΔVg1, and the pixel electrode potential Vpix2 falls from −5.8 V to −6.1 V due to the voltage variation ΔVg2. As described above, the potential from −3.1 V to 2.9 V is applied to the dark display pixel electrode 1011, and the potential from −6.1 V to 5.9 V is applied to the bright display pixel electrode 1012. Accordingly, a deviation in the liquid crystal application voltage between the positive and negative polarities does not occur in both the dark display pixel and the bright display pixel.

1.5 Effects

According to the present embodiment, the bright display pixel electrode potential Vpix2 is set equal to the video signal potential Vdata in the precharge period Ta, and thereafter, is amplified according to the difference between the video signal potential Vdata and the control wiring potential Vct1 in the amplification period Tb. Accordingly, at the end point of the selection period, the dark display pixel electrode potential Vpix1 becomes equal to the video signal potential Vdata, and the bright display pixel electrode potential Vpix2 becomes higher than the video signal potential Vdata. On the other hand, in the liquid crystal display device disclosed in JP 2006-133577 A, at the end point of the selection period, the dark display pixel electrode potential is lower than the video signal potential, and the bright display pixel electrode potential is equal to the video signal potential. From the above, in the liquid crystal display device having the multi-pixel structure, the image display similar to the conventional image display can be performed, even when the amplitude of the video signal is set smaller than the conventional amplitude. Because the amplitude of the video signal can be set smaller than the conventional amplitude, power consumption can be reduced as compared to the conventional power consumption.

Further, according to the present embodiment, by setting the common electrode potential Vcom and the control wiring potential Vct1 to suitable values, occurrence of a deviation in the liquid crystal application voltage between the positive and negative polarities can be suppressed in both the dark display pixel and the bright display pixel, and the decrease in the reliability of the liquid crystal (such as the occurrence of burn-in of the screen) can be suppressed.

Further, according to the present embodiment, the control wirings CTL are arranged so as to extend in parallel with the gate bus lines GL. Since the number of the gate bus lines GL is smaller than the number of the source bus lines SL in the normal liquid crystal display device, the required number of the control wirings CTL becomes small as compared with the configuration in which the control wirings CTL are arranged so as to extend in parallel with the source bus lines SL.

Therefore, reduction in the aperture ratio due to the provision of the control wirings CTL can be suppressed.

2. Second Embodiment

2.1 Configuration

A configuration of the pixel formation portion, an overall configuration, an arrangement relationship between the pixel formation portion and each line, and a layout near the pixel formation portion are similar to those in the first embodiment, and therefore, descriptions thereof are omitted (see FIG. 1, FIG. 4, FIG. 5, and FIG. 6). It should be noted that, in the present embodiment, which of the pixel electrode 1011 and the pixel electrode 1012 becomes the bright display pixel electrode is determined according to the value of the control wiring potential Vct1.

2.2 Driving Method

Figure 12:
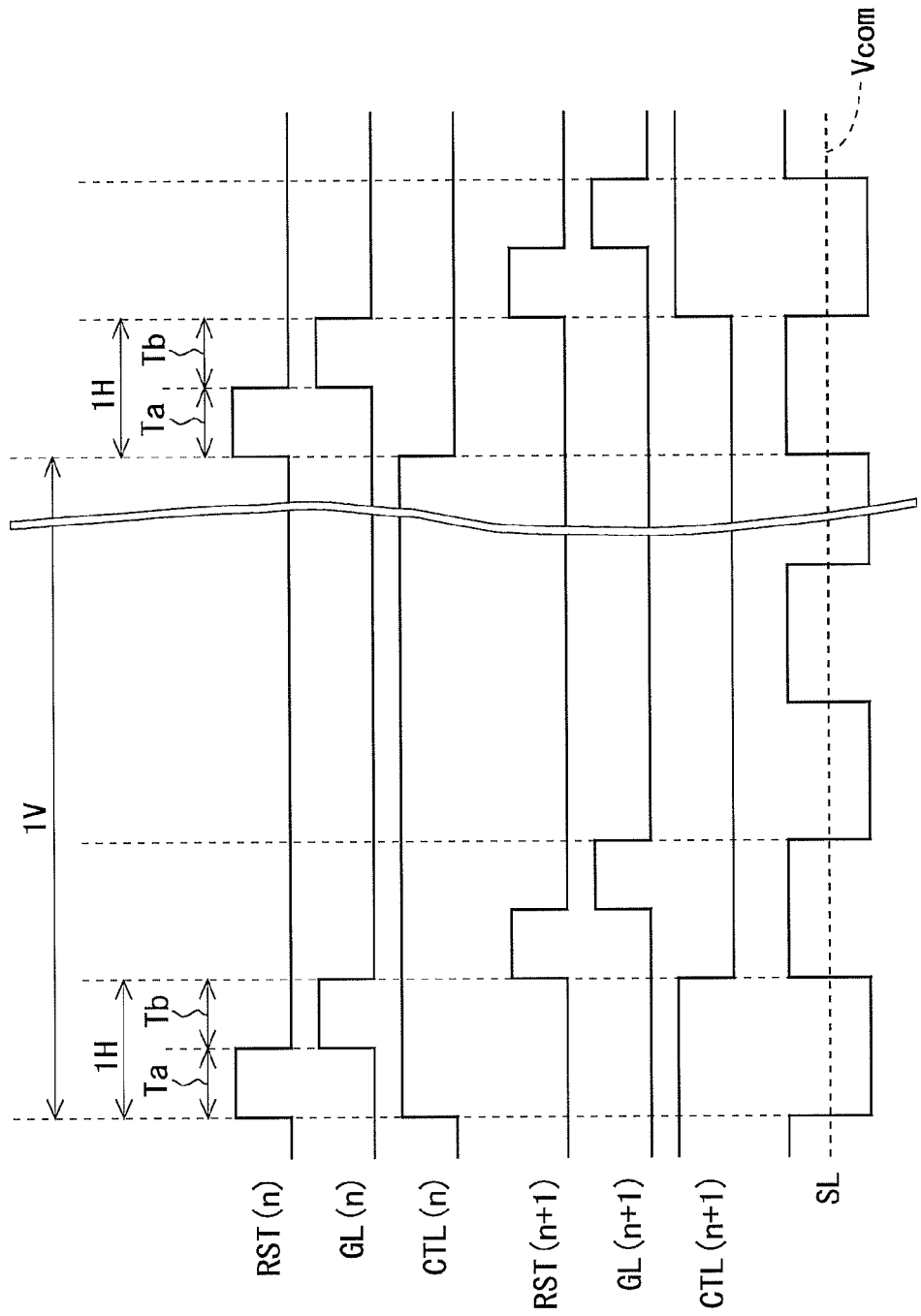
FIG. 12 is a signal waveform diagram for describing a driving method in a second embodiment of the present invention.

In the present embodiment, as shown in FIG. 12, to the control wirings CTL, a constant high level potential and a constant low level potential are alternately applied in each one frame (one vertical scanning period). That is, as for the control wirings CTL, alternate-current drive is performed. To the source bus lines SL, the video signal in the positive polarity and the video signal in the negative polarity are alternately applied in each one horizontal scanning period. Further, at any time point, the video signal of the same polarity is applied to all the source bus lines SL. In this manner, also in the present embodiment, a method referred to as the "1H line-reversal drive" is employed regarding the polarity reversal of pixels.

Figure 13:
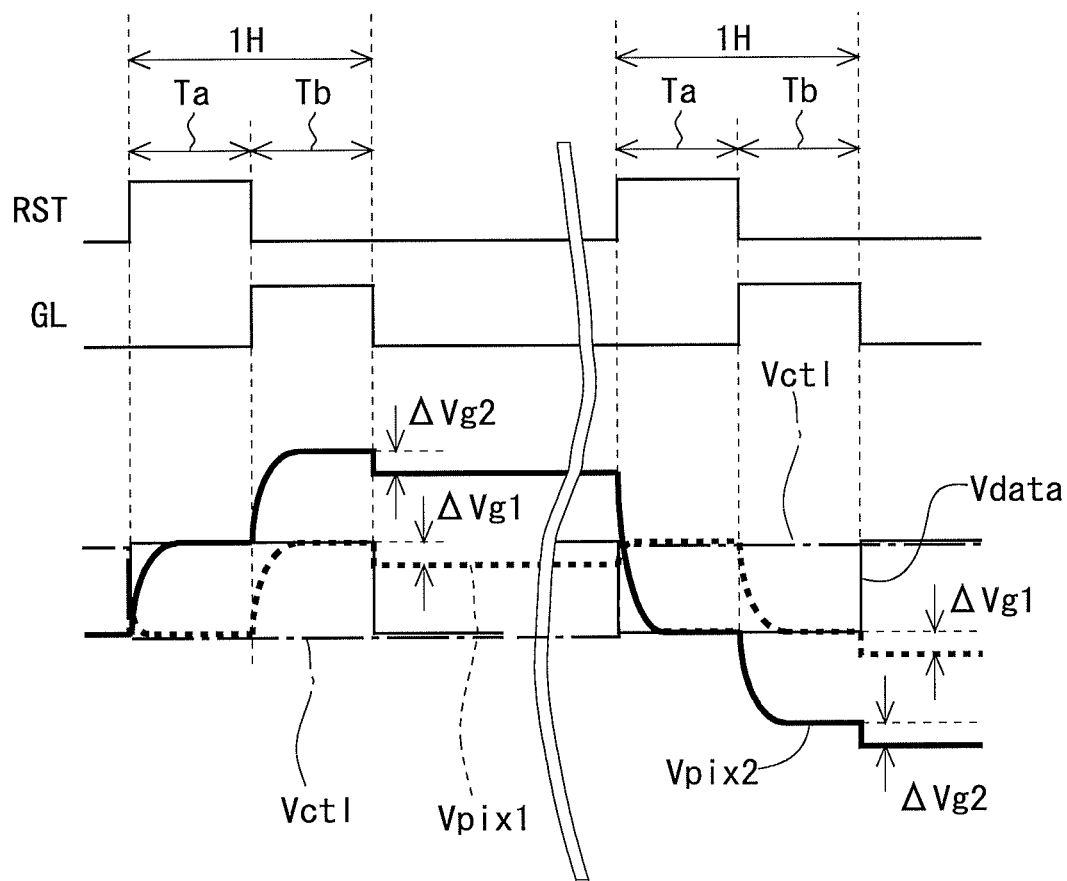
FIG. 13 is a signal waveform diagram for describing an operation of a pixel formation portion in a selection period in the second embodiment.

FIG. 13 is a signal waveform diagram for describing the operation of the pixel formation portion in the selection period in the present embodiment. As shown in FIG. 13, in the present embodiment, the control wiring potential Vct1 is set negative when the writing in the positive polarity is performed (when the potential higher than the common electrode potential Vcom is to be applied to the pixel electrodes 1011, 1012), and the control wiring potential Vct1 is set positive when the writing in the negative polarity is performed (when the potential lower than the common electrode potential Vcom is to be applied to the pixel electrodes 1011, 1012). By alternate-current driving the control wirings CTL in this manner, the amplitude of the pixel electrode potential Vpix2 is set to a size different from that in the first embodiment (in the state where the amplitude of the pixel electrode potential Vpix1 is equal to that in the first embodiment).

Figure 14:
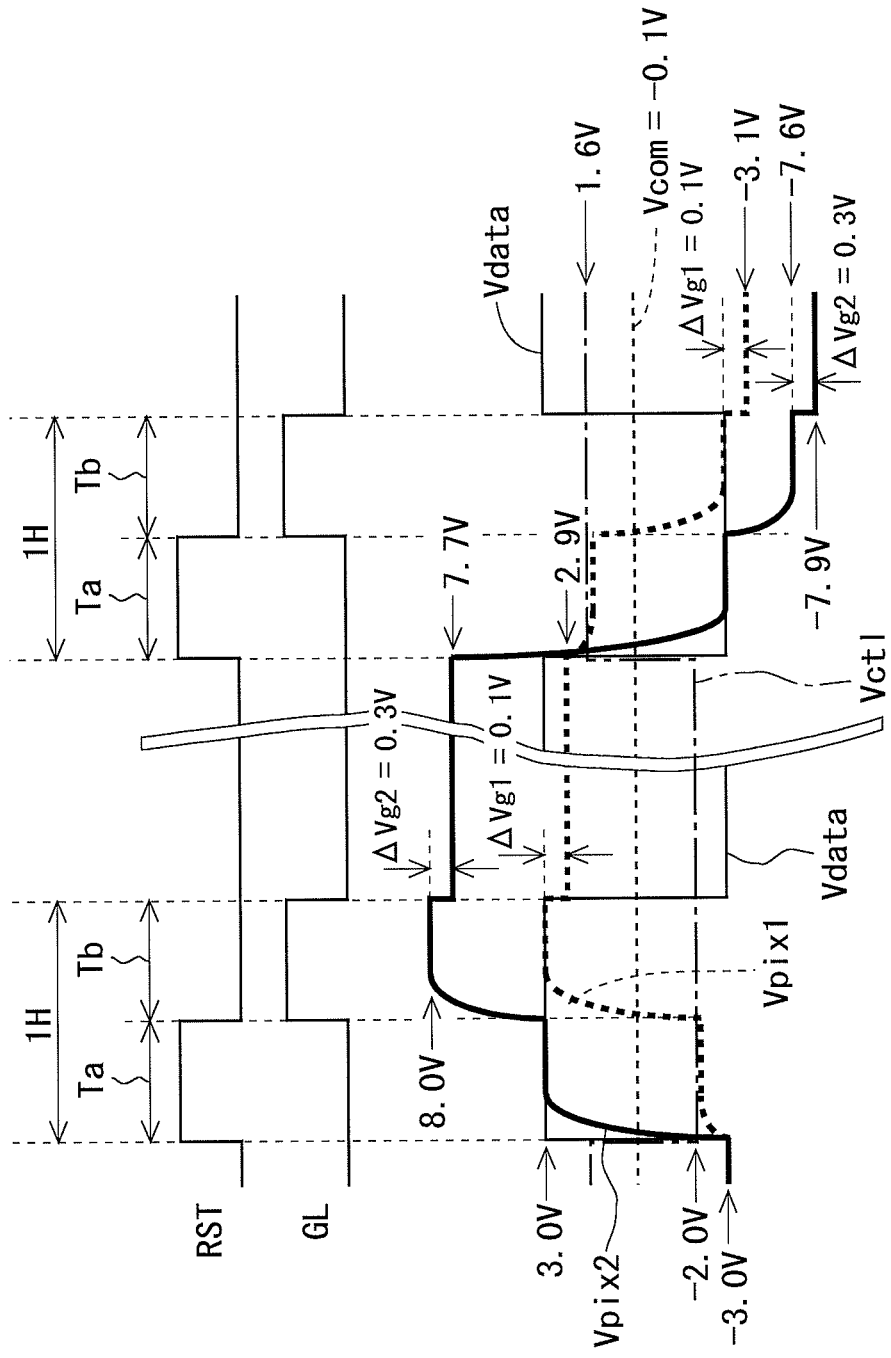
FIG. 14 is a signal waveform diagram for describing an example of the operation of the pixel formation portion in the second embodiment.

For example, when it is assumed that Ctr is extremely larger than Clc2 and Cp, and when the video signal potential Vdata varies between −3.0 V and 3.0 V, the control wiring potential Vct1 at the time of performing the writing in the positive polarity is set to −2.0 V, the control wiring potential Vct1 at the time of performing the writing in the negative polarity is set to 1.6 V, the voltage variation ΔVg1 becomes 0.1 V, and the voltage variation ΔVg2 becomes 0.3 V, the operation of the pixel formation portion in the selection period is as follows (see FIG. 14).

First, in the odd frame, in the precharge period Ta, the pixel electrode potential Vpix1 becomes −2.0 V, and the pixel electrode potential Vpix2 becomes 3.0 V. In the amplification period Tb, the pixel electrode potential Vpix1 rises from −2.0 V to 3.0 V. Following this, the pixel electrode potential Vpix2 rises from 3.0 V to 8.0 V. After the amplification period Tb ends, the pixel electrode potential Vpix1 falls from 3.0 V to 2.9 V due to the voltage variation ΔVg1, and the pixel electrode potential Vpix2 falls from 8.0 V to 7.7 V due to the voltage variation ΔVg2. Next, in the even frame, in the precharge period Ta, the pixel electrode potential Vpix1 becomes 1.6 V, and the pixel electrode potential Vpix2 becomes −3.0 V. In the amplification period Tb, the pixel electrode potential Vpix1 falls from 1.6 V to −3.0 V. Following this, the pixel electrode potential Vpix2 falls from −3.0 V to −7.6 V. After the amplification period Tb ends, the pixel electrode potential Vpix1 falls from −3.0 V to −3.1 V due to the voltage variation ΔVg1, and the pixel electrode potential Vpix falls from −7.6 V to −7.9 V due to the voltage variation ΔVg. As described above, the potential from −3.1 V to 2.9 V is applied to the pixel electrode 1011, and the potential from −7.9 V to 7.7 V is applied to the pixel electrode 1012.

As described above, in comparison with the example (see FIG. 11) shown in the first embodiment, the amplitude of the pixel electrode potential Vpix2 becomes large. Accordingly, the above-described pseudo VT characteristic for the pixel including the pixel electrode 1012 is shifted to the minus direction (the left direction in FIG. 3). As a result, for example, there is obtained the state where "the pseudo VT characteristic as indicated by the solid line of the reference character 71 is obtained for one sub pixel, and the pseudo VT characteristic as indicated by the thick dotted line of the reference character 73 is obtained for the other sub pixel" (see FIG. 3). In this case, it is understood that when the difference between the video signal potential and the common electrode potential is larger, generally, the difference of the transmission rates between the two sub pixels becomes large.

Figure 15:
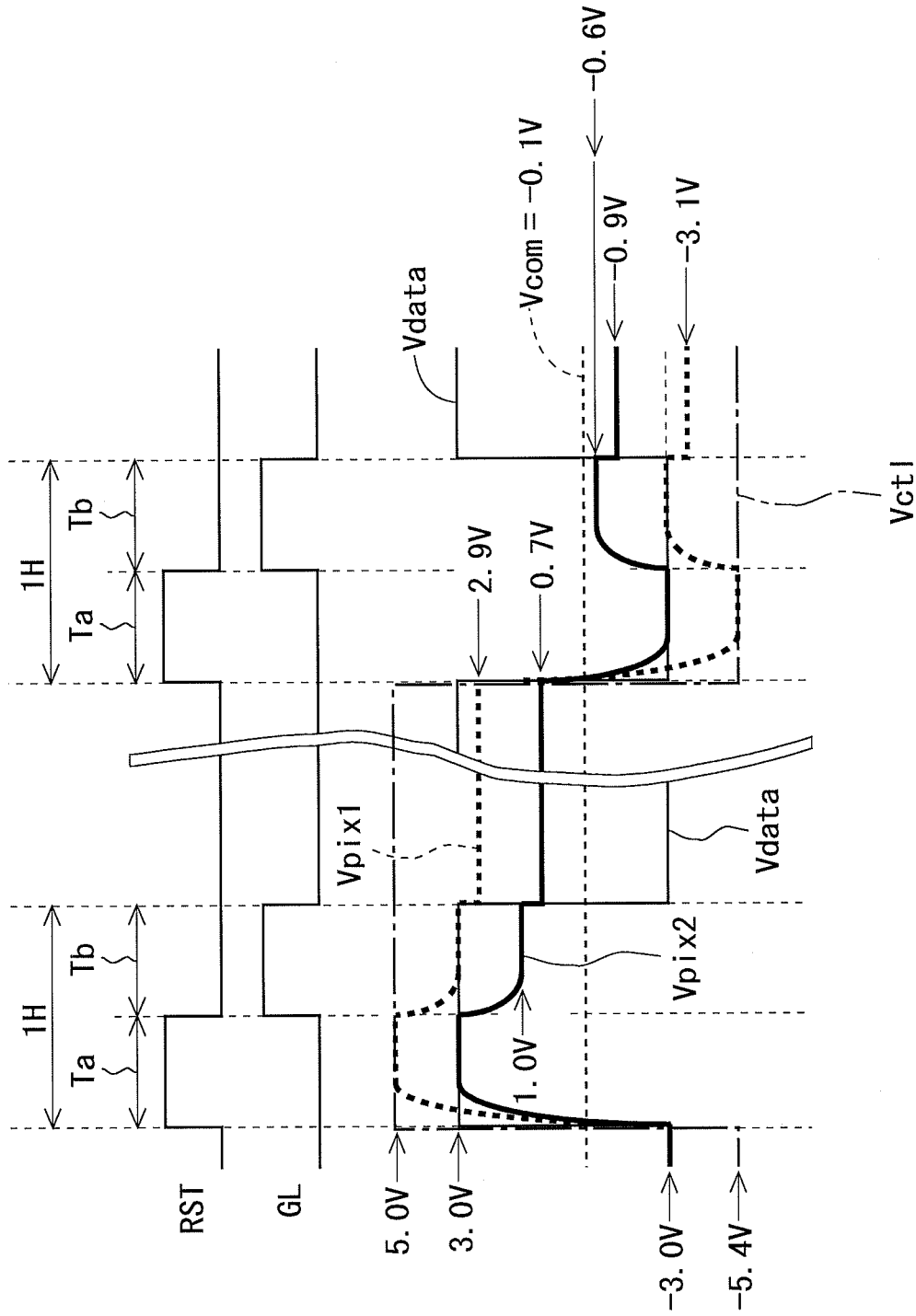
FIG. 15 is a signal waveform diagram for describing an example of the operation of the pixel formation portion in the second embodiment.

Moreover, for example, when it is assumed that Ctr is extremely larger than Clc2 and Cp, and when the video signal potential Vdata varies between −3.0 V and 3.0 V, the control wiring potential Vct1 at the time of performing the writing in the positive polarity is set to 5.0 V, the control wiring potential Vct1 at the time of performing the writing in the negative polarity is set to −5.4 V, the voltage variation ΔVg1 becomes 0.1 V, and the voltage variation ΔVg2 becomes 0.3 V, the operation of the pixel formation portion in the selection period is as follows (see FIG. 15).

First, in the odd frame, in the precharge period Ta, the pixel electrode potential Vpix1 becomes 5.0 V, and the pixel electrode potential Vpix2 becomes 3.0 V. In the amplification period Tb, the pixel electrode potential Vpix1 falls from 5.0 V to 3.0 V. Following this, the pixel electrode potential Vpix2 falls from 3.0 V to 1.0 V. After the amplification period Tb ends, the pixel electrode potential Vpix1 falls from 3.0 V to 2.9 V due to the voltage variation ΔVg1, and the pixel electrode potential Vpix2 falls from 1.0 V to 0.7 V due to the voltage variation ΔVg2. Next, in the even frame, in the precharge period Ta, the pixel electrode potential Vpix1 becomes −5.4 V, and the pixel electrode potential Vpix2 becomes −3.0 V. In the amplification period Tb, the pixel electrode potential Vpix1 rises from −5.4 V to −3.0 V. Following this, the pixel electrode potential Vpix2 rises from −3.0 V to −0.6 V. After the amplification period Tb ends, the pixel electrode potential Vpix1 falls from −3.0 V to −3.1 V due to the voltage variation ΔVg1, and the pixel electrode potential Vpix falls from −0.6 V to −0.9 V due to the voltage variation ΔVg. In this manner, the potential from −3.1 V to 2.9 V is applied to the pixel electrode 1011, and the potential from −0.9 V to 0.7 V is applied to the pixel electrode 1012.

As described above, in comparison with the example (see FIG. 11) shown in the first embodiment, the amplitude of the pixel electrode potential Vpix2 becomes small. Accordingly, the above-described pseudo VT characteristic for the pixel including the pixel electrode 1012 is shifted to the plus direction (the right direction in FIG. 3). As a result, for example, there is obtained the state where "the pseudo VT characteristic as indicated by the solid line of the reference character 71 is obtained for one sub pixel, and the pseudo VT characteristic as indicated by the thick dotted chain line of the reference character 74 is obtained for the other sub pixel" (see FIG. 3). In this case, it is understood that when the difference between the video signal potential and the common electrode potential is smaller, generally, the difference of the transmission rates between the two sub pixels becomes large.

2.3 Effects

According to the present embodiment, the level of the amplification of the pixel electrode potential Vpix2 can be changed by setting the value of the control wiring potential Vct1 at various values. Accordingly, the above-described pseudo VT characteristic for one sub pixel can be shifted in a wide range, and the degree of freedom of view angle compensation improves. Further, since the control wirings CTL are arranged so as to extend in parallel with the gate bus lines GL, similarly to the first embodiment, reduction in the aperture ratio due to the provision of the control wirings CTL can be suppressed.

3. Modifications

Hereinafter, modifications of the above embodiments will be described from four viewpoints, i.e., the layout near the pixel formation portion, the method of polarity reversal of pixels, the configuration of the pixel formation portion, and adjustment of the amplification amount for each color.

Hereinafter, the points different from the first embodiment and the second embodiment will be mainly described.

3.1 About Layout Near Pixel Formation Portion

3.1.1 First Modification

Figure 16:
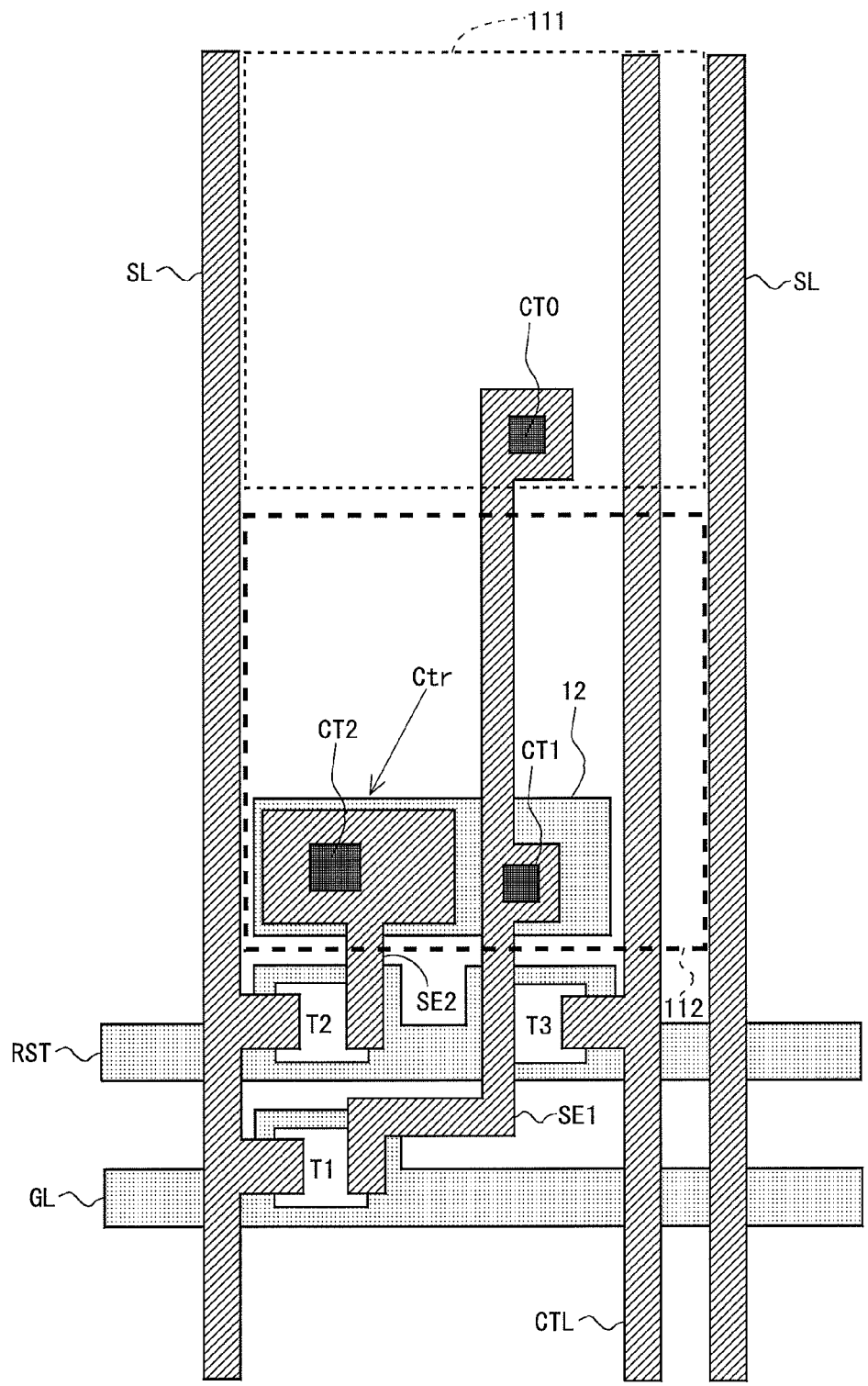
FIG. 16 is a diagram showing a layout near a pixel formation portion in a first modification.

FIG. 16 is a diagram showing a layout near the pixel formation portion in a first modification. Although the control wirings CTL are arranged so as to extend in parallel with the gate bus lines GL in the above embodiments (see FIG. 6), the control wirings CTL are arranged so as to extend in parallel with the source bus lines SL in the present modification. Therefore, in the present modification, the control wirings CTL intersect the gate bus lines GL. Accordingly, the control wirings CTL are formed by the source metal instead of the gate metal. It should be noted that, in the present modification, an arrangement relationship between the pixel formation portion and each line is as shown in FIG. 17, for example.

Figure 17:
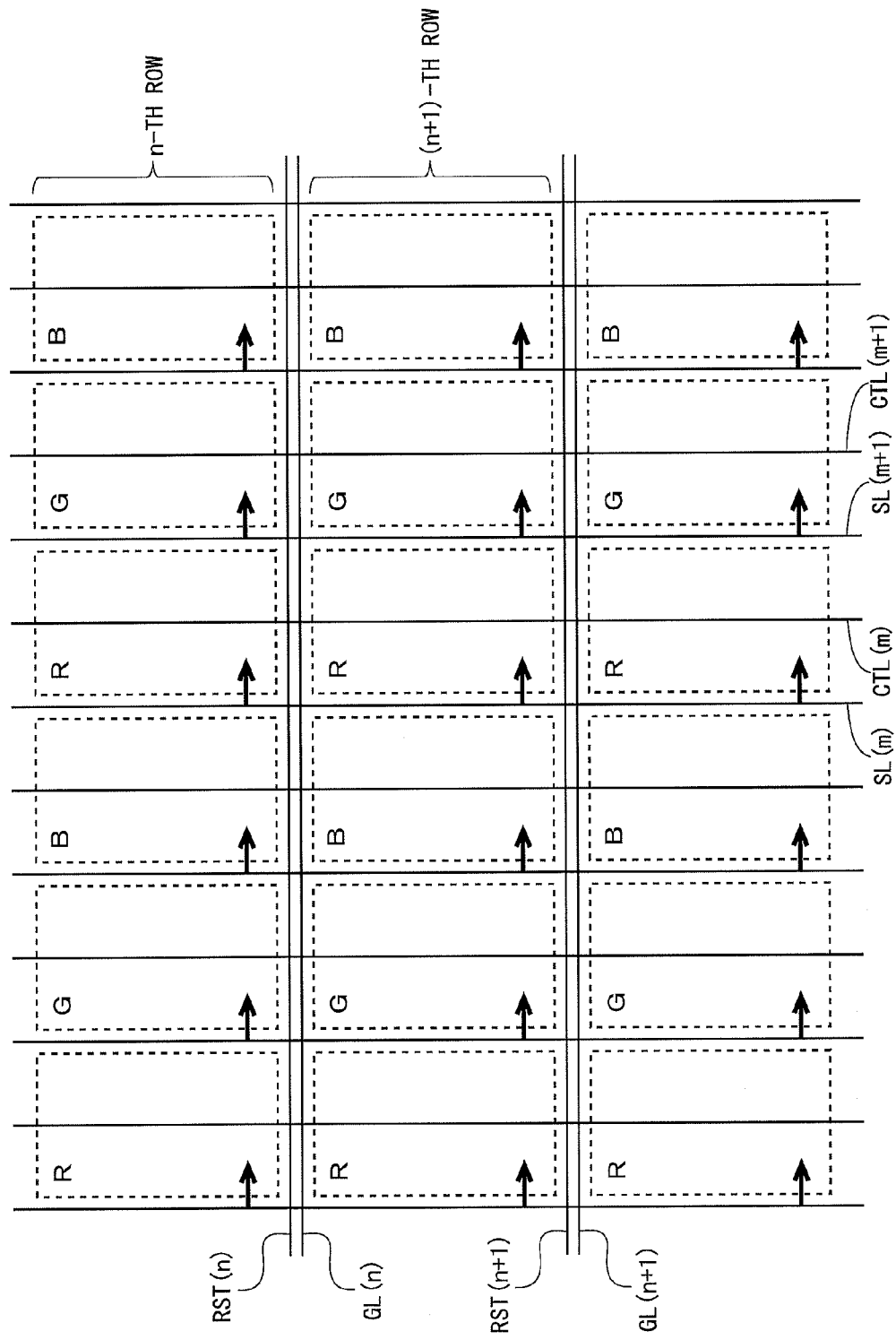
FIG. 17 is a diagram showing an arrangement relationship between the pixel formation portion and each line in the first modification.
Figure 18:
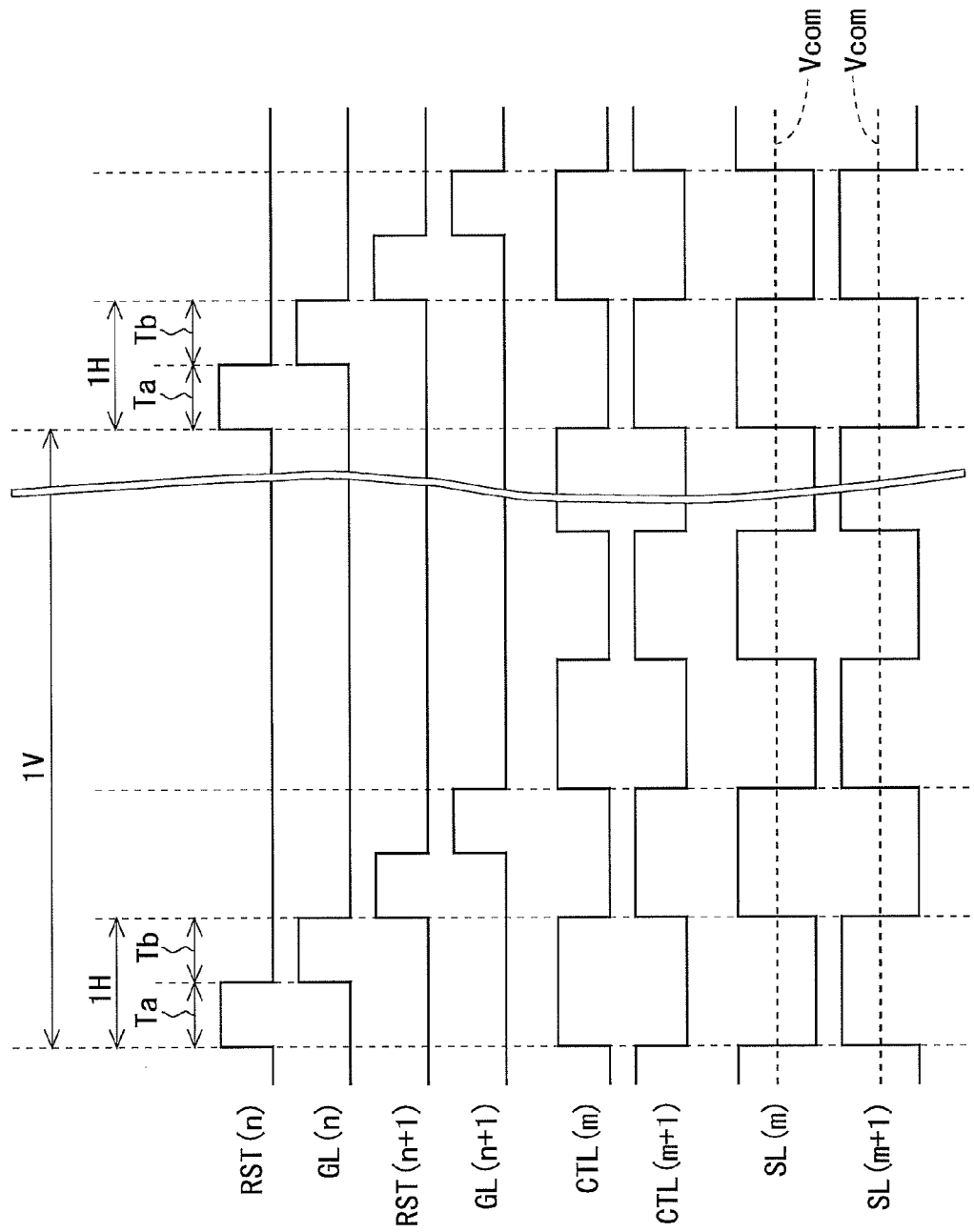
FIG. 18 is a signal waveform diagram for describing a driving method in the first modification.

FIG. 18 is a signal waveform diagram for describing a driving method in the present modification (see also FIG. 17). To the control wiring, a constant high level potential and a constant low level potential are alternately applied in each one horizontal scanning period. That is, as for the control wiring, alternate-current drive is performed. Further, in the adjacent two control wirings (for example, CTL(m) and CTL(m+1)), potentials of mutually different levels are applied. To the source bus lines, similarly to the above embodiments, the video signal in the positive polarity and the video signal in the negative polarity are alternately applied in each one horizontal scanning period (see FIG. 8). However, in the present modification, video signals of mutually different polarities are applied to adjacent two source bus lines (for example, SL(m) and SL (m+1)). As described above, in the present modification, a method called "dot-reversal drive" is employed regarding the polarity reversal of pixels. It should be noted that, in FIG. 18, focusing on the relationship between the video signal potential and the control wiring potential, when a video signal in the positive polarity is applied to a certain source bus line, a low level potential is applied to the control wiring corresponding to the source bus line, and when a video signal in the negative polarity is applied to a certain source bus line, a high level potential is applied to the control wiring corresponding to the source bus line. However, this relationship may be opposite.

In each of the above embodiments, the thin film transistors T3 having the number equal to the number of the source bus lines SL are connected to each control wiring CTL. To all the thin film transistors T3 connected to one control wiring CTL, the precharge potential is applied from the control wiring CTL at the same timing. On the other hand, in the present modification, the precharge potential is not applied at the same timing from one control wiring CTL to a plurality of thin film transistors T3. Therefore, according to the present modification, the load applied to one control wiring CTL when performing the precharge can be minimized.

3.1.2 Second Modification

Figure 19:
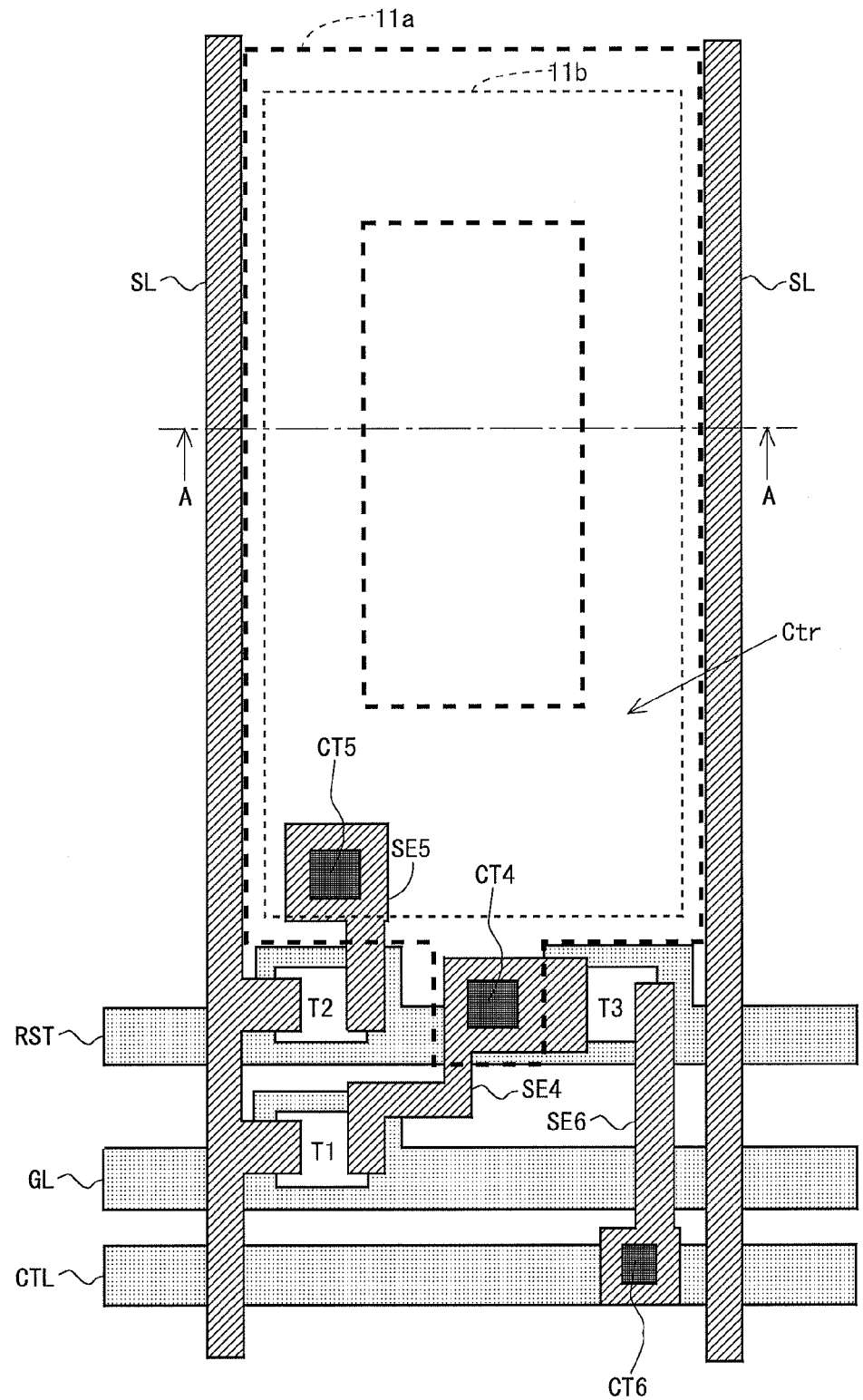
FIG. 19 is a diagram showing a layout near a pixel formation portion in a second modification.
Figure 20:
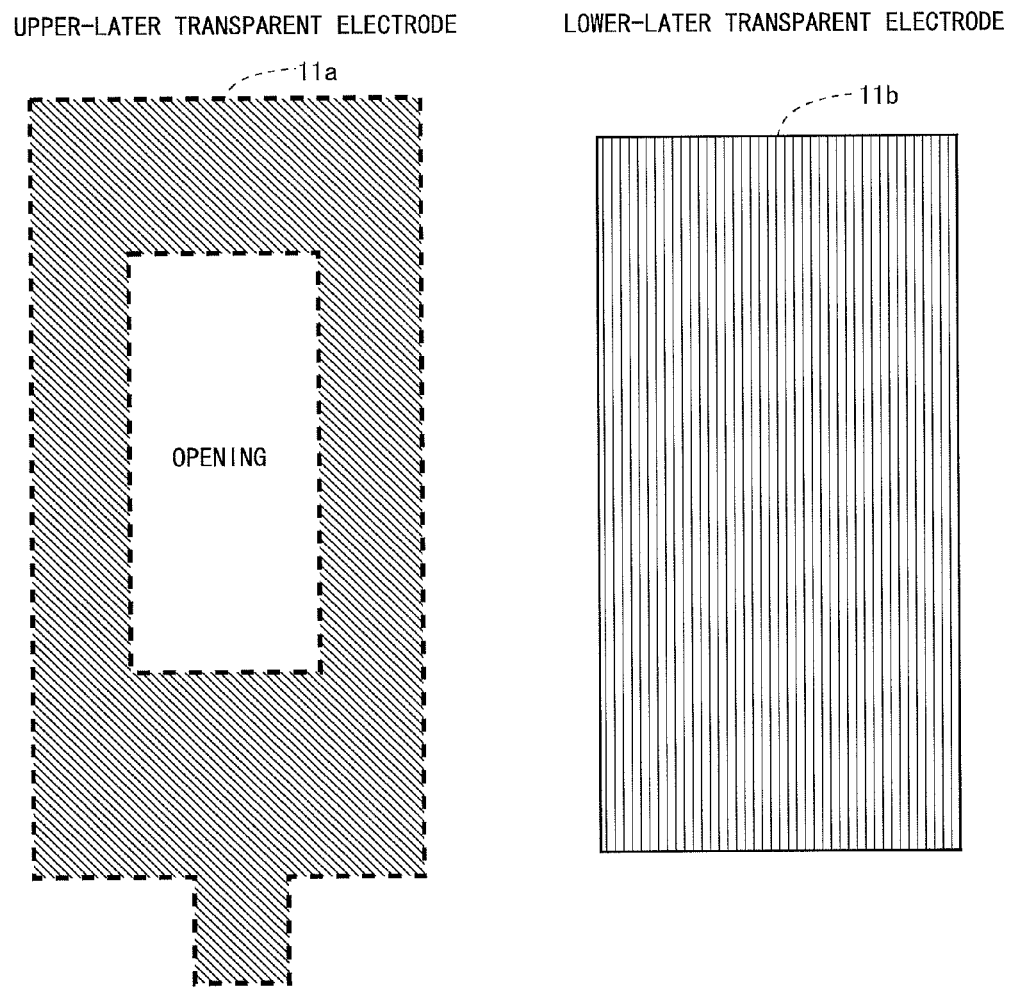
FIG. 20 is a diagram showing shapes of an upper-layer transparent electrode and a lower-layer transparent electrode in the second modification.

FIG. 19 is a diagram showing a layout near the pixel formation portion in the second modification. While the transparent electrode has one layer in each of the above embodiments (see FIG. 6), the transparent electrode has two layers in the present modification. Specifically, out of the region between two adjacent source bus lines SL, in the portion other than the region in which the reset wiring RST, the gate bus line GL, and the control wiring CTL are arranged, there are provided an upper-layer transparent electrode (a first transparent electrode) 11a that functions as the dark display pixel electrode 1011 and a lower-layer transparent electrode (a second transparent electrode) 11b that functions as the bright display pixel electrode 1012, and the second-capacitor Ctr is formed by the upper-layer transparent electrode 11a and the lower-layer transparent electrode 11b. The shapes of the upper-layer transparent electrode 11a and the lower-layer transparent electrode 11b are as shown in FIG. 20.

The drain electrode of the thin film transistor T1 and the upper-layer transparent electrode 11a are electrically connected by the source metal denoted by a reference character SE4 and a contact CT4. The drain electrode of the thin film transistor T2 and the lower-layer transparent electrode 11b are electrically connected by the source metal denoted by a reference character SE5 and a contact CT5. The source electrode of the thin film transistor T3 and the control wiring CTL are electrically connected by the source metal denoted by a reference character SE6 and a contact CT6. The drain electrode of the thin film transistor T3 and the upper-layer transparent electrode 11a are electrically connected by the source metal denoted by the reference character SE4 and the contact CT4.

Figure 21:
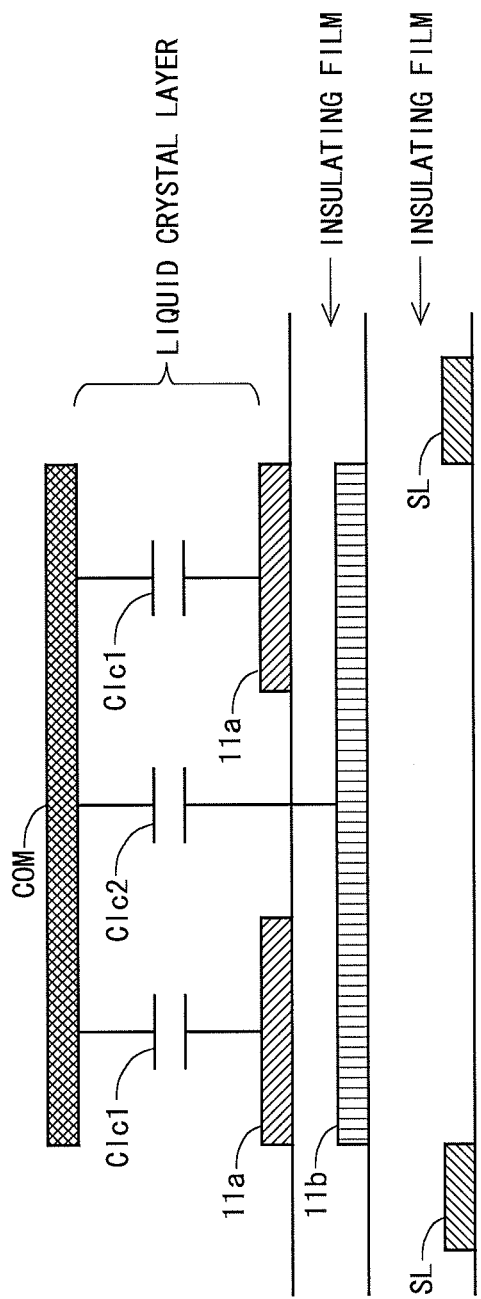
FIG. 21 is a cross-sectional diagram taken along line A-A in FIG. 19.

FIG. 21 is a cross-sectional diagram taken along line A-A in FIG. 19. As shown in FIG. 21, the upper-layer transparent electrode 11a is arranged at the side closer to the common electrode COM than the lower-layer transparent electrode 11b. Moreover, as shown in FIG. 20 and FIG. 21, an opening is provided at the center of the upper-layer transparent electrode 11a. With such a configuration, the first first-capacitor Clc1 is formed by the upper-layer transparent electrode 11a and the common electrode COM, and the second first-capacitor Clc2 is formed by the lower-layer transparent electrode 11b and the common electrode COM.

According to the present modification, the second-capacitor is formed by the transparent two-layer electrode. Therefore, the aperture ratio can be set larger than the aperture ratio in each of the above embodiments (see FIG. 6). Also, the second-capacitor can be set without affecting the aperture ratio (since the electrode is transparent). Further, since the control wirings CTL are arranged so as to extend in parallel with the gate bus lines GL, reduction in the aperture ratio due to the provision of the control wirings CTL can be suppressed similarly to each of the above embodiments.

Herein, description has been made of the example in which the upper-layer transparent electrode 11a functions as the dark display pixel electrode 1011 and the lower-layer transparent electrode 11b functions as the bright display pixel electrode 1012. However, this relationship may be opposite. Further, regarding the upper-layer transparent electrode 11a, although the opening is provided at the center in FIG. 20 and FIG. 21, the electrode having the shape shown as the opening in FIG. 20 may be used for the upper-layer transparent electrode 11a. However, considering the orientation characteristic of the liquid crystal, the bright display sub pixel is preferably arranged at the center part of each pixel.

3.1.3 Third Modification

Figure 22:
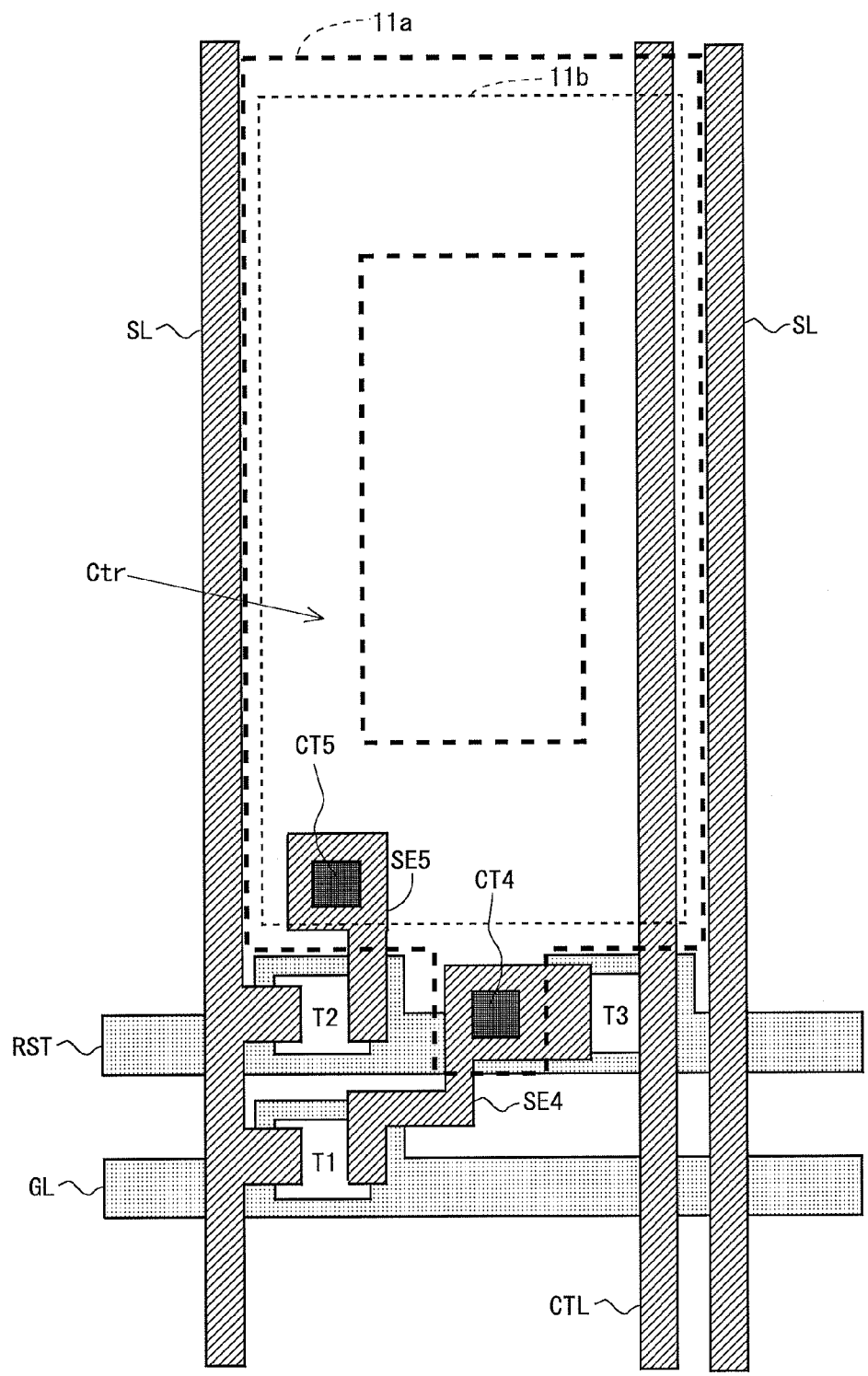
FIG. 22 is a diagram showing a layout near a pixel formation portion in a third modification.

FIG. 22 is a diagram showing a layout near the pixel formation portion in a third modification. Similarly to the first modification, the control wirings CTL are arranged so as to extend in parallel with the source bus lines SL. Similarly to the second modification, the transparent electrode has two layers. It should be noted that the source electrode of the thin film transistor T3 and the control wiring CTL are directly connected as shown in FIG. 22. With the above configuration, similarly to the first modification, the precharge potential is not applied from one control wiring CTL to a plurality of thin film transistors T3 at the same timing, and the load applied to one control wiring CTL when performing the precharge can be minimized. Further, similarly to the second modification, the aperture ratio can be set larger than the aperture ratio in each of the above embodiments, and the second-capacitor can be set without affecting the aperture ratio.

3.1.4 Fourth Modification

Figure 23:
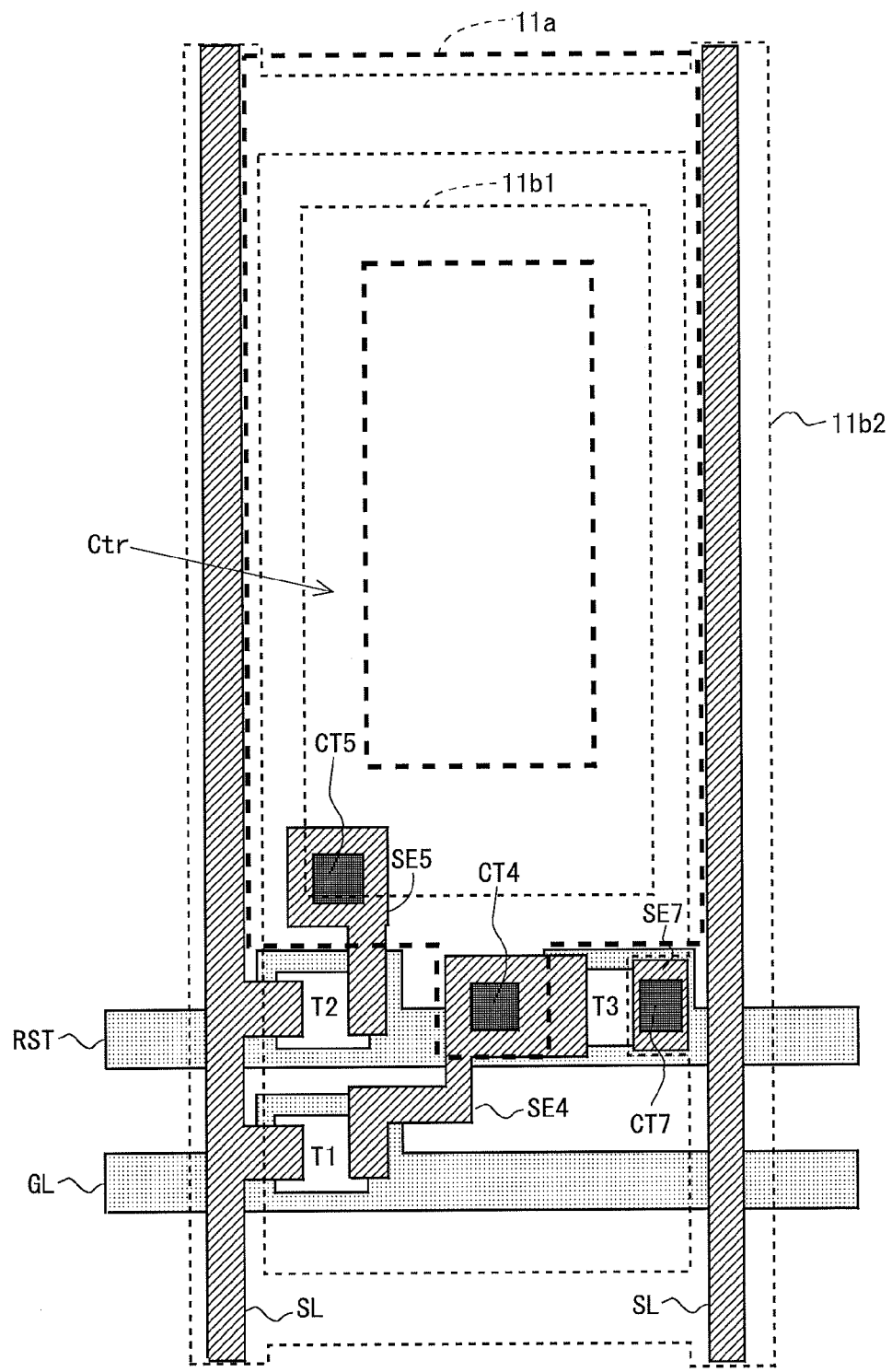
FIG. 23 is a diagram showing a layout near a pixel formation portion in a fourth modification.
Figure 24:
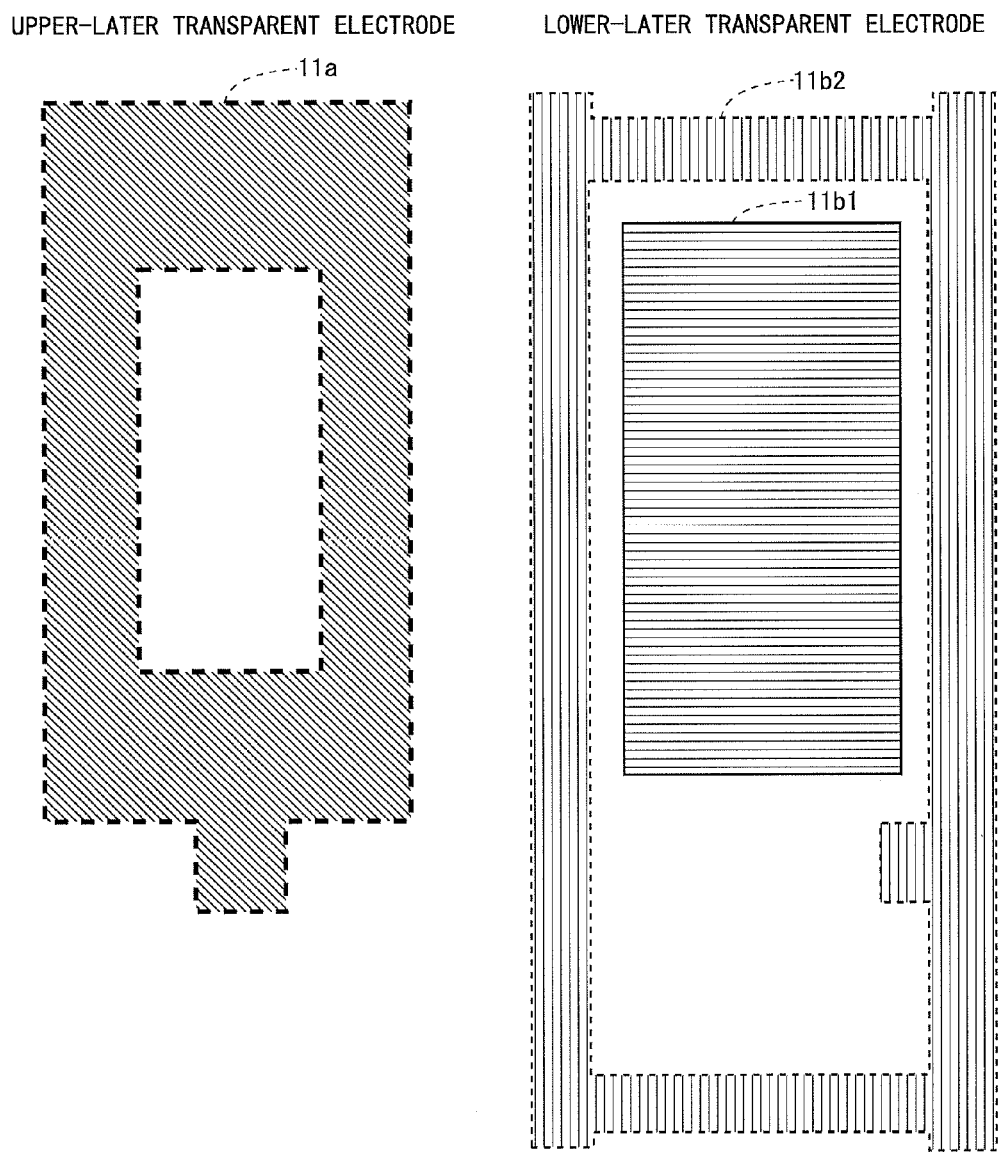
FIG. 24 is a diagram showing shapes of an upper-layer transparent electrode and a lower-layer transparent electrode in the fourth modification.
Figure 25:
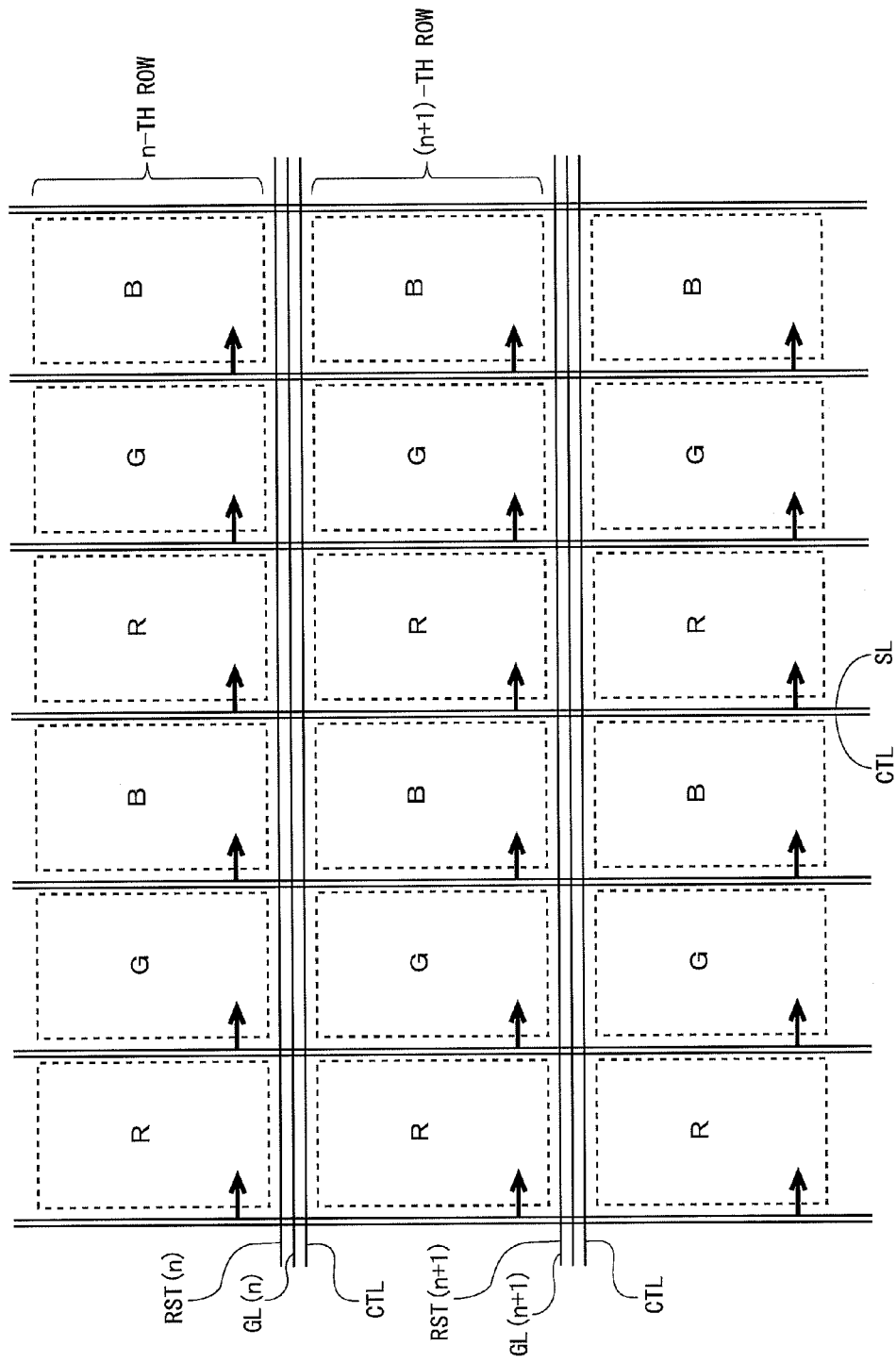
FIG. 25 is a diagram showing an arrangement relationship between the pixel formation portion and each line in the fourth modification.

FIG. 23 is a diagram showing a layout near the pixel formation portion in a fourth modification. In the present modification, shapes of an upper-layer transparent electrode and a lower-layer transparent electrode are as shown in FIG. 24. The upper-layer transparent electrode 11a has a shape similar to that in the second modification. In the present modification, the lower-layer transparent electrode is divided into two portions denoted by a reference character 11b1 and a reference character 11b2 in FIG. 24. One lower-layer transparent electrode 11b1 functions as the bright display pixel electrode 1012, and the other lower-layer transparent electrode 11b2 functions as the control wiring CTL. By using the lower-layer transparent electrode 11b2 having the shape as shown in FIG. 24 for the control wiring CTL, in the present modification, the control wirings CTL are provided in a lattice shape in the display unit 100. The source electrode of the thin film transistor T3 and the control wiring CTL are electrically connected by the source metal denoted by a reference character SE7 and a contact CT7. It should be noted that, in the present modification, an arrangement relationship between the pixel formation portion and each line is as shown in FIG. 25, for example. In the present modification, the lattice-shaped electrode part is realized by the lower-layer transparent electrode 11b2.

Figure 26:
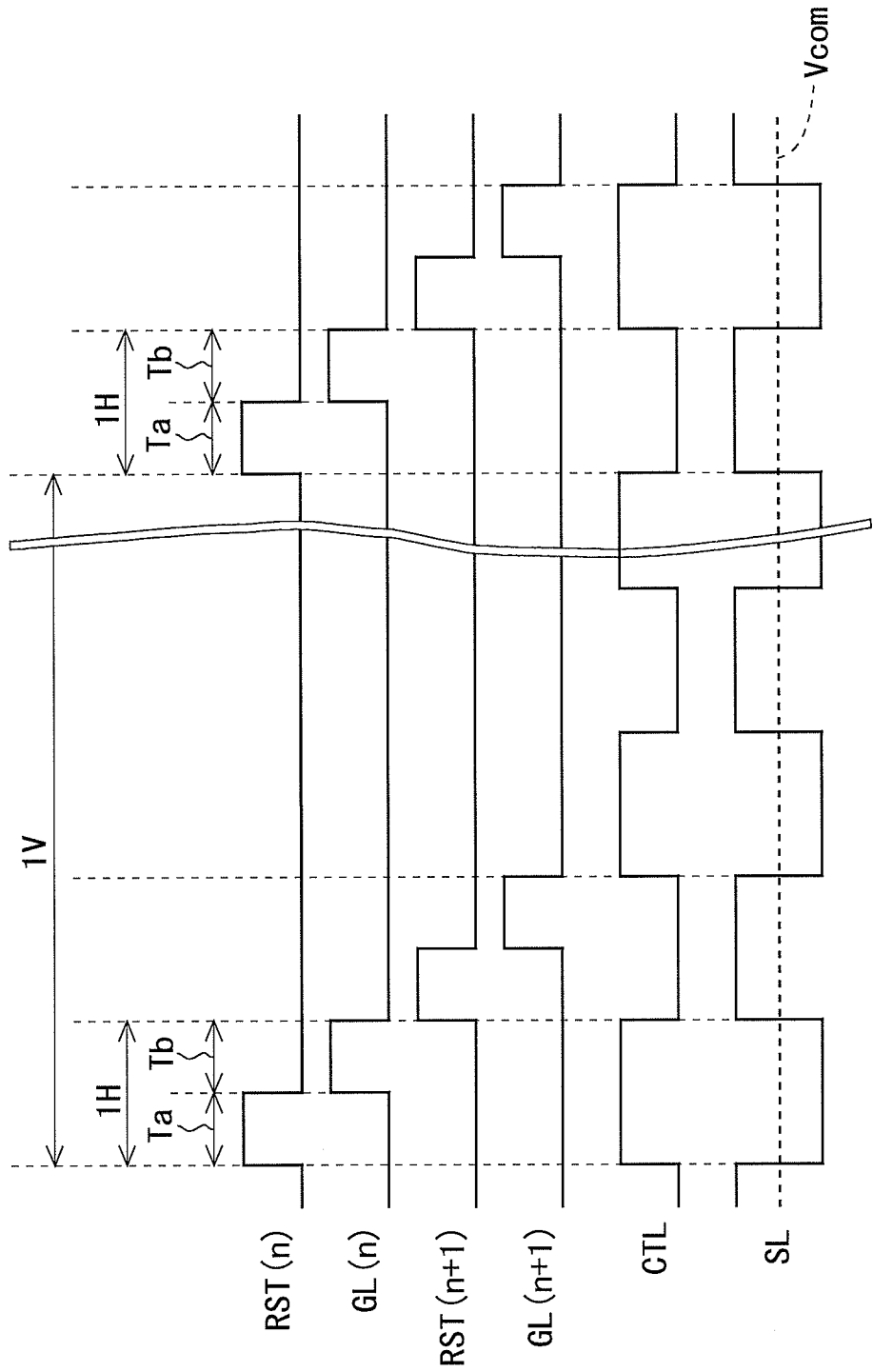
FIG. 26 is a signal waveform diagram for describing a driving method in the fourth modification.

FIG. 26 is a signal waveform diagram for describing a driving method in the present modification (see also FIG. 25). To the control wiring CTL, a constant high level potential and a constant low level potential are alternately applied in each one horizontal scanning period. That is, as for the control wiring CTL, alternate-current drive is performed. To the source bus lines SL, the video signal in the positive polarity and the video signal in the negative polarity are alternately applied in each one horizontal scanning period. Further, at any time point, the video signal of the same polarity is applied to all the source bus lines SL. As described above, in the present modification, the method referred to as the "1H line-reversal drive" is employed regarding the polarity reversal of pixels. It should be noted that, in FIG. 26, focusing on the relationship between the video signal potential and the control wiring potential, a low level potential is applied to the control wiring CTL when a video signal in the positive polarity is applied to the source bus line SL, and a high level potential is applied to the control wiring CTL when a video signal in the negative polarity is applied to the source bus line SL. However, this relationship may be opposite.

According to the present modification, similarly to the second modification, the capacitance value of the second-capacitor Ctr becomes large, and thus, the pixel electrode potential Vpix2 is amplified in a larger size in the amplification period Tb. Therefore, in the liquid crystal display device having the multi-pixel structure, the image display similar to the conventional image display can be performed, while setting the amplitude of the video signal smaller. Accordingly, the power consumption can be more effectively reduced. Further, the control wiring CTL is formed by the transparent electrode. Therefore, the aperture ratio can be improved. Because the control wirings CTL are provided in a lattice shape in the display unit 100, the resistance of the control wiring CTL becomes small. It should be noted that, although there has been described the example in which the control wiring CTL is alternate-current driven, the control wiring CTL may be direct-current driven as shown in FIG. 8.

3.1.5 Fifth Modification

A fifth modification and a sixth modification described below are applied to a liquid crystal display device (hereinafter, referred to as "orientation division-type liquid crystal display device") including a pixel constituted by a plurality of regions in which orientation states of liquid crystals (an inclination direction of liquid crystal molecules) are different from each other. It should be noted that the fifth modification is described by comparing this modification with the second modification (see FIG. 19), and the sixth modification is described by comparing this modification with the third modification (see FIG. 22).

Figure 27:
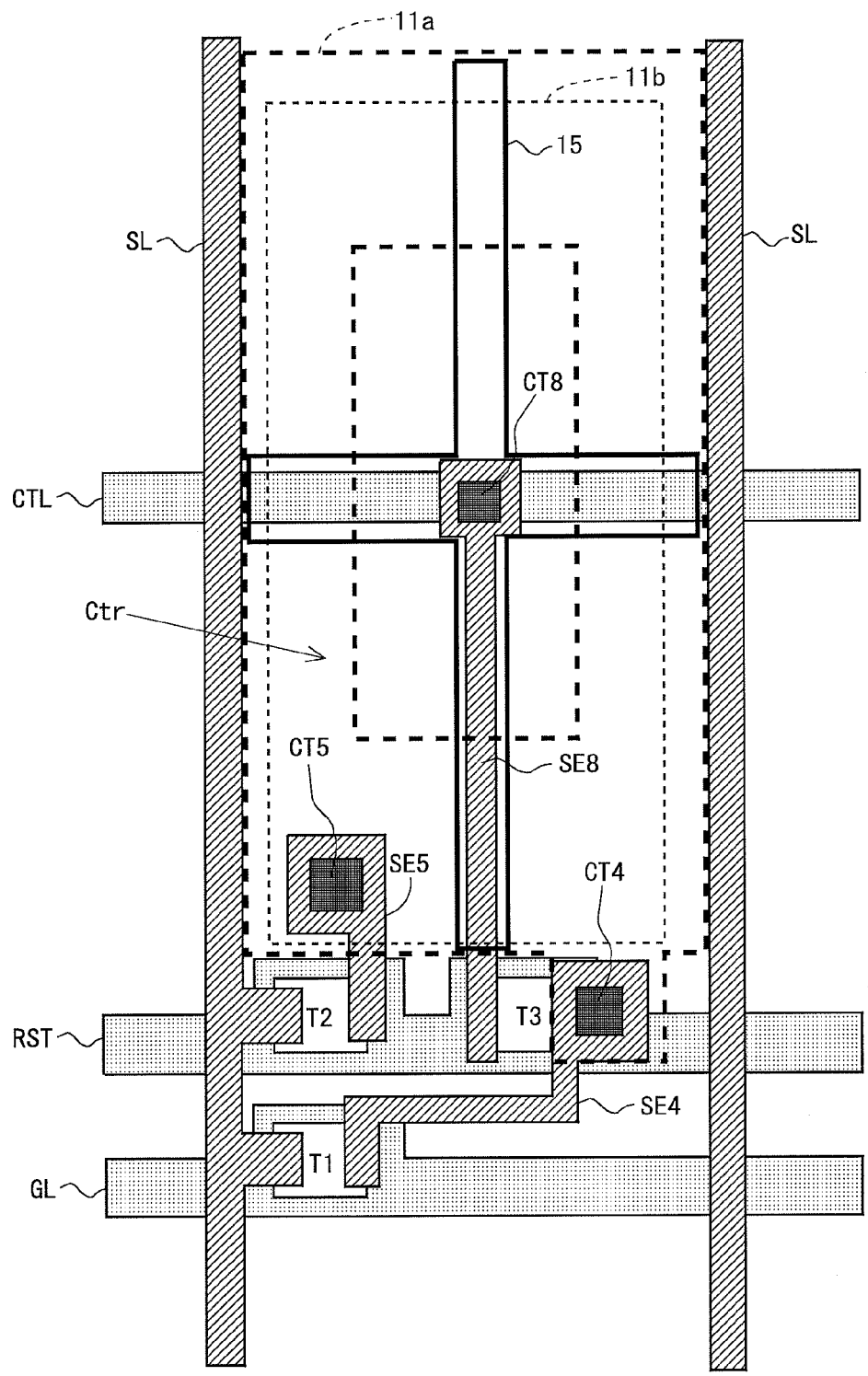
FIG. 27 is a diagram showing a layout near a pixel formation portion in a fifth modification.

FIG. 27 is a diagram showing a layout near the pixel formation portion in the fifth modification. In the second modification, the control wiring CTL is arranged so as not to vertically overlap with the transparent electrode. On the other hand, in the present modification, the control wiring CTL is arranged so as to vertically overlap with the transparent electrode. Specifically, while dark lines 15 are generated in the boundary parts of regions in the display unit 100 in the orientation division-type liquid crystal display device, the control wirings CTL are formed by the gate metals such that the control wirings CTL overlap with the dark lines 15 which are generated so as to extend in parallel with the gate bus lines GL. In this configuration, the source electrode of the thin film transistor T3 and the control wiring CTL are electrically connected by the source metal denoted by a reference character SE8 and a contact CT8.

According to the present modification, in the orientation division-type liquid crystal display device, because the control wirings CTL are formed so as to overlap with the dark lines 15, reduction in the aperture ratio due to the provision of the control wirings CTL can be effectively suppressed. It should be noted that, also in the case where the transparent electrode is configured by one layer as in each of the above embodiments, the control wirings CTL can be formed to overlap with the dark lines 15 which are generated so as to extend in parallel with the gate bus lines GL.

In the present modification and the sixth modification described later, the bright display sub pixel is preferably arranged at the center part of each pixel formation portion. Accordingly, suitable display considering the orientation characteristic of the liquid crystal is performed. Further, the orientation center of the bright display sub pixel preferably matches the orientation center of the dark display sub pixel. Accordingly, because the orientation center of the bright display sub pixel matches the orientation center of the dark display sub pixel, the number of dark lines can be reduced, and reduction in the transmission rate caused by the dark lines can be suppressed. Regarding this point, for example, when the transparent electrode is configured by one layer (see FIG. 6), dark lines are generated in the vertical direction and the lateral direction both in the two transparent electrodes, whereby the transmission rate falls.

3.1.6 Sixth Embodiment

Figure 28:
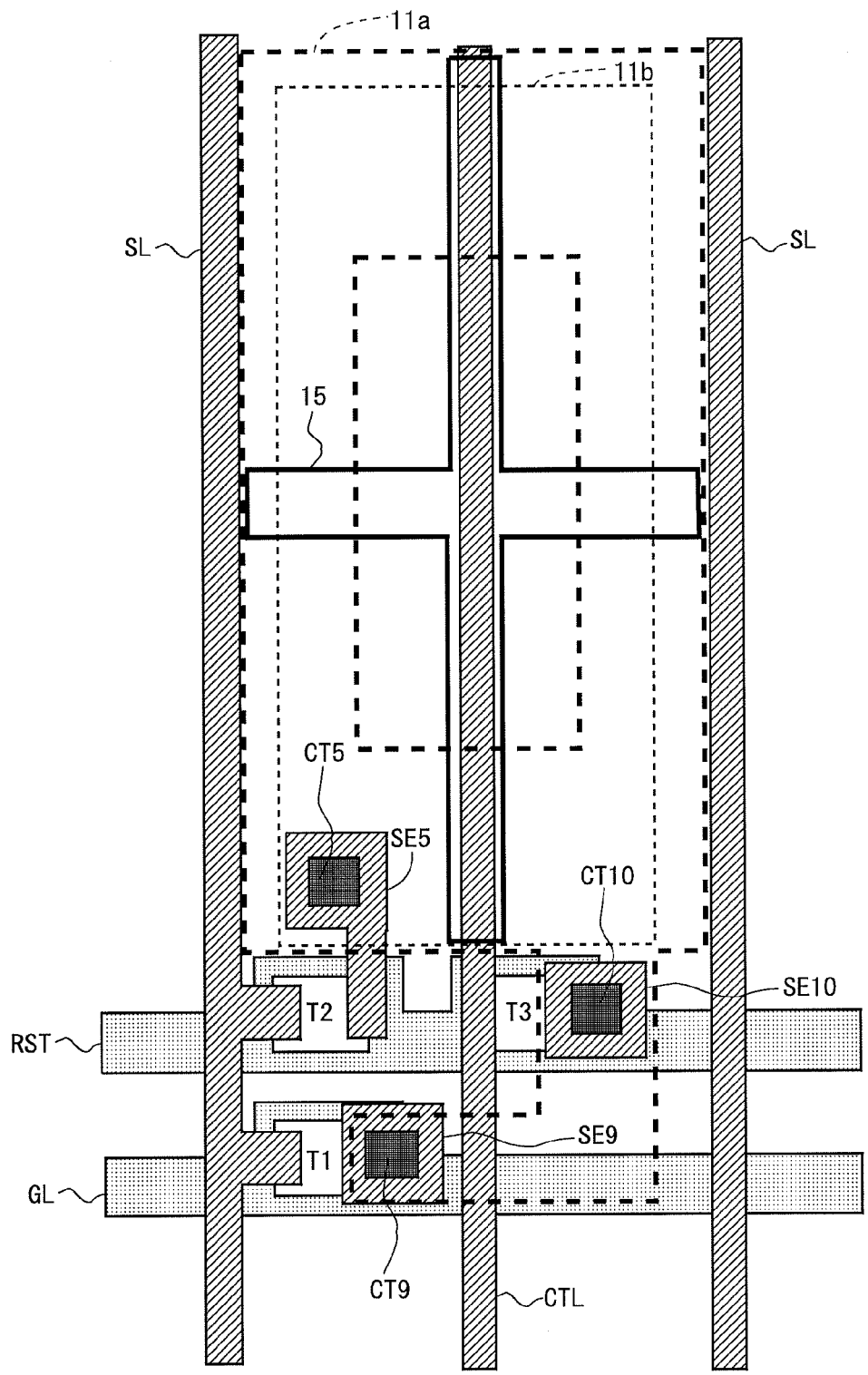
FIG. 28 is a diagram showing a layout near a pixel formation portion in a sixth modification.

FIG. 28 is a diagram showing a layout near the pixel formation portion in a sixth modification. In the third modification, the control wiring CTL is arranged so as to vertically overlap with the end part of the lower-layer transparent electrode 11b. On the other hand, in the present modification, the control wirings CTL is arranged so as to vertically overlap with the center part of the lower-layer transparent electrode 11b. Specifically, the control wirings CTL are formed by the source metal so that the control wirings CTL overlap with the dark lines 15 which are generated so as to extend in parallel with the source bus lines SL. In such a configuration, the drain electrode of the thin film transistor T1 and the upper-layer transparent electrode 11a are electrically connected by the source metal denoted by a reference character SE9 and the contact CT9. The drain electrode of the thin film transistor T3 and the upper-layer transparent electrode 11a are electrically connected by the source metal denoted by a reference character SE10 and a contact CT10.

According to the present modification, similarly to the fifth modification, in the orientation division-type liquid crystal display device, because the control wirings CTL are formed so as to overlap with the dark lines 15, reduction in the aperture ratio due to the provision of the control wirings CTL can be effectively suppressed. It should be noted that, also in the case where the transparent electrode is configured by one layer as in each of the above embodiments, the control wirings CTL can also be formed to overlap with the dark lines 15 which are generated so as to extend in parallel with the source bus lines SL.

3.1.7 Seventh Modification

Figure 29:
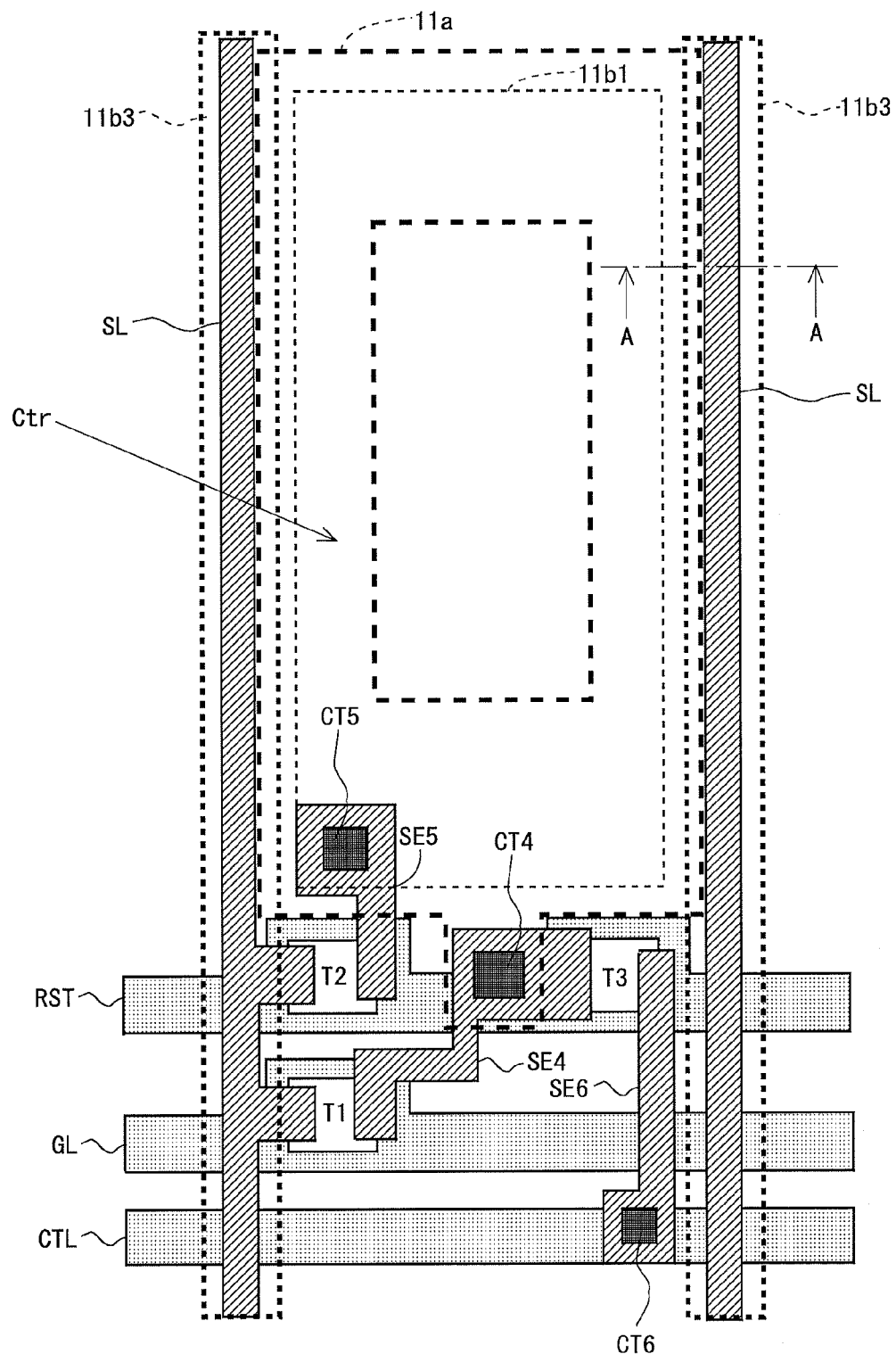
FIG. 29 is a diagram showing a layout near a pixel formation portion in a seventh modification.

FIG. 29 is a diagram showing a layout near the pixel formation portion in a seventh modification. In the present modification, the lower-layer transparent electrode is divided into a portion 11b1 that functions as the bright display pixel electrode 1012 and a portion (hereinafter, referred to as "shield electrode part") 11b3 that reduces the parasitic capacitance formed between the transparent electrode (the upper-layer transparent electrode and the lower-layer transparent electrode) and the source bus line SL. That is, the configuration of the present modification is a configuration where the shield electrode part 11b3 is added to the configuration of the second modification (see FIG. 19). It should be noted that the common electrode potential Vcom is applied to the shield electrode part 11b3, for example.

Figure 30:
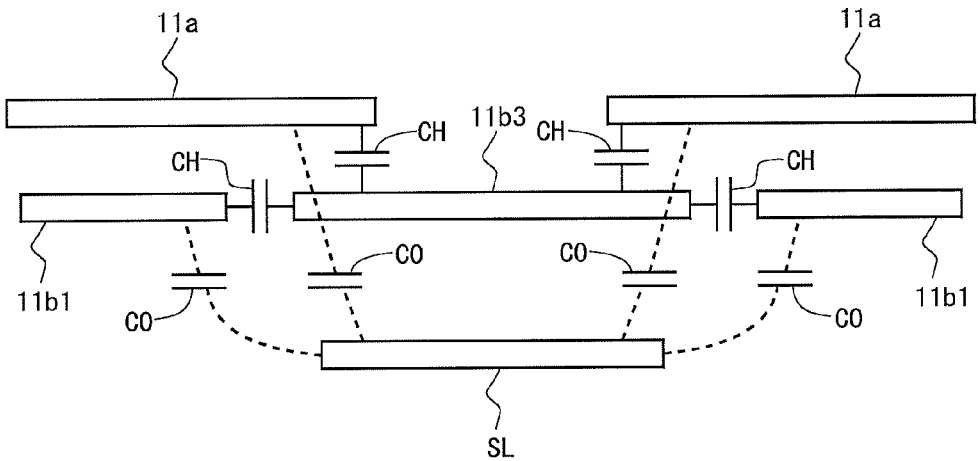
FIG. 30 is a cross-sectional diagram taken along line A-A in FIG. 29.
Figure 31:
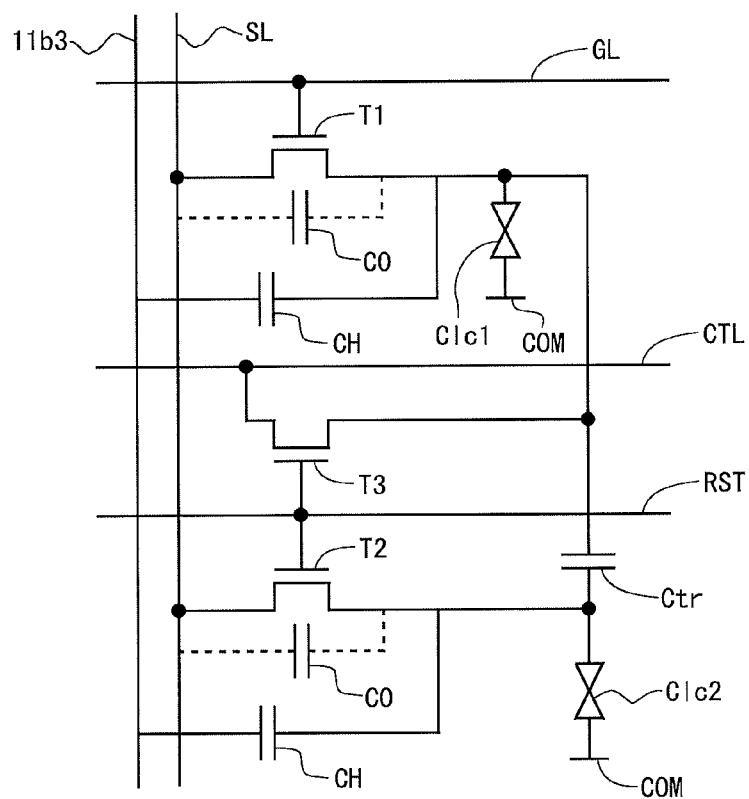
FIG. 31 is an equivalent circuit diagram including a parasitic capacitance between a source bus line and a transparent electrode and a capacitance formed between a shield electrode and the transparent electrode in the seventh modification.

FIG. 30 is a cross-sectional diagram taken along line A-A in FIG. 29. FIG. 30 also shows the upper-layer transparent electrode and the lower-layer transparent electrode in the right adjacent pixel formation portion of the pixel formation portion shown in FIG. 29. As shown in FIG. 30, the shield electrode part 11b3 is formed in the region between the source bus line SL and the upper-layer transparent electrode 11a. By providing the shield electrode part 11b3 in this manner, a parasitic capacitance C0 between the source bus line and the transparent electrode (the transparent electrode excluding the shield electrode part) is reduced. It should be noted that, in the present modification, the shield electrode part 11b3 is formed so as to cover the source bus line SL. FIG. 31 is an equivalent circuit diagram including the parasitic capacitance C0 between the source bus line and the transparent electrode and the capacitance CH formed between the shield electrode part and the transparent electrode. As can be seen from FIG. 31, the capacitance CH formed between the shield electrode part and the transparent electrode functions as an auxiliary capacitor, and the influence that the variation in the video signal potential (the potential of the source bus line SL) gives to the pixel electrode potentials Vpix1, Vpix2 can be effectively reduced.

3.1.8 Eighth Modification

Figure 32:
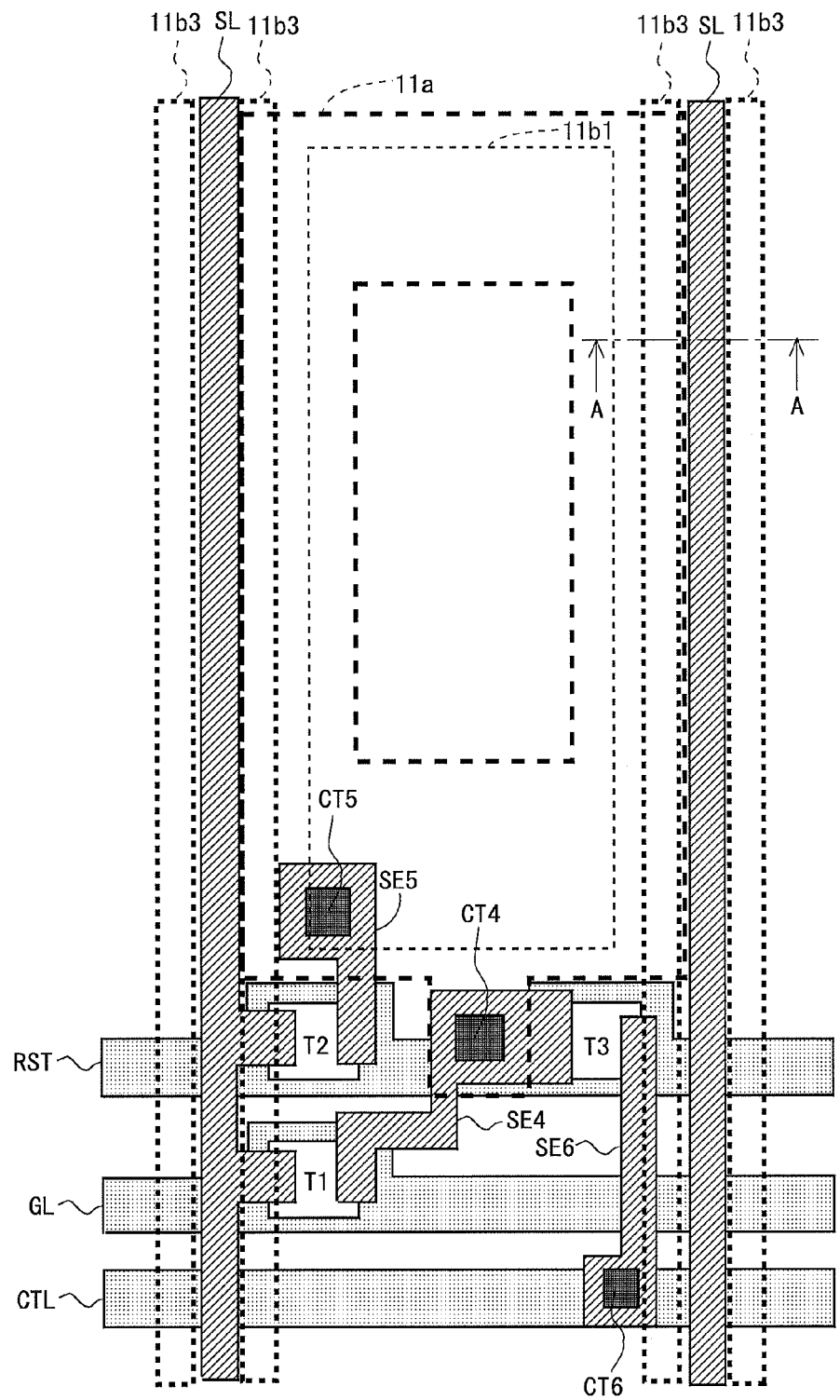
FIG. 32 is a diagram showing a layout near a pixel formation portion in an eighth modification.
Figure 33:
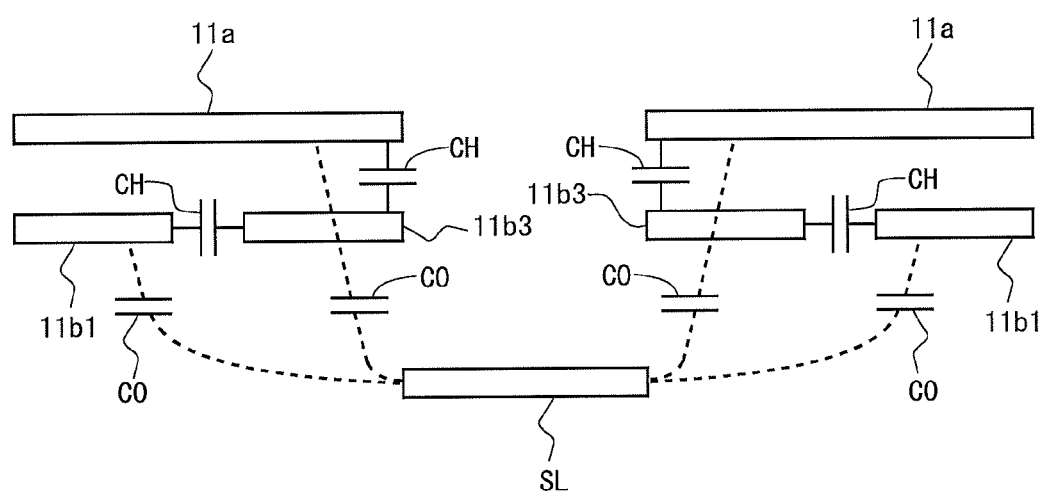
FIG. 33 is a cross-sectional diagram taken along line A-A in FIG. 32.

FIG. 32 is a diagram showing a layout near the pixel formation portion in an eighth modification. FIG. 33 is a cross-sectional diagram taken along line A-A in FIG. 32. In the seventh modification, the shield electrode part 11b3 is formed so as to cover the source bus line SL. However, in the present modification, the shield electrode parts 11b3 are formed to be positioned at both sides of the source bus line SL in the planar view. That is, the shield electrode parts 11b3 are formed so as not to overlap with the source bus line SL, in the region between the source bus line SL and the lower-layer transparent electrode (the portion that functions as the bright display pixel electrode 1012) 11b1 in the direction to which the gate bus line GL extends.

According to the present modification, as compared with the seventh modification, the capacitor formed between the source bus line SL and the shield electrode part 11b3 can be reduced. Therefore, an effect similar to that of the seventh modification can be obtained, and the wiring capacitance of the source bus line SL can be reduced.

3.1.9 Ninth Modification

Figure 34:
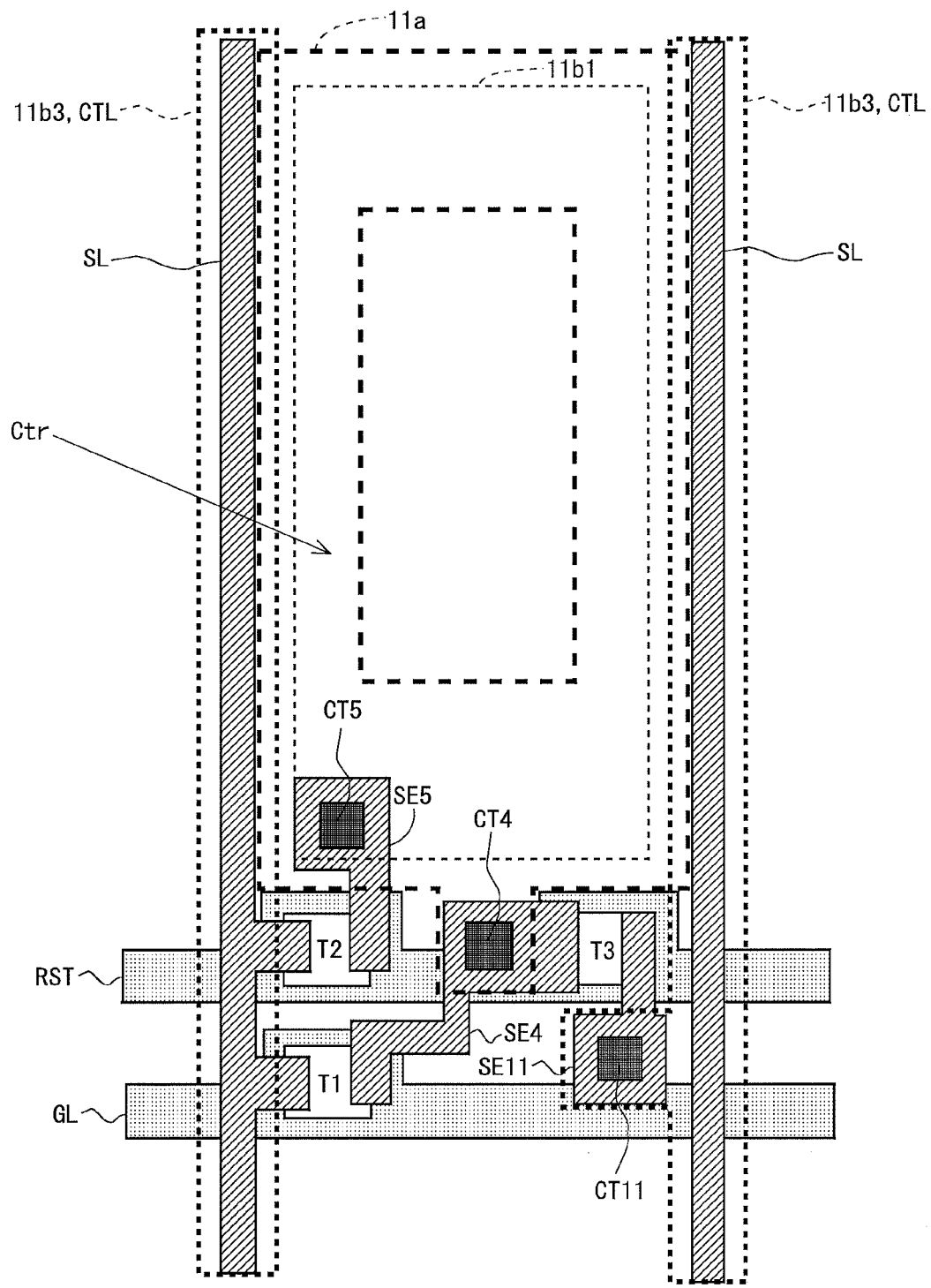
FIG. 34 is a diagram showing a layout near a pixel formation portion in a ninth modification.

FIG. 34 is a diagram showing a layout near the pixel formation portion in a ninth modification. In the present modification, the shield electrode part 11b3 in the seventh modification (see FIG. 29) is configured to also function as the control wiring CTL. Therefore, unlike in the seventh modification, the control wirings CTL extending in parallel with the gate bus lines GL are not provided. In such a configuration, the source electrode of the thin film transistor T3 and the shield electrode part 11b3 (the control wiring CTL) are electrically connected by the source metal denoted by a reference character SE11 and a contact CT11.

Figure 35:
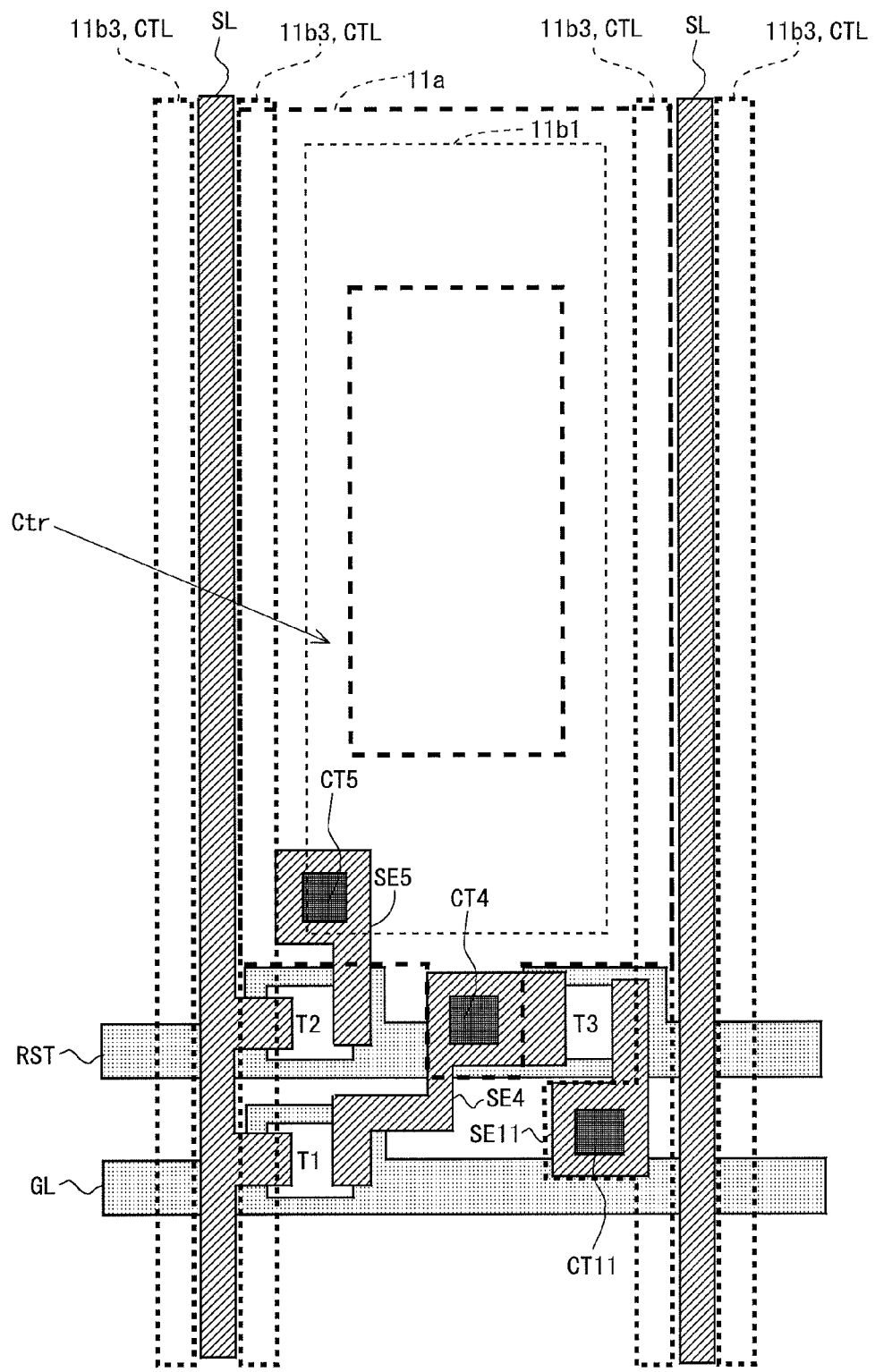
FIG. 35 is a diagram showing another example of a layout near the pixel formation portion in the ninth modification.

According to the present modification, because one electrode functions as both the shield electrode part 11b3 and as the control wiring CTL, an effect similar to that of the seventh modification can be obtained also in the display device having the high definition display unit 100. It should be noted that, when a similar configuration is applied to the eighth modification (see FIG. 32), the layout near the pixel formation portion is as shown in FIG. 35.

3.2 Method of Polarity Reversal of Pixels

Regarding the polarity reversal of pixels, the following method can be employed in addition to the "1H line-reversal drive" employed in the first embodiment (see FIG. 8), for example, and the "dot-reversal drive" employed in the first modification (see FIG. 18), for example.

3.2.1 Tenth Modification

Figure 36:
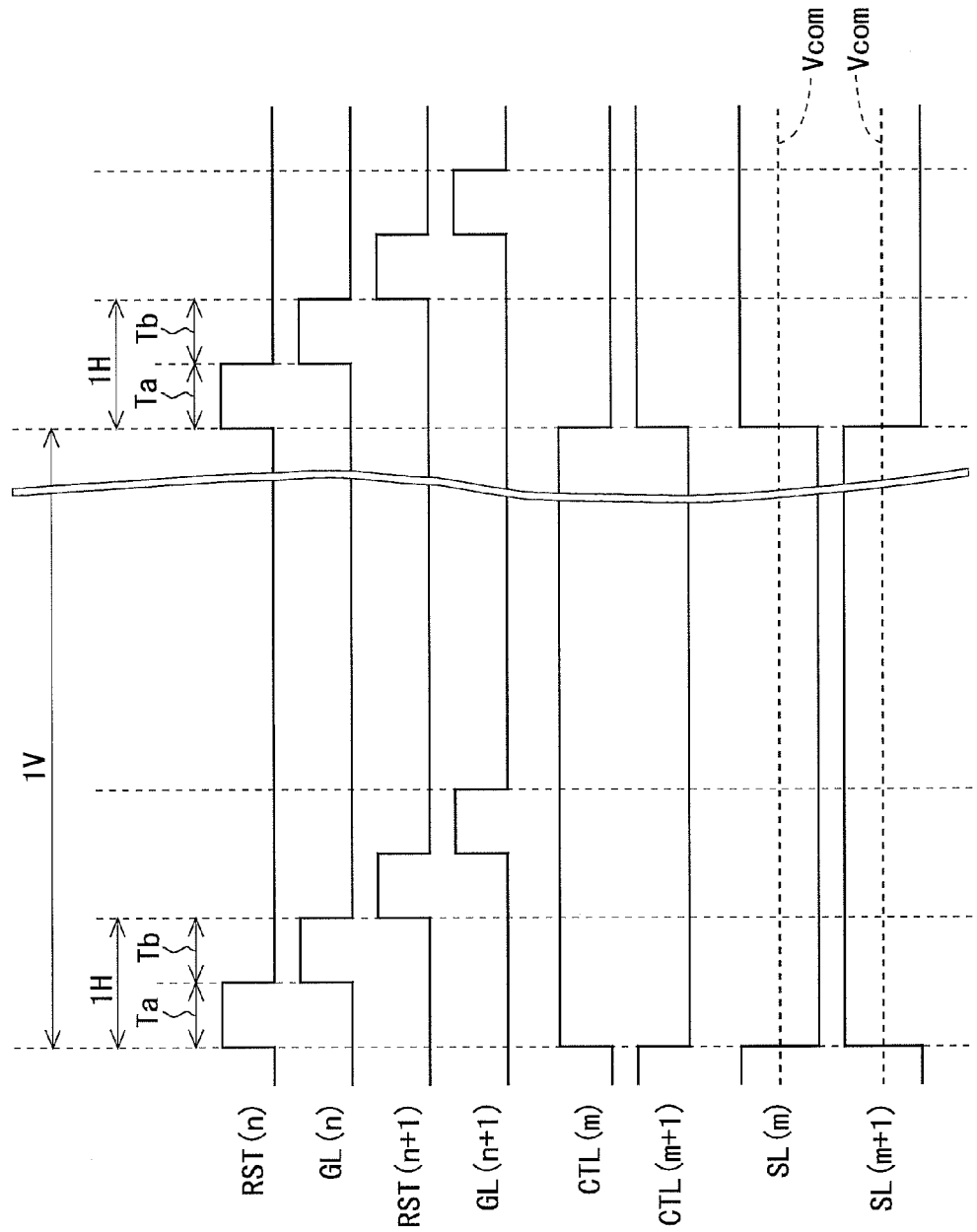
FIG. 36 is a signal waveform diagram for describing a driving method in a tenth modification.

FIG. 36 is a signal waveform diagram for describing a driving method in the tenth modification. In the present modification, an arrangement relationship between the pixel formation portion and each line is as shown in FIG. 17, for example. To the control wirings CTL, a constant high level potential and a constant low level potential are alternately applied in each one frame (one vertical scanning period). That is, as for the control wirings CTL, alternate-current drive is performed. Further, in the adjacent two control wirings (for example, CTL(m) and CTL(m+1)), potentials of mutually different levels are applied. To the source bus lines, the video signal in the positive polarity and the video signal in the negative polarity are alternately applied in each one frame (one vertical scanning period). Further, video signals of mutually different polarities are applied to adjacent two source bus lines (for example, SL(m) and SL(m+1)). As described above, regarding the polarity reversal of pixels, a method referred to as a "column-reversal drive" can be also employed. It should be noted that, in FIG. 36, focusing on the relationship between the video signal potential and the control wiring potential, when a video signal in the positive polarity is applied to a certain source bus line, a low level potential is applied to the control wiring corresponding to the source bus line, and when a video signal in the negative polarity is applied to a certain source bus line, a high level potential is applied to the control wiring corresponding to the source bus line. However, this relationship may be opposite.

The driving method of the present modification can be employed, for example, when the control wiring CTL is alternate-current driven by arranging the layout near the pixel formation portion in a configuration of the first modification (see FIG. 16), the third modification (see FIG. 22), or the sixth modification (see FIG. 28).

3.2.2 Eleventh Modification

Figure 37:
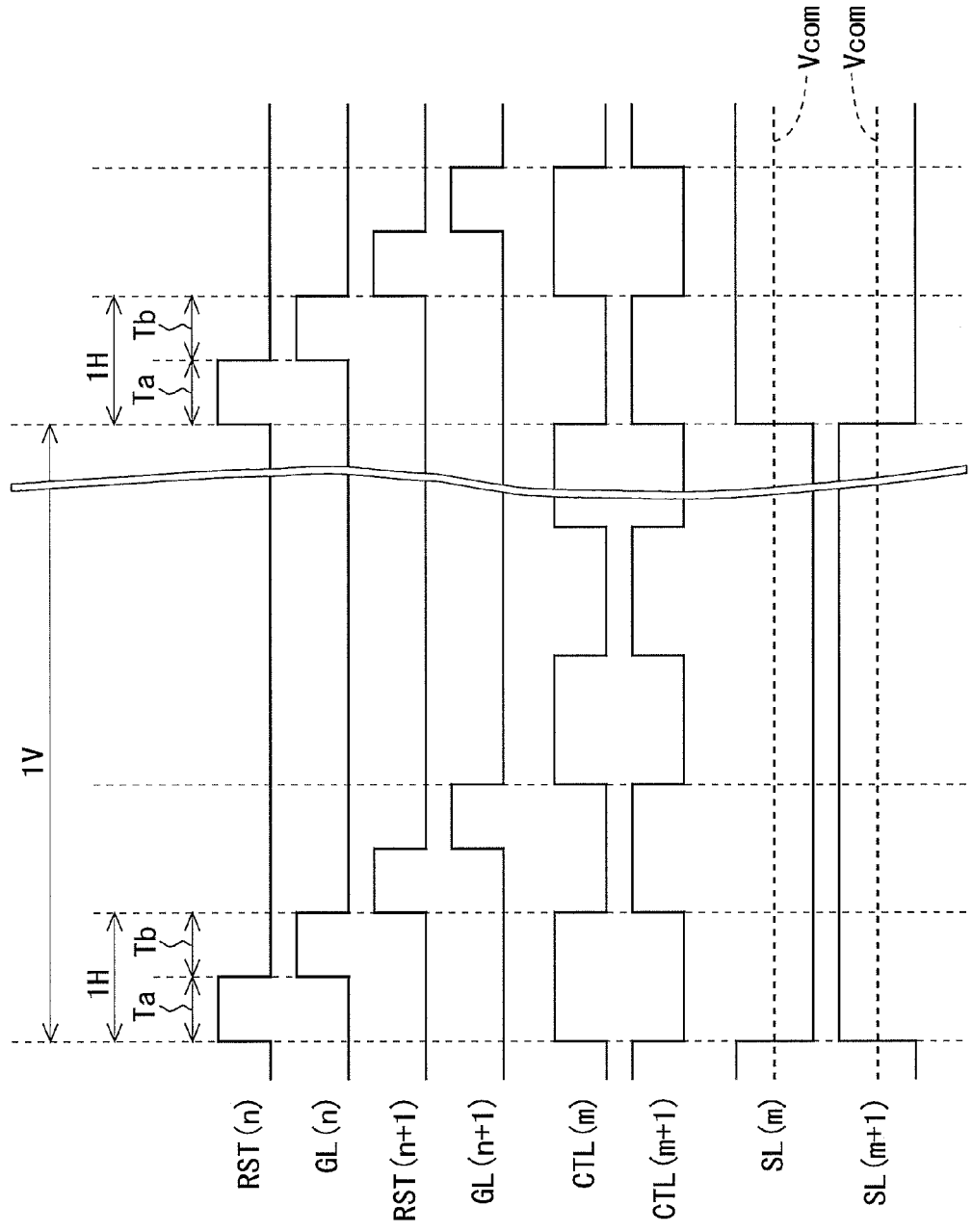
FIG. 37 is a signal waveform diagram for describing a driving method in an eleventh modification.
Figure 38:
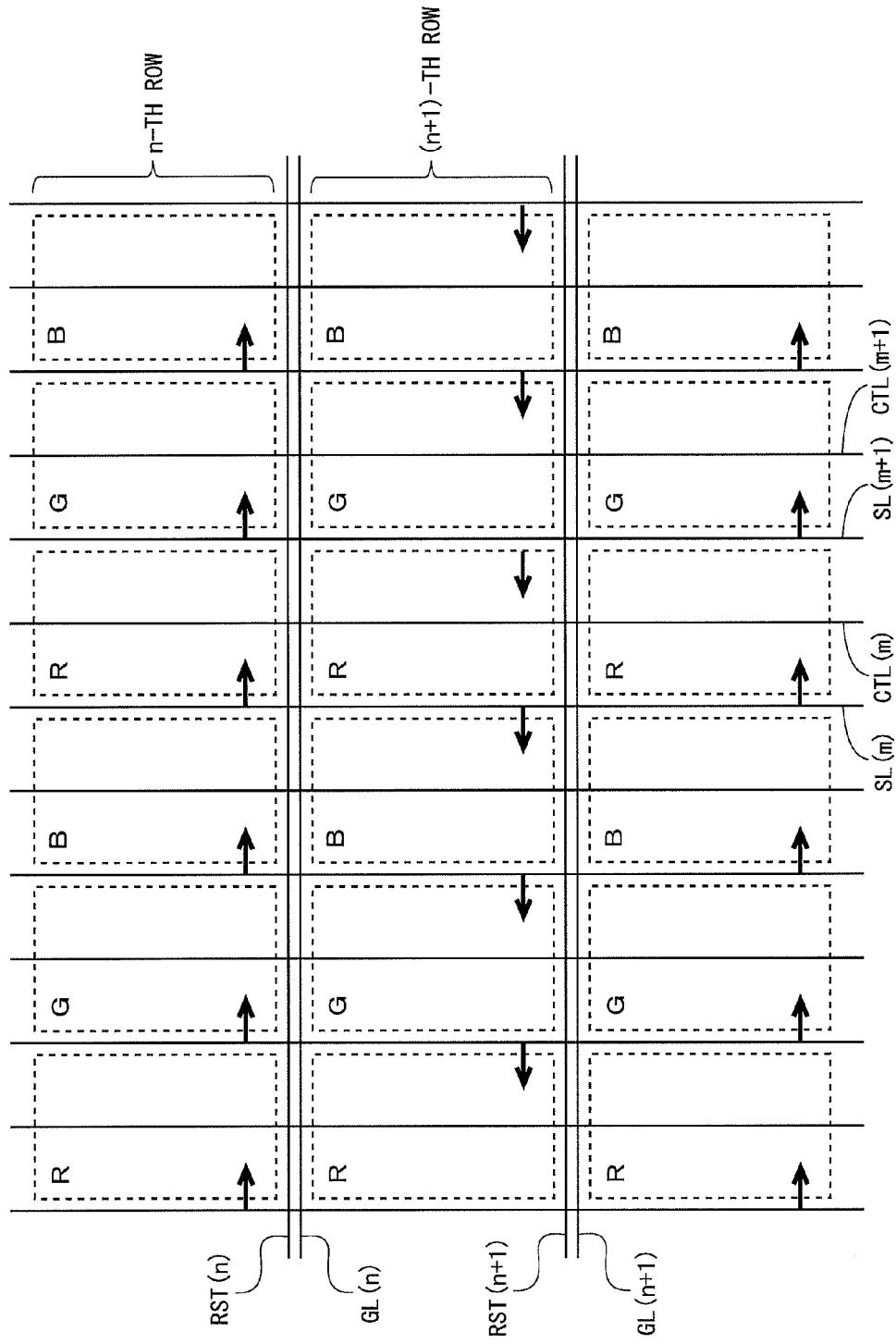
FIG. 38 is a diagram showing an arrangement relationship between the pixel formation portion and each line in the eleventh modification.

FIG. 37 is a signal waveform diagram for describing a driving method in the eleventh modification. It should be noted that, in the present modification, an arrangement relationship between the pixel formation portion and each line is as shown in FIG. 38, for example. As shown in FIG. 38, when focusing on one source bus line, pixel formation portions that receive the supply of a video signal from the source bus line are arranged in a zig-zag shape at both sides of the source bus line. The source bus line is driven similarly to the tenth modification. To the control wiring, a constant high level potential and a constant low level potential are alternately applied in each one horizontal scanning period. That is, as for the control wiring, alternate-current drive is performed. Further, in the adjacent two control wirings (for example, CTL(m) and CTL(m+1)), potentials of mutually different levels are applied.

The driving method of the present modification can be employed, for example, when the control wiring CTL is alternate-current driven by arranging the layout near the pixel formation portion in a configuration of the first modification (see FIG. 16), the third modification (see FIG. 22), or the sixth modification (see FIG. 28).

According to the present modification, although the source bus lines are driven similarly to the column-reversal drive, because the pixel formation portions connected to the source bus lines are arranged in a zig-zag shape, the occurrence of flicker is suppressed.

3.2.3 Others

In the first embodiment and the second embodiment, the examples that the 1H line-reversal drive is employed regarding the polarity reversal of pixels are shown (see FIG. 8 and FIG. 12). Concerning this, the 1H line-reversal drive can be similarly employed also in the case where the layout near the pixel formation portion is configured like the configuration of the second modification (see FIG. 19) or the fifth modification (see FIG. 27), for example.

In the first modification, the example in which the dot-reversal drive is employed regarding the polarity reversal of pixels is shown (see FIG. 18). Concerning this, the dot-reversal drive can be similarly employed when the control wiring CTL is alternate-current driven by having the layout near the pixel formation portion in the configuration of the third modification (see FIG. 22) or the sixth modification (see FIG. 28), for example.

3.3 Configuration of Pixel Formation Portion

3.3.1 Twelfth Modification

Figure 39:
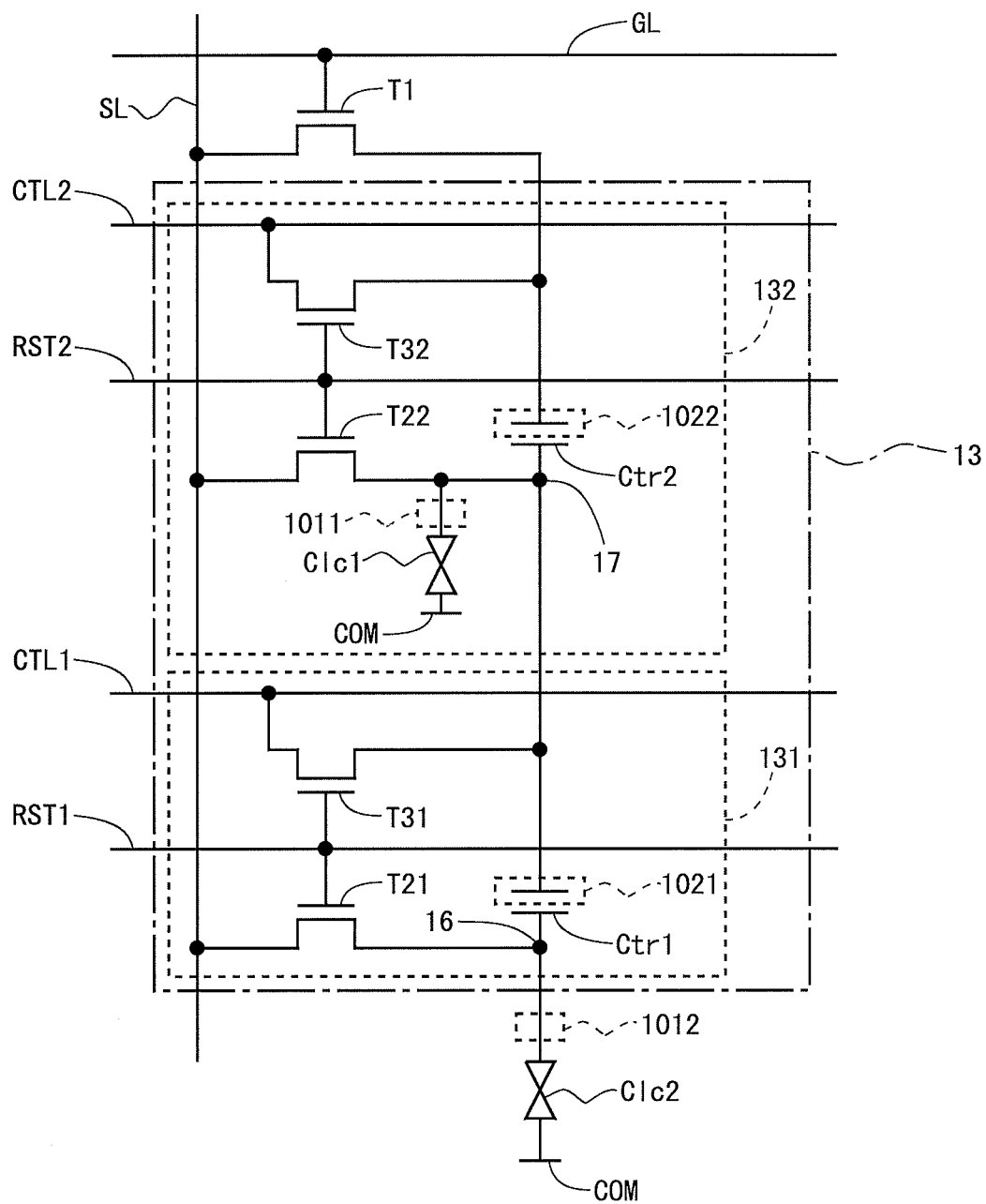
FIG. 39 is an equivalent circuit diagram showing a configuration of a pixel formation portion in a twelfth modification.

FIG. 39 is an equivalent circuit diagram showing a configuration of the pixel formation portion in the present modification. In the present modification, as shown in FIG. 39, the amplification circuit unit 13 is configured by two amplification stages (a first amplification stage 131 and a second amplification stage 132). The first amplification stage 131 includes a thin film transistor T21, a thin film transistor T31, and a first second-capacitor Ctr1. The second amplification stage 132 includes a thin film transistor T22, a thin film transistor T32, a second second-capacitor Ctr1, and a first first-capacitor Clc1. Moreover, as wirings passing through the pixel formation portion, the reset wirings RST1, RST2, and the control wirings CTL1, CTL2 are provided in addition to the gate bus line GL and the source bus line SL. Further, similarly to the first embodiment, the pixel formation portion includes a thin film transistor T1 and a second first-capacitor Clc2.

In the above configuration, a dark display pixel electrode 1011 is present at one end of the first first-capacitor Clc1. That is, the first first-capacitor Clc1 is formed by the dark display pixel electrode 1011 and the common electrode COM. Further, a bright display pixel electrode 1012 is present at one end of the second first-capacitor Clc2. That is, the second first-capacitor Clc2 is formed by the bright display pixel electrode 1012 and the common electrode COM. Further, at one end of the first second-capacitor Ctr1, there is an electrode (hereinafter, referred to as "first amplification electrode") 1021 for forming a capacitor (a capacitor for amplifying the potential of the bright display pixel electrode 1012) between the electrode 1021 and the bright display pixel electrode 1012 or between the electrode 1021 and the electrode electrically connected to the bright display pixel electrode 1012. Because the first amplification electrode 1021 is electrically connected to the dark display pixel electrode 1011, the potential of the first amplification electrode 1021 becomes equal to the potential of the dark display pixel electrode 1011. Further, at one end of the second second-capacitor Ctr2, there is an electrode (hereinafter, referred to as "second amplification electrode") 1022 for forming a capacitor (a capacitor for amplifying the potential of the dark display pixel electrode 1011) between the electrode 1022 and the dark display pixel electrode 1011 or between the electrode 1022 and the electrode electrically connected to the dark display pixel electrode 1011. It should be noted that, in only the description of the present modification, the potential of the second amplification electrode 1022 is denoted by the reference character Vpix1, the potential of the dark display pixel electrode 1011 (the potential of the first amplification electrode 1021) is denoted by the reference character Vpix2, and the potential of the bright display pixel electrode 1012 is denoted by a reference character Vpix3.

The connection relationship among the constituent elements in the pixel formation portion is as follows. As for the thin film transistor T1, the gate electrode is connected to the gate bus line GL, the source electrode is connected to the source bus line SL, and the drain electrode is connected to one end of the second second-capacitor Ctr2. As for the thin film transistor T22, the gate electrode is connected to the reset wiring RST2, the source electrode is connected to the source bus line SL, and the drain electrode is connected to one end of the first first-capacitor Clc1 and the other end of the second second-capacitor Ctr2. As for the thin film transistor T32, the gate electrode is connected to the reset wiring RST2, the source electrode is connected to the control wiring CTL2, and the drain electrode is connected to one end of the second second-capacitor Ctr2. The other end of the second second-capacitor Ctr2, the drain electrode of the thin film transistor T22, and one end of the first first-capacitor Clc1 are connected to one end of the first second-capacitor Ctr1 and the drain electrode of the thin film transistor T31. The other end of the first first-capacitor Clc1 is connected to the common electrode COM. As for the thin film transistor T21, the gate electrode is connected to the reset wiring RST1, the source electrode is connected to the source bus line SL, and the drain electrode is connected to the other end of the first second-capacitor Ctr1. As for the thin film transistor T31, the gate electrode is connected to the reset wiring RST1, the source electrode is connected to the control wiring CTL1, and the drain electrode is connected to one end of the first second-capacitor Ctr1. One end of the second first-capacitor Clc2 is connected to the drain electrode of the thin film transistor T21 and the other end of the first second-capacitor Ctr1, and the other end of the second first-capacitor Clc2 is connected to the common electrode COM.

Figure 40:
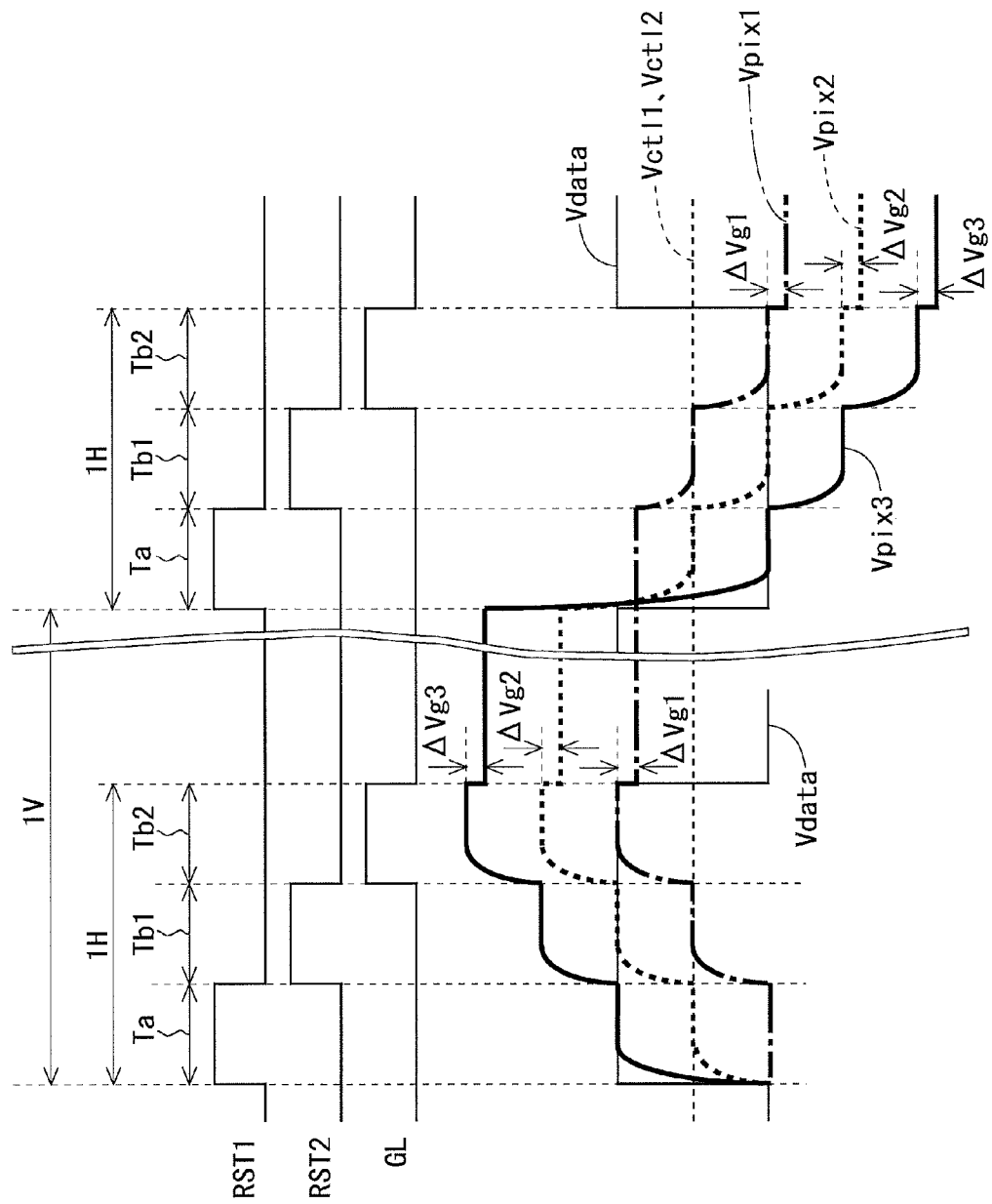
FIG. 40 is a signal waveform diagram for describing an operation of the pixel formation portion in a selection period in the twelfth modification.
Figure 41:
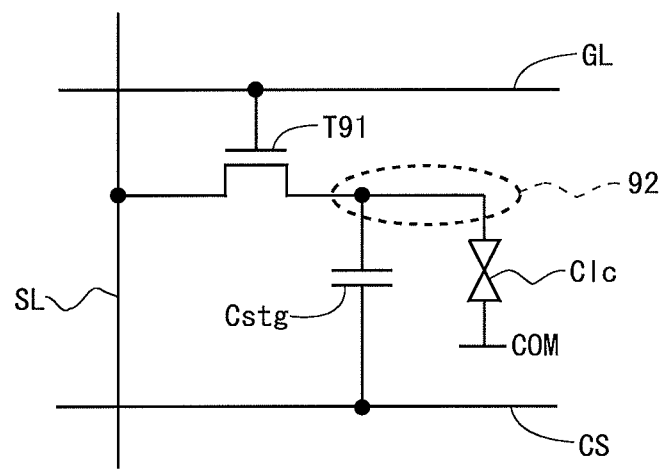
FIG. 41 is a circuit diagram showing a configuration of a pixel formation portion in a conventional general active matrix-type liquid crystal display device.
Figure 42:
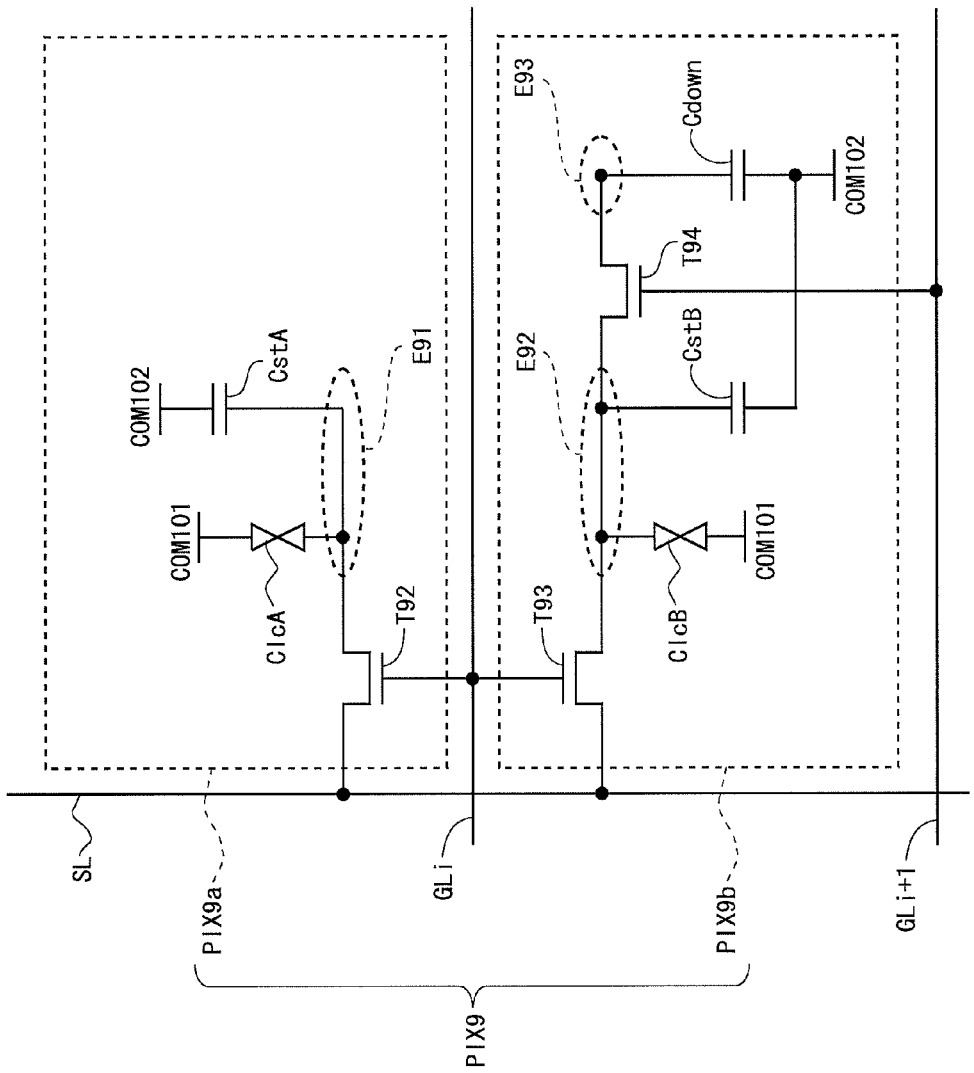
FIG. 42 is a circuit diagram showing a configuration example of the pixel formation portion in the conventional liquid crystal display device having a multi-pixel structure.
Figure 43:
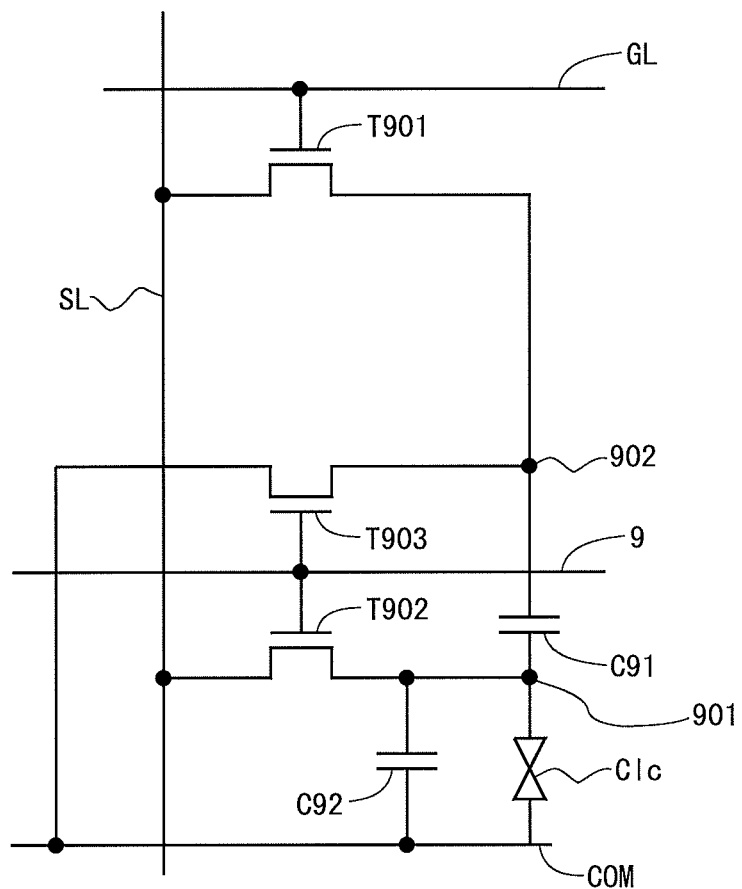
FIG. 43 is an equivalent circuit diagram showing an example of a configuration of the pixel formation portion in a conventional example.

FIG. 40 is a signal waveform diagram for describing the operation of the pixel formation portion in the selection period in the present modification. In this case, attention is given to the pixel formation portion in which the writing in the positive polarity is performed in the odd frame. In the present modification, the selection period consists of the precharge period Ta, the first amplification period Tb1, and the second amplification period Tb2.

First, in the precharge period Ta, the on-level potential is applied to the reset wiring RST1 in the state where the off-level potential is applied to the gate bus line GL and the reset wiring RST2. Accordingly, the thin film transistors T1, T22, and T32 are placed in the off state, and the thin film transistors T21, T31 are placed in the on state. As a result, the video signal potential Vdata is applied to the bright display pixel electrode 1012, and the potential Vctl1 of the control wiring CTL1 is applied to the dark display pixel electrode 1011.

Next, in the first amplification period Tb1, the on-level potential is applied to the reset wiring RST2 in the state where the off-level potential is applied to the gate bus line GL and the reset wiring RST1. Accordingly, the thin film transistors T1, T21, and T31 are placed in the off state, and the thin film transistors T22, T32 are placed in the on state. As a result, the video signal potential Vdata is applied to the dark display pixel electrode 1011. That is, the pixel electrode potential Vpix2 rises from Vctl1 to Vdata. At this time, because the bright display pixel electrode 1012 is in the floating state, the pixel electrode potential Vpix3 rises via the first second-capacitor Ctr1 with the rise in the pixel electrode potential Vpix2. Further, in this period, the potential Vctl2 of the control wiring CTL2 is applied to the second amplification electrode 1022.

Next, in the second amplification period Tb2, the on-level potential is applied to the gate bus line GL in the state where the off-level potential is applied to the reset wirings RST1, RST2. Accordingly, the thin film transistor T1 is placed in the on state, and the thin film transistors T21, T31, T22, and T32 are placed in the off state. As a result, the video signal potential Vdata is applied to the second amplification electrode 1022. That is, the potential Vpix1 of the second amplification electrode 1022 rises from Vctl2 to Vdata. At this time, because the dark display pixel electrode 1011 and the bright display pixel electrode 1012 are in the floating state, with the rise in the potential Vpix1 of the second amplification electrode 1022, the pixel electrode potential Vpix2 rises via the second second-capacitor Ctr2, and the pixel electrode potential Vpix3 rises via the second second-capacitor Ctr2 and the first second-capacitor Ctr1. After the second amplification period Tb2 ends, the potential Vpix1 of the second amplification electrode 1022 falls by $\Delta Vg1$, the pixel electrode potential Vpix2 falls by $\Delta Vg2$, and the pixel electrode potential Vpix3 falls by $\Delta Vg3$.

According to the present modification, the pixel electrode potential Vpix3 is set equal to the video signal potential Vdata in the precharge period Ta, and thereafter, is amplified in the first amplification period Tb1 and the second amplification period Tb2. In this manner, the potential of the bright display pixel electrode 1012 is amplified in two stages. Further, the pixel electrode potential Vpix2 is set equal to the video signal potential Vdata in the first amplification period Tb1, and thereafter, is amplified in the second amplification period Tb2. In this manner, the potential of the dark display pixel electrode 1011 is also amplified. As a result, the pixel electrode potential Vpix2 and the pixel electrode potential Vpix3 after the occurrence of the voltage variation after the selection period ends become the values shown in the following equation (7) and the equation (8), respectively.

[Mathematical Formula 4]

$$Vpix2 = \left[1 + \frac{Ctr1 \cdot Ctr2}{Ctr1(Clc2+Cp1)+Ctr1 \cdot Ctr2+Ctr2(Clc2+Cp1)+Cp2(Ctr1+Clc2+Cp1)}\right] \cdot$$

$$Vdata - \left[\frac{Ctr1 \cdot Ctr2}{Ctr1(Clc2+Cp1)+Ctr1 \cdot Ctr2+Ctr2(Clc2+Cp1)+Cp2(Ctr1+Clc2+Cp1)}\right] \cdot$$

$$Vctl2 - \Delta Vg2 \quad (7)$$

[Mathematical Formula 5]

$$Vpix3 = \left[1 + \frac{Ctr1}{Ctr1+Clc2+Cp1} + \right.$$

$$\left.\frac{Ctr1 \cdot Ctr2}{Ctr1(Clc2+Cp1)+Ctr1 \cdot Ctr2+Ctr2(Clc2+Cp1)+Cp2(Ctr1+Clc2+Cp1)}\right] \cdot$$

$$Vdata - \left[1 + \frac{Ctr1}{Ctr1+Clc2+Cp1}\right] \cdot Vctl$$

$$1 - \left[\frac{Ctr1 \cdot Ctr2}{Ctr1(Clc2+Cp1)+Ctr1 \cdot Ctr2+Ctr2(Clc2+Cp1)+Cp2(Ctr1+Clc2+Cp1)}\right] \cdot Vctl2 - \Delta Vg3 \quad (8)$$

Here, Cp1 represents the capacitance value of the parasitic capacitance at the node 16 in FIG. 39, and Cp2 represents the capacitance value of the parasitic capacitance at the node 17 in FIG. 39.

As described above, the bright display pixel electrode potential Vpix3 is greatly amplified, and the dark display pixel electrode potential Vpix2 is also amplified. Therefore, in the liquid crystal display device having the multi-pixel structure, the amplitude of the video signal can be set remarkably smaller than the conventional amplitude, and the power consumption can be substantially reduced more than the conventional power consumption.

It should be noted that, in place of the configuration shown in FIG. 39, one end of the first first-capacitor Clc1 that is the bright display pixel electrode 1011 may be configured to be electrically connected to the drain electrode of the thin film transistor T1. In this case, the difference between the bright display pixel electrode potential and the dark display pixel electrode potential can be made large.

Although an example has been described in which the amplification circuit unit 13 is configured by two amplification stages, the amplification circuit unit 13 may be configured by three or more amplification stages. In this case, the drain electrode of the thin film transistor T1 is connected to the drain electrode of a thin film transistor that functions as the third switching element out of the thin film transistors included in the amplification stage arranged electrically farthest from the bright display pixel electrode 1012 out of the plurality of amplification stages. Further, the bright display pixel electrode 1012 is connected to the drain electrode of a thin film transistor that functions as the second switching element out of the thin film transistors included in the amplification stage arranged electrically closest to the bright display pixel electrode 1012 out of the plurality of amplification stages. Further, focusing on two continuous amplification stages, the drain electrode of a thin film transistor that functions as the second switching element out of the thin film transistors included in the amplification stage arranged electrically farther from the bright display pixel electrode 1012 is connected to the drain electrode of a thin film transistor that functions as the third switching element out of the thin film transistors included in the amplification stage arranged electrically closer to the bright display pixel electrode 1012. The dark display pixel electrode 1011 may be included in any amplification stage except the amplification stage arranged electrically closest to the bright display pixel electrode 1012, and may be connected to the drain electrode of the thin film transistor T1.

3.4 Adjustment of Amplification Amount for Each Color

While a general color liquid crystal display device includes three pixels for an R (red) color, a G (green) color, and a B (blue) color, the amplification amount of the pixel electrode potential Vpix2 in the amplification period Tb can be also adjusted for each color. Accordingly, the view angle characteristic can be adjusted more minutely. Hereinafter, specific realization methods will be described as a thirteenth modification and a fourteenth modification.

3.4.1 Thirteenth Modification

In the present modification, the capacitance value of the second-capacitor Ctr has a value different for each color. As described above, the size V1 of the rise in the pixel electrode potential Vpix2 in the amplification period Tb is expressed by the equation (1). From the equation (1), it is understood that when the capacitance value of the second-capacitor Ctr is different, V1 is also different. Therefore, by setting the capacitance value of the second-capacitor Ctr to a different value for each color, the amplification amount of the pixel electrode potential Vpix2 in the amplification period Tb becomes also different for each color. In this manner, the view angle characteristic can be adjusted more minutely. It should be noted that, in the case of a three-color liquid crystal display device, for example, the second-capacitor Ctr for only one color may have a capacitance value different from the capacitance values of the other two colors.

3.4.2 Fourteenth Modification

In the present modification, the control wiring potential Vct1 has a different value for each color. As for this, from the equation (1), it is also understood that when the control wiring potential Vct1 is different, V1 is also different. Therefore, by setting the control wiring potential Vct1 to a value different for each color, the amplification amount of the pixel electrode potential Vpix2 in the amplification period Tb becomes also different for each color. In this manner, the view angle characteristic can be adjusted more minutely. It should be noted that the present modification may be applied to the case where the control wirings CTL are arranged so as to extend in parallel with the source bus lines SL (see FIG. 17, FIG. 38).

DESCRIPTION OF REFERENCE CHARACTERS

13: AMPLIFICATION CIRCUIT UNIT
100: DISPLAY UNIT
102: AMPLIFICATION ELECTRODE
111: TRANSPARENT ELECTRODE (TRANSPARENT ELECTRODE THAT FUNCTIONS AS DARK DISPLAY PIXEL ELECTRODE)
112: TRANSPARENT ELECTRODE (TRANSPARENT ELECTRODE THAT FUNCTIONS AS BRIGHT DISPLAY PIXEL ELECTRODE)
1011: DARK DISPLAY PIXEL ELECTRODE

1012: BRIGHT DISPLAY PIXEL ELECTRODE
COM: COMMON ELECTRODE
T1: THIN FILM TRANSISTOR (FIRST SWITCHING ELEMENT)
T2: THIN FILM TRANSISTOR (SECOND SWITCHING ELEMENT)
T3: THIN FILM TRANSISTOR (THIRD SWITCHING ELEMENT)
Clc1: FIRST FIRST-CAPACITOR
Clc2: SECOND FIRST-CAPACITOR
Ctr: SECOND-CAPACITOR
GL: GATE BUS LINE
SL: SOURCE BUS LINE
CTL: CONTROL WIRING
RST: RESET WIRING
Vct1: CONTROL WIRING POTENTIAL
Vcom: COMMON ELECTRODE POTENTIAL
Vdata: VIDEO SIGNAL POTENTIAL
Vpix1: DARK DISPLAY PIXEL ELECTRODE POTENTIAL
Vpix2: BRIGHT DISPLAY PIXEL ELECTRODE POTENTIAL

The invention claimed is:

1. An active matrix-type display device, comprising:
a plurality of video signal lines;
a plurality of scanning signal lines intersecting the plurality of video signal lines;
a plurality of pixel formation portions arranged in a matrix form at respective intersections of the plurality of video signal lines and the plurality of scanning signal lines;
a common electrode provided so as to be shared among the plurality of pixel formation portions;
first control wirings that intersect at least one of the plurality of video signal lines and the plurality of scanning signal lines; and
second control wirings provided in one-to-one correspondence with the plurality of scanning signal lines,
wherein
each of the pixel formation portions includes
  a first pixel electrode and a second pixel electrode to which potentials according to an image to be displayed are to be applied,
  a first first-capacitor formed by the first pixel electrode and the common electrode,
  a second first-capacitor formed by the second pixel electrode and the common electrode,
  an amplification circuit unit for amplifying the potential of the second pixel electrode, and
  a first switching element having a control terminal connected to the scanning signal line, a first conductive terminal connected to the video signal line, and a second conductive terminal connected to the amplification circuit unit,
the amplification circuit unit includes an amplification stage, the amplification stage including
  a second switching element having a control terminal connected to the second control wiring, and a first conductive terminal connected to the video signal line,
  a third switching element having a control terminal connected to the second control wiring, and a first conductive terminal connected to the first control wiring, and
  a second-capacitor provided between a second conductive terminal of the second switching element and a second conductive terminal of the third switching element,
the second conductive terminal of the first switching element is connected to the second conductive terminal of the third switching element,
the first pixel electrode is connected to the second conductive terminal of the third switching element,
the second pixel electrode is connected to the second conductive terminal of the second switching element,
for any pixel formation portion among the plurality of pixel formation portions,
  one frame period during which display of one screen is performed includes a selection period and a non-selection period other than the selection period, the selection period being for changing potentials of the first pixel electrode and the second pixel electrode according to the image to be displayed and including a first period and a second period,
  to a corresponding first control wiring, a constant potential is applied, or a constant high level potential and a constant low level potential are alternately applied,
  to a corresponding second control wiring, a potential for placing the second switching element and the third switching element in an on state is applied in the first period, and a potential for placing the second switching element and the third switching element in an off state is applied in a period other than the first period, and
  to a corresponding scanning signal line, a potential for placing the first switching element in an on state is applied in the second period, and a potential for placing the first switching element in an off state is applied in a period other than the second period,
when a center potential between a maximum potential and a minimum potential that can be applied to the plurality of video signal lines is a reference potential, a potential of the common electrode is set to a potential lower than the reference potential by a value equal to a size of a change in a potential of the first pixel electrode caused by a change in a potential of the scanning signal line when shifting from the selection period to the non-selection period, and
a potential of the first control wiring is set such that a center potential between the potential of the second pixel electrode in a selection period during which a potential higher than the potential of the common electrode is to be applied to the second pixel electrode and the potential of the second pixel electrode in a selection period during which a potential lower than the potential of the common electrode is to be applied to the second pixel electrode becomes equal to the potential of the common electrode.

2. The display device according to claim 1, wherein a potential Vct1 of the first control wiring is set to a value calculated by the following equation:

$$Vct1 = Vd1 + Vd2 - Vcom - \Delta Vg2$$

wherein Vd1 represents a maximum potential that can be applied to the plurality of video signal lines, Vd2 represents a minimum potential that can be applied to the plurality of video signal lines, Vcom represents a potential of the common electrode, and $\Delta Vg2$ represents a size of a change in the potential of the second pixel electrode caused by a change in the potential of the scanning signal line when shifting from the selection period to the non-selection period.

* * * * *